(12) United States Patent
Sugawara et al.

(10) Patent No.: US 6,632,004 B2
(45) Date of Patent: Oct. 14, 2003

(54) LIGHTING DEVICE

(75) Inventors: Saburo Sugawara, Tochigi (JP);
Yoshiharu Tenmyo, Kanagawa (JP);
Takayuki Uchida, Kanagawa (JP);
Nobuhisa Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/017,163

(22) Filed: Dec. 14, 2001

(65) Prior Publication Data
US 2003/0007359 A1 Jan. 9, 2003

(30) Foreign Application Priority Data

Dec. 27, 2000 (JP) ........................................ 2000-399561
Apr. 26, 2001 (JP) ........................................ 2001-129769
Jun. 20, 2001 (JP) ........................................ 2001-186157

(51) Int. Cl.[7] ................................ F21V 7/02; F21V 5/02
(52) U.S. Cl. ...................... 362/281; 362/18; 362/224; 362/331; 362/332; 362/337; 362/339
(58) Field of Search ...................... 362/16, 18, 224, 362/280, 281, 327, 300, 330, 331, 332, 336, 337, 339, 340

(56) References Cited

U.S. PATENT DOCUMENTS

| | | | | |
|---|---|---|---|---|
| 4,316,241 A | * | 2/1982 | Gulliksen | 362/281 |
| 4,345,303 A | * | 8/1982 | Gerard et al. | 362/281 |
| 5,775,799 A | * | 7/1998 | Forkner | 362/281 |
| 6,011,929 A | * | 1/2000 | Fuke et al. | 362/16 |

FOREIGN PATENT DOCUMENTS

GB 2065858 A * 12/1979 ................. 362/300

* cited by examiner

*Primary Examiner*—Alan Cariaso
(74) *Attorney, Agent, or Firm*—Robin, Blecker & Daley

(57) ABSTRACT

A lighting device is disclosed which comprises an illuminating light source for illuminating an object, a first optical unit disposed on the side of the object of the illuminating light source and having an optical action section for diverging light or an optical action section for converging light, and a second optical unit disposed on the side of the object of the optical action section of the first optical unit and having an optical action section for exhibiting a characteristic opposite to a characteristic of the optical action section, wherein the optical action section of the second optical unit overlies the optical action section of the first optical unit in varying areas to change light distribution characteristic on the side of the object.

22 Claims, 52 Drawing Sheets

LIGHTING DEVICE

BACKGROUND OF THE INVENTION

1. Field of the Invention

The present invention relates to a lighting device with variable irradiation angles and a picture taking device using the lighting device, and the lighting device is preferably used, for example, in an optical instrument such as a video camera, film camera, or a digital camera in which the lighting device is mounted on part of a body of a camera (picture taking device) and achieves efficient irradiation toward a subject to take pictures by varying an irradiation angle of illuminating light (flash) in association with picture taking operations of the camera body according to a purpose.

2. Description of the Related Art

Conventionally, various proposals have been made for lighting devices used in picture taking devices such as cameras with the intention of efficiently collecting luminous flux emitted in various directions from a light source into a required irradiation view angle. Particularly, in recent years, instead of a Fresnel lens surface disposed in front of a light source, a proposed lighting device has an optical member utilizing total reflection such a prism light guide disposed for achieving techniques include switching between optical paths by inserting or rotating a divergence member or a reflection member in synchronization with forward-and-backward motions of a front panel in a direction along an exit optical axis, changing optical paths by a prism formed integrally with a front panel, and the like.

Proposed lighting devices provided with an optical member utilizing total reflection such as a prism light guide disposed in front of a light emitting means to achieve improved light collecting efficiency and a reduced size and to allow variable irradiation angles include an example as shown in the aforementioned Japanese Patent Laid-open No. 4-138439 having a light collecting optical system which has, in front of a flash emission unit, upper and lower two surfaces for causing luminous flux emitted mainly to the side of a light source to make incident to an optical member and then totally reflecting the luminous flux for collecting light in a predetermined direction, and a surface with positive refractivity formed in front separately from the two surfaces to collect light. The light collecting optical system collects light exit through the respective surfaces and then makes the light exit toward a subject from the same exit surface. A positional relationship between the optical prism and the light source is relatively changed to switch between reflection and improved efficiency of light collection and a reduced size.

On the other hand, picture taking devices tend to have higher power zoom. When a lighting device with a fixed irradiation range is used for such a picture taking device, illumination is performed in the maximum irradiation range even in tele mode which requires only a narrow irradiation range, thereby causing a large energy loss. To eliminate this drawback, lighting devices with variable irradiation angles have conventionally been proposed for illumination in accordance with a picture taking range.

As a known technology of a lighting system to which the aforementioned two kinds of techniques are applied, Japanese Patent Laid-open No. 4-138439 employs a light collecting optical system having an optical prism for totally reflecting light in which a positional relationship is relatively changed between the optical prism and a light source to switch between refraction and total reflection on a surface, and thus an irradiation range is varied. In Japanese Patent Laid-open No. 8-262538, a plurality of separate optical prisms are used and the optical prisms disposed at upper and lower positions are rotated to switch between irradiation ranges.

In addition, for varying an irradiation angle in a longitudinal direction of a light source, proposed transmission on the total reflection surface, thereby varying an irradiation range.

On the other hand, Japanese Patent Laid-open No. 8-262538 (U.S. Pat. No. 5,813,743) has proposed a lighting device in which a plurality of separate optical prisms are used and the optical prisms disposed at upper and lower positions are rotated to switch between irradiation ranges.

Any of the aforementioned techniques, however, fundamentally utilizes forward-and-backward motions of the front panel in the direction along the exit optical axis of the optical member to allow light condensing and diverging effects in a vertical direction. Thus, a disadvantage occurs in that the size is inevitably increased.

SUMMARY OF THE INVENTION

From the foregoing situations, it is an object of the present invention to provide a lighting device with variable irradiation angles which has small size yet significantly changes light condensing and diverging degrees in a vertical or horizontal direction efficiently by taking a shape for efficiently functioning in accordance with each state of condensed and diverged light, and a picture taking device using the lighting device.

It is also an object of the present invention to provide a lighting device with variable irradiation angles which is configured to require no space for an optical member to retract in its movement in varying an irradiation angle to extremely reduce the size of the whole configuration of a lighting optical system and continuously changes the ratio between areas where light is condensed and diverged to allow a continuous change in light distribution characteristic at each zoom point, and a picture taking device using the lighting device.

In one aspect according to the present invention, a lighting device is provided which comprises:

an illuminating light source for illuminating an object;
a first optical unit disposed on the side of the object of the illuminating light source and having an optical action section for diverging light or an optical action section for converging light; and
a second optical unit disposed on the side of the object of the optical action section of the first optical unit and having an optical action section for exhibiting a characteristic opposite to a characteristic of the optical action section of the first optical unit,
wherein the optical action section of the second optical unit overlies the optical action section of the first optical unit in varying areas to change light distribution characteristic on the side of the object.

Especially, the illuminating light source is a discharge tube having a longitudinal direction.

The second optical unit is moved in the longitudinal direction of the discharge tube to change the area where the optical action section of the second optical unit overlies the optical action section of the first optical unit when light distribution characteristic is changed.

The optical action section of the first optical unit has a plurality of convex portions or a plurality of concave portions arranged in a direction perpendicular to the longitudinal direction and the optical action section of the second optical unit has a plurality of concave portions or a plurality of convex portions having an optical characteristic opposite to an optical characteristic of the plurality of convex portions or concave portions.

The plurality of convex portions or plurality of concave portions of the first optical unit are a plurality of cylindrical lenses and the plurality of concave portions or plurality of convex portions of the second optical unit are a plurality of cylindrical lenses.

The plurality of convex portions or plurality of concave portions of the first optical unit are a plurality of toric lenses and the plurality of concave portions or plurality of convex portions of the second optical unit are a plurality of toric lenses.

A surface of the first optical unit on the side of the object has a region where the optical action section is formed and a region where the optical action section is not formed. A surface of the second optical unit on the side of the first optical unit has a region where the optical action section is formed and a region where the optical action section is not formed. Light distribution characteristic is changed by changing the area where the optical action section of the second optical unit overlies the optical action section of the first optical unit.

Other features will become apparent from the following description and accompanying drawings.

DESCRIPTION OF THE PREFERRED EMBODIMENTS

FIGS. 1 to 8 illustrate the configuration and optical actions of a lighting device which is a first embodiment of the present invention. It should be noted that description is made herein assuming that the lighting device is used for a picture taking device such as a camera.

Figure 1:
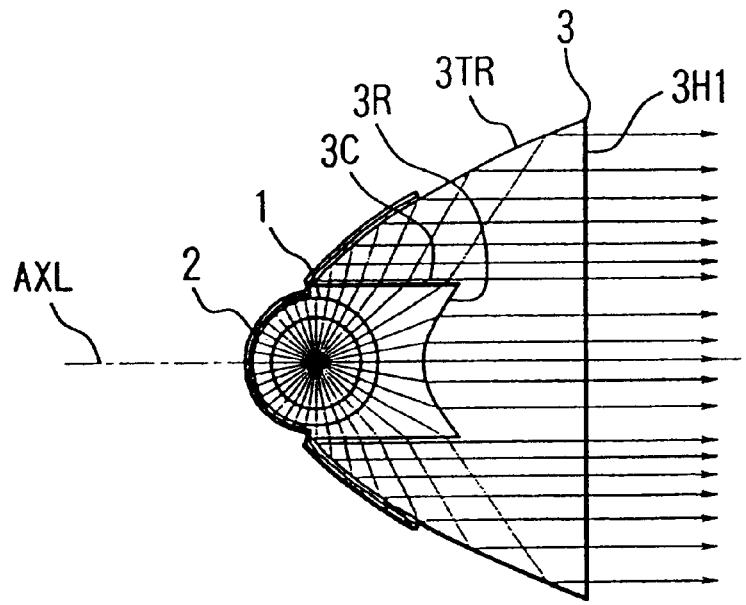
FIG. 1 is a cross section of a lighting device according to a first embodiment of the present invention in a narrow light distribution angle state.
Figure 2:
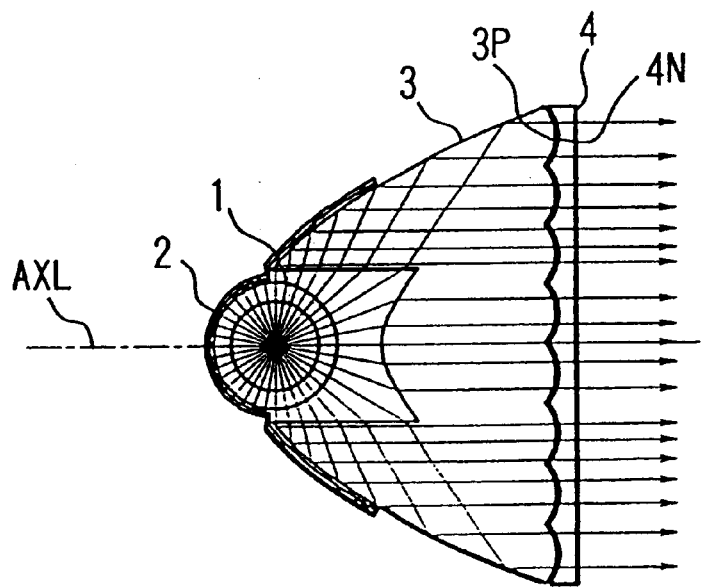
FIG. 2 is a cross section of the lighting device according to the first embodiment in the narrow light distribution angle state.
Figure 3:
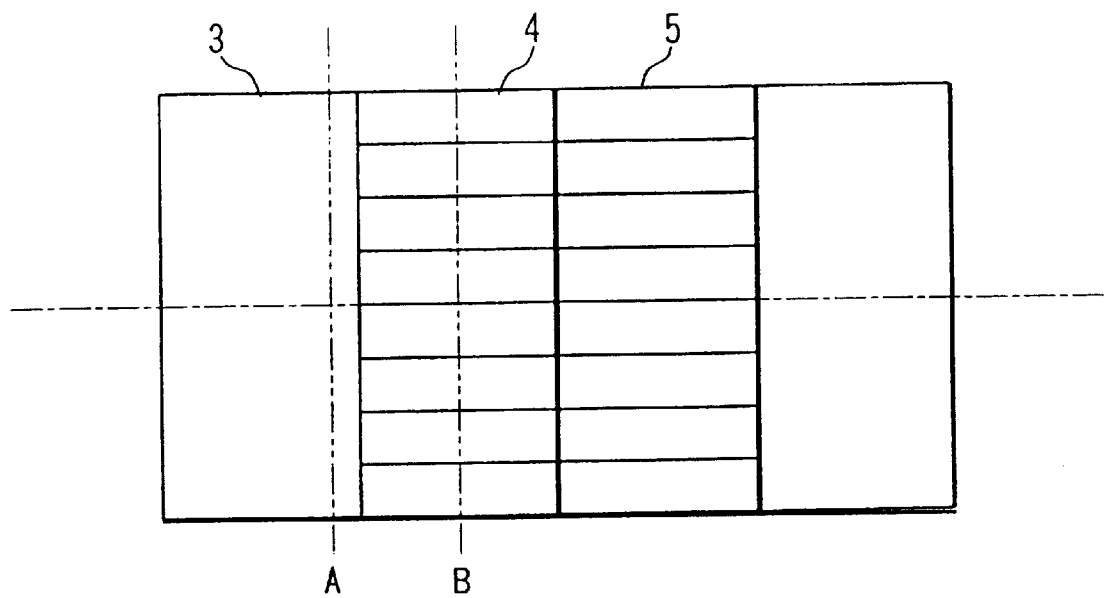
FIG. 3 is a front view of the lighting device according to the first embodiment in the narrow light distribution angle state.
Figure 4:
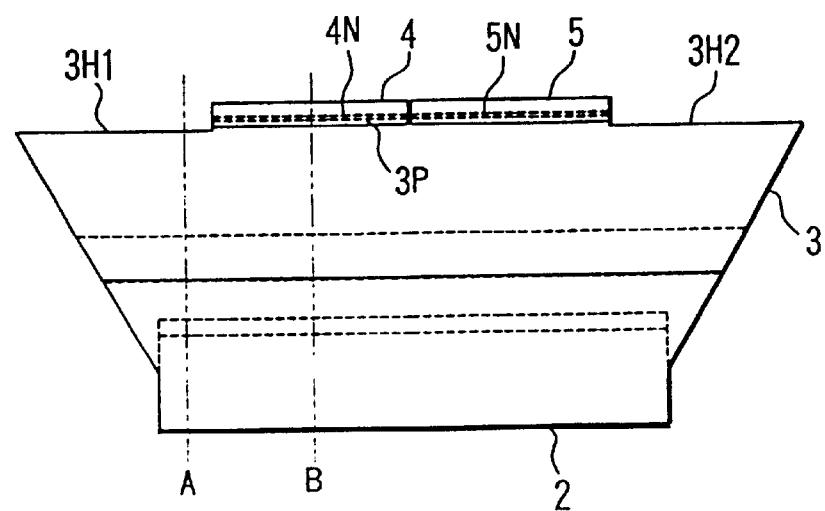
FIG. 4 is a bottom view of the lighting device according to the first embodiment in the narrow light distribution angle state.
Figure 5:
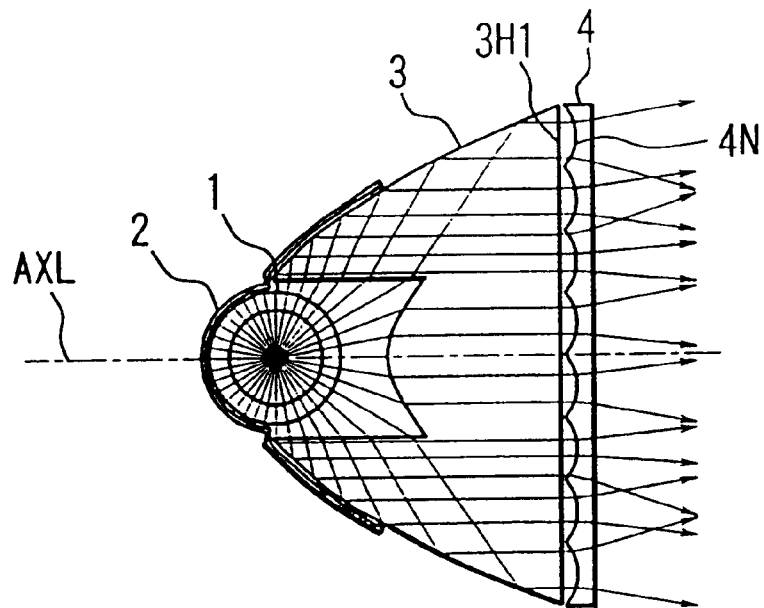
FIG. 5 is a cross section of the lighting device according to the first embodiment in a wide light distribution angle state.
Figure 6:
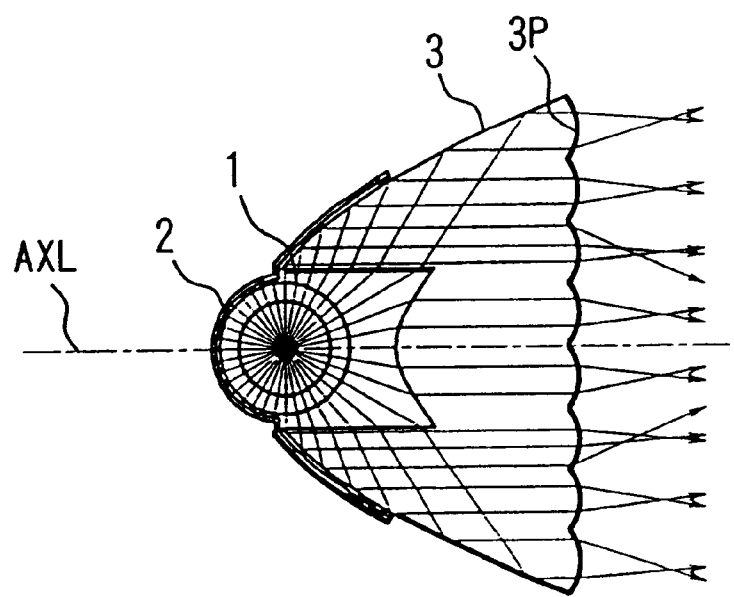
FIG. 6 is a cross section of the lighting device according to the first embodiment in the wide light distribution angle state.

FIGS. 1 and 2 illustrate the lighting device in a narrow light distribution angle state and show cross sections taken along a line A and a line B in FIG. 3 (front view) and FIG. 4 (bottom view) which illustrate the same state, respectively. FIGS. 5 and 6 illustrate the lighting device in a wide light distribution angle state and show cross sections taken along a line C and a line D in FIG. 7 (front view) and FIG. 8 (bottom view) which illustrate the same state, respectively.

In FIGS. 1, 2, 5, and 6, of luminous flux emitted from a light emitting tube 1, light traveling to the left on the sheet opposite to a subject on the right hand on the sheet is reflected by a semicylindrical reflector plate 2 back to the light emitting tube 1, and then exits toward the subject from the light emitting tube 1.

Of luminous flux emitted from the light emitting tube 1 toward the subject, luminous flux emitted upward on the sheet is refracted by an incident surface 3C of a prism (optical element) 3 and then totally reflected by a total reflection surface (parallel conversion optical action section) 3TR to form generally parallel luminous flux which then travels toward an exit surface of the prism 3.

Since the luminous flux emitted toward the upper right on the sheet from the light emitting tube 1 is redirected upward through the refraction by the incident surface 3C, the total reflection surface 3TR of the prism 3 can be of a small size.

Of the luminous flux emitted toward the subject from the light emitting tube 1, luminous flux emitted downward on the sheet acts in the same manner as the aforementioned luminous flux since the reflector plate 2 and the prism 3 are configured symmetrically about an optical axis AXL of the prism 3.

Of the luminous flux emitted toward the subject from the light emitting tube 1, light near the optical axis AXL is refracted by a cylindrical lens section (parallel conversion optical action section) 3R of the prism 3 to form generally parallel luminous flux which then travels toward the exit surface of the prism 3.

The reflector plate 2 covers a portion of the outer peripheral surface of the light emitting tube 1 opposite to the subject side (a direction in which illuminating light is irradiated) and a portion of the total reflection surface 3TR of the prism 3 near the optical axis where total reflection conditions are not satisfied.

The cross section of the total reflection surface 3TR including the optical axis and a cross section in parallel with the section preferably have contours of a cylindrical aspheric surface of or close to a parabolic shape for maintaining favorable parallelism of exiting luminous flux.

The cylindrical lens section 3R of the prism 3 is preferably formed with a hyperboloid in FIG. 1.

More specifically, as described bellow, spherical aberration of the cylindrical lens section 3R of the prism 3 can be eliminated when the value of constant K of the cone is set to a negative value of the square of the refractive index of the prism 3.

For example, when the refractive index of the prism 3 is 1.5, the constant of the cone is preferably −2.25.

(equation for aspheric shape)

$$X = h^2/R/\{1+\sqrt{(1-(1+K)*(h/R)^2)}\}$$

where
X; sag amount
R; paraxial radius of curvature
K; constant of the cone
h; distance from the optical axis.

In this manner, all of the luminous flux emitted from the center of the light emitting tube 1 is converted into generally parallel luminous flux by the parallel conversion optical actions of the total reflection surface 3TR (reflector plate 2) of the prism 3 and the cylindrical lens section 3R.

The generally parallel luminous flux exits as it is toward the subject from a portion (where an exit plane section 3H1 is formed) of the cross section A shown in FIG. 1.

On the other hand, in FIG. 2, a plurality of cylindrical lens sections (first optical action sections) 3P with a converging action on generally parallel luminous flux incident thereon are formed on the exit surface of the prism 3 in the cross section B. In FIG. 2, in opposition to the cylindrical lens sections 3P, a lens plate 4 having a cylindrical lens section (second optical action section) 4N with a diverging action canceling out the refractivity of the lens sections 3P is disposed generally in close contact therewith.

In this state, since the convergence of the cylindrical lens sections 3P and the divergence of the cylindrical lens section 4N cancel each other out, generally parallel luminous flux incident on the cylindrical lens sections 3P exits generally as it is toward the subject from the lens plate 4.

As shown in FIGS. 3, 4, 7, and 8, in peripheral portions at both ends in the left-right direction on the sheet on the exit surface of the prism 3, the aforementioned exit plane section 3H1 and an exit plane section 3H2 of the same shape as the section 3H1 are formed to have a size overlaid with the lens plate 4 and a lens plate 5 of the same shape as the plate 4, respectively. The aforementioned plurality of cylindrical lens sections 3P are formed to have a size overlaid with the two lens plates 4, 5 between the exit plane sections 3H1 and 3H2 on the exit surface of the prism 3.

The lens plate 4 is slidingly movable in the left-right direction or longitudinal direction of the light emitting tube 1 between a position where the lens plate 4 totally overlies the left half of the cylindrical lens sections 3P and a position where the lens plate 4 totally overlies the exit plane section 3H1 (a position where it does not overlie the cylindrical lens sections 3P at all). The lens plate 5 is also slidingly movable in the left-right direction between a position where the lens plate 5 totally overlies the right half of the cylindrical lens sections 3P and a position where the lens plate 5 totally overlies the exit plane section 3H2 (a position where it does not overlie the cylindrical lens sections 3P at all).

While a slide driving mechanism for the lens plates 4, 5 is not described in detail, it is possible to employ, for example, a mechanic feature for sliding the lens plates 4, 5 associated with zooming of an optical system for taking pictures.

In FIGS. 3, 4 (FIGS. 1, 2), the cylindrical lens sections 3P with convergence are totally overlaid with the cylindrical lens sections 4N, 5N with divergence of the lens plates 4, 5 slid to the center in the left-right direction of the prism 3. In this state, as described in FIG. 2, since the cylindrical lens sections 3P are in close contact with the cylindrical lens sections 4N, 5N, generally parallel luminous flux incident on the cylindrical lens sections 3P exits as generally parallel luminous flux from the lens plate 4 (, 5) without being converged or diverged.

On the other hand, in FIG. 1, since the exit plane section 3H1 (3H2) of the prism 3 inherently has no converging or diverging action, generally parallel luminous flux incident on the exit plane section 3H1 (3H2) exits as it is from the exit plane section 3H1 (3H2).

In this manner, in the state shown in FIGS. 1 to 4, luminous flux emitted from the center of the light emitting tube 1 exits from the overall exit surface of the lighting device without being spread out vertically on the sheet, that is, as generally parallel luminous flux.

Figure 7:
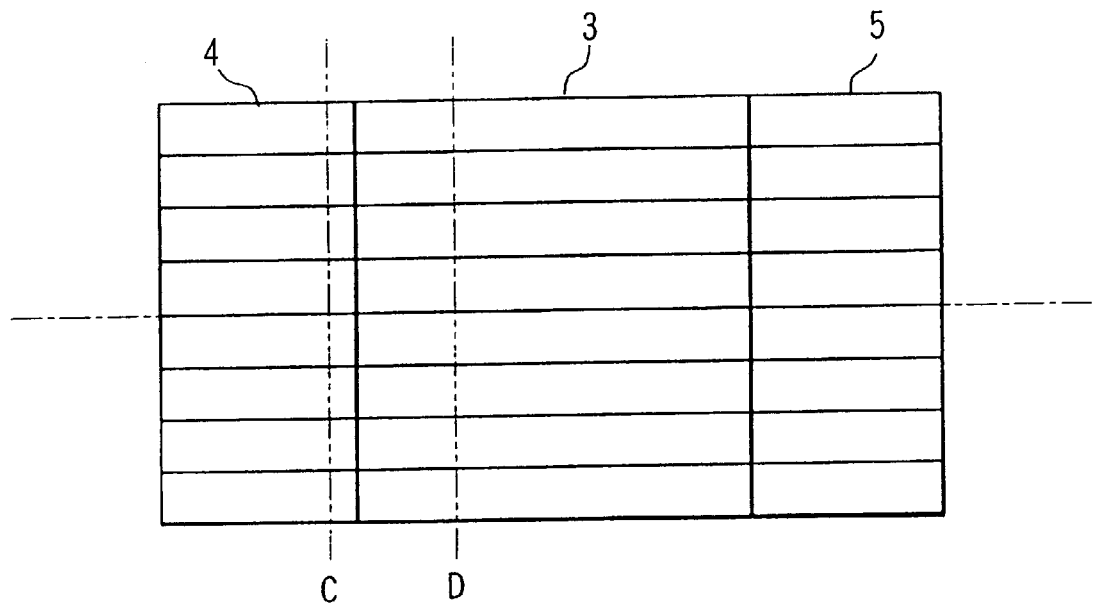
FIG. 7 is a front view of the lighting device according to the first embodiment in the wide light distribution angle state.
Figure 8:
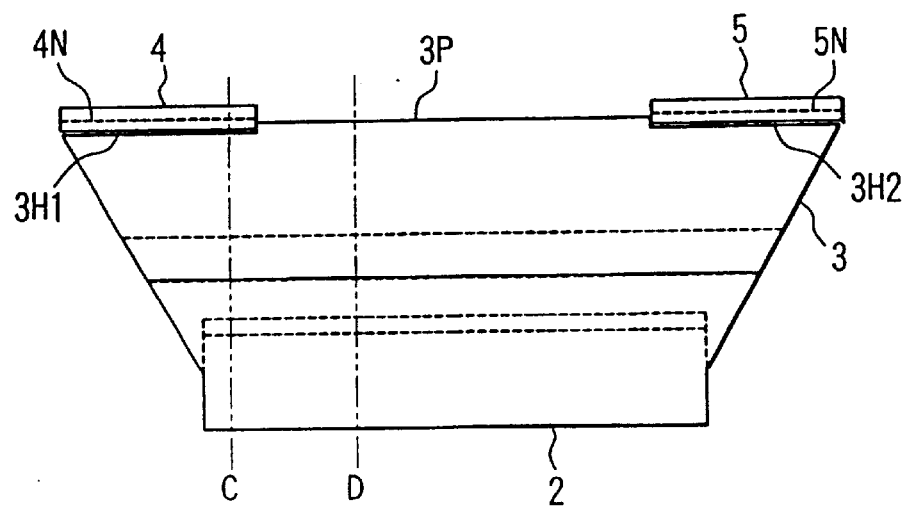
FIG. 8 is a bottom view of the lighting device according to the first embodiment in the wide light distribution angle state.

When the lens plates 4, 5 are slid to both ends in the left-right direction of the prism 3 as shown in FIGS. 7, 8, the cylindrical lens sections 4N, 5N with divergence totally overlie the exit plane sections 3H1, 3H2 of the prism 3. In this state, as shown in FIG. 5, generally parallel luminous flux exiting from the exit plane section 3H1 (3H2) of the prism 3 is diverged vertically on the sheet by the cylindrical lens section 4N (5N) with divergence.

On the other hand, in FIG. 6, since the lens plate 4 (5) is retracted from the front of the cylindrical lens sections 3P with convergence of the prism 3, luminous flux exiting from the cylindrical lens sections 3P is once condensed vertically on the sheet by the converging action of the cylindrical lens sections 3P, and then diverged.

In this manner, in the state shown in FIGS. 5 to 8, luminous flux emitted from the center of the light emitting tube 1 exits from the overall exit surface of the lighting device while being spread out vertically on the sheet.

As described above, in this embodiment, the lens plates 4, 5 are moved between the positions where they overlie the cylindrical lens sections 3P and the positions where they overlie the exit plane sections 3H1, 3H2 to change the area where the cylindrical lens sections 3P with convergence are overlaid with the cylindrical lens sections 4N, 5N with divergence (or the area of the region where luminous flux exiting from the lighting device is diverged or spread out) between zero and maximum. Thus, a light distribution angle of luminous flux exiting from the lighting device can be changed between the minimum light distribution angle for generally parallel luminous flux and the maximum light distribution angle for diverged luminous flux.

When the lens plates 4, 5 lie at the midpoint between the position shown in FIGS. 3, 4 and the position shown in FIGS. 7, 8, the area where the cylindrical lens sections 3P are overlaid with the cylindrical lens sections 4N, 5N is half of that in FIGS. 3, 4, thereby reducing to half the area of the region where exiting luminous flux is diverged or spread out vertically in the overall exit surface. The light distribution angle in the vertical direction is thus intermediate between the aforementioned minimum and maximum light distribution angles. Continuously changing the area where the cylindrical lens sections 3P are overlaid with the cylindrical lens sections 4N, 5N between zero and maximum can also change the light distribution angle continuously between the minimum and maximum.

With this configuration, when the optical system for taking pictures is a zoom optical system, an optimal light distribution angle of illuminating light can be obtained in accordance with a change of a focal length of the lens.

Figure 9:
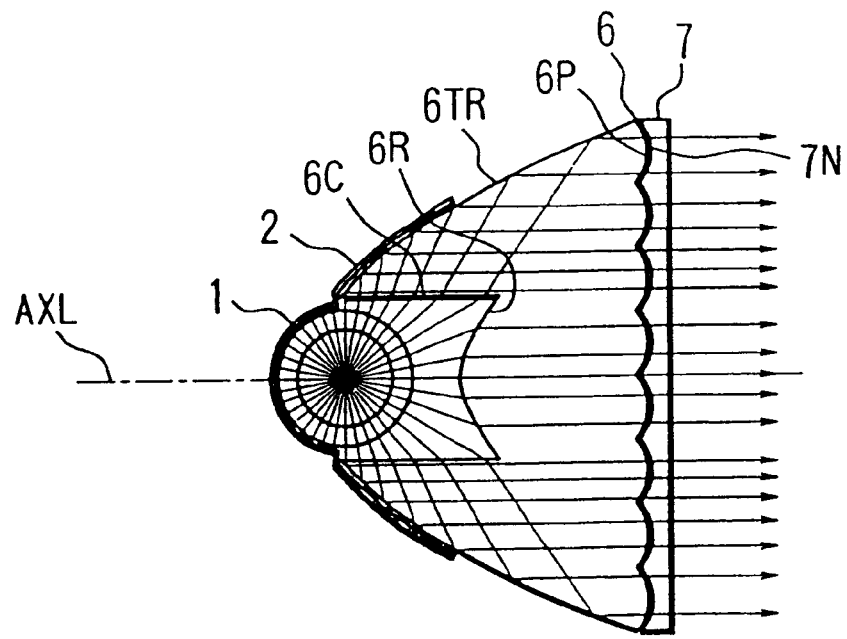
FIG. 9 is a cross section of a lighting device according to a second embodiment of the present invention in a narrow light distribution angle state.
Figure 10:
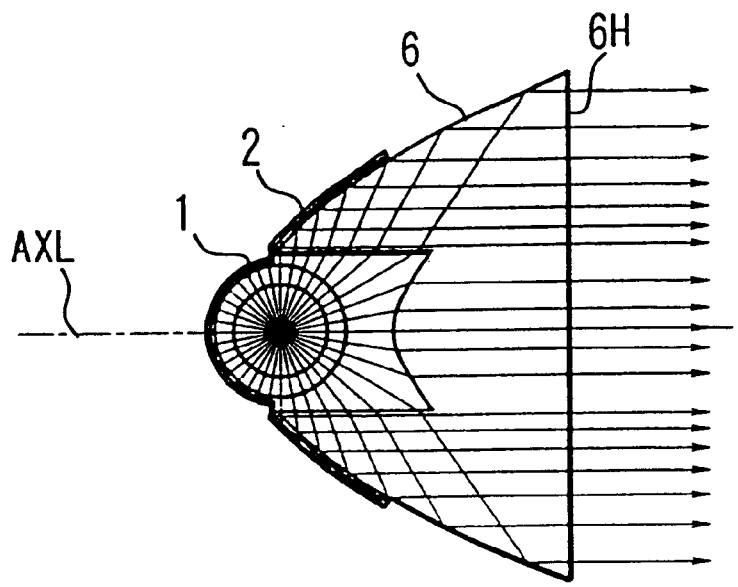
FIG. 10 is a cross section of the lighting device according to the second embodiment in the narrow light distribution angle state.
Figure 11:
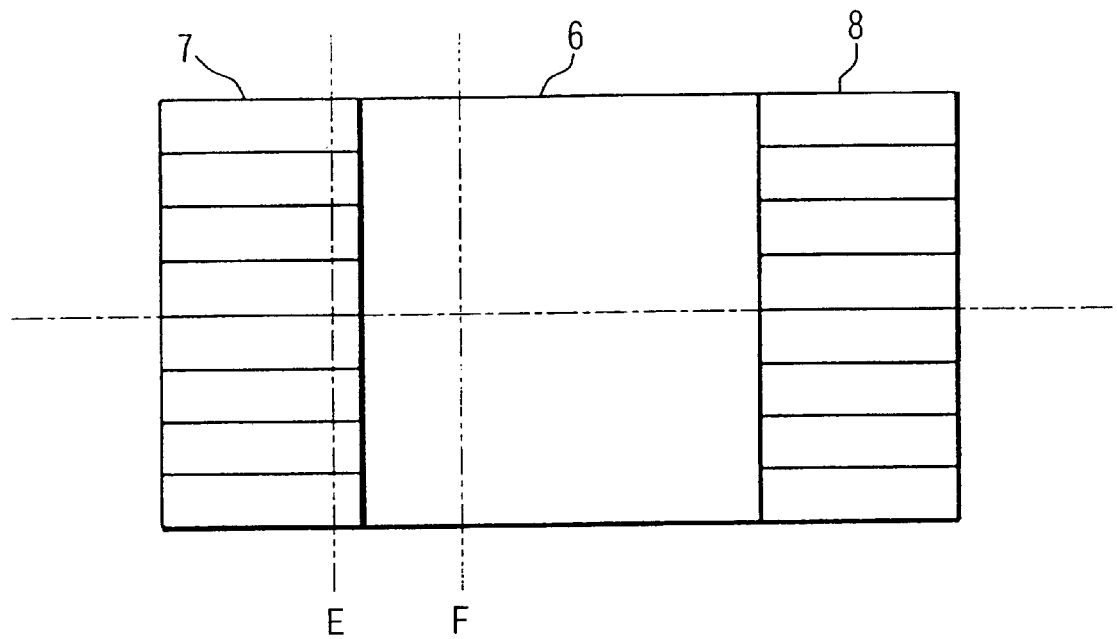
FIG. 11 is a front view of the lighting device according to the second embodiment in the narrow light distribution angle state.
Figure 12:
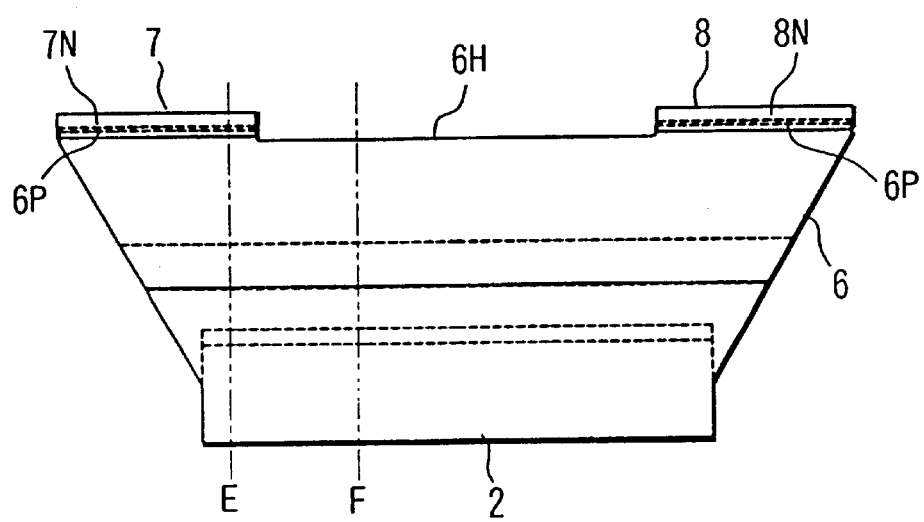
FIG. 12 is a bottom view of the lighting device according to the second embodiment in the narrow light distribution angle state.
Figure 13:
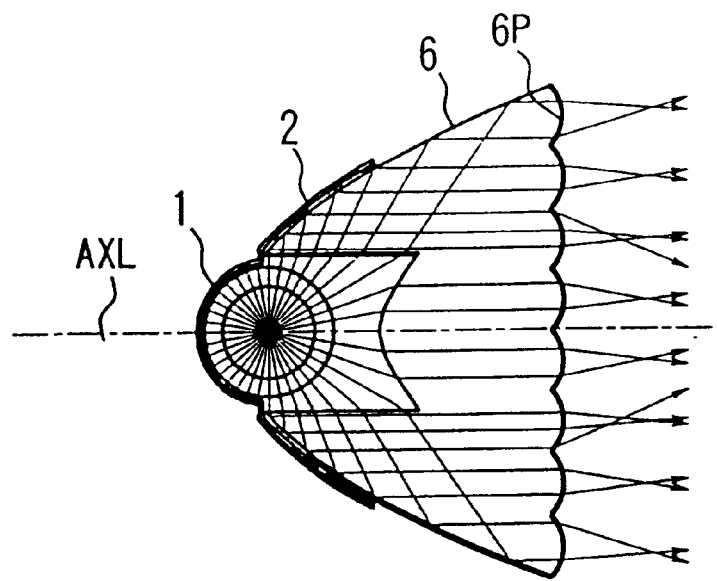
FIG. 13 is a cross section of the lighting device according to the second embodiment in a wide light distribution angle state.
Figure 14:
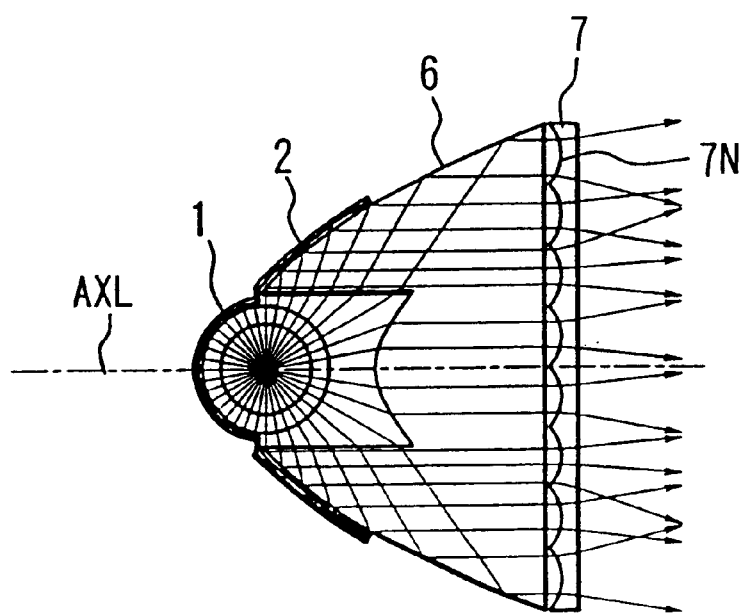
FIG. 14 is a cross section of the lighting device according to the second embodiment in the wide light distribution angle state.

FIGS. 9 to 16 illustrate the configuration and optical actions of a lighting device which is a second embodiment of the present invention. FIGS. 9 and 10 illustrate the lighting device in a narrow light distribution angle state and show cross sections taken along a line E and a line F in FIG. 11 (front view) and FIG. 12 (bottom view) which illustrate the same state, respectively. FIGS. 13 and 14 illustrate the lighting device in a wide light distribution angle state and show cross sections taken along a line G and a line H in FIG. 15 (front view) and FIG. 16 (bottom view) which illustrate the same state, respectively.

While the lighting device in this embodiment has substantially the same configuration as the first embodiment, the former differs from the latter in the position of cylindrical lens sections 6P in a prism 6 used instead of the prism 3 in the first embodiment.

In FIGS. 9, 10, 13, and 14, of luminous flux emitted from an light emitting tube 1, light traveling to the left on the sheet opposite to a subject on the right hand on the sheet is reflected by a semicylindrical reflector plate 2 back to the light emitting tube 1, and then exits toward the subject from the light emitting tube 1.

Of luminous flux emitted from the light emitting tube 1 toward the subject, luminous flux emitted upward on the sheet is refracted by an incident surface 6C of the prism (optical element) 6 and then totally reflected by a total reflection surface (parallel conversion optical action section) 6TR to form generally parallel luminous flux which then travels toward an exit surface of the prism 6.

Since the luminous flux emitted toward the upper right on the sheet from the light emitting tube 1 is redirected upward through the refraction by the incident surface 6C, the total reflection surface 6TR of the prism 6 can be of a small size.

Of the luminous flux emitted toward the subject from the light emitting tube 1, luminous flux emitted downward on the sheet acts in the same manner as the aforementioned luminous flux since the reflector plate 2 and the prism 6 are configured symmetrically about an optical axis AXL of the prism 6.

Of the luminous flux emitted toward the subject from the light emitting tube 1, light near the optical axis AXL is refracted by a cylindrical lens section (parallel conversion optical action section) 6R of the prism 6 to form generally parallel luminous flux which then travels toward the exit surface of the prism 6.

The reflector plate 2 covers a portion of the outer peripheral surface of the light emitting tube 1 opposite to the subject side (a direction in which illuminating light is irradiated) and a portion of the total reflection surface 6TR of the prism 6 near the optical axis where total reflection conditions are not satisfied.

The shape of the total reflection surface 6TR preferably has a cylindrical aspheric surface of or close to a parabolic shape for maintaining favorable parallelism of exiting luminous flux in FIGS. 9, 10, 13, and 14.

The cylindrical lens section 6R of the prism 6 is preferably formed with a hyperboloid in FIGS. 9, 10, 13, and 14, as in the first embodiment.

In this manner, all of the luminous flux emitted from the center of the light emitting tube 1 is converted into generally parallel luminous flux by the parallel conversion optical actions of the total reflection surface 6TR (reflector plate 2) of the prism 6 and the cylindrical lens section 6R.

The generally parallel luminous flux exits as it is toward the subject from a portion (where an exit plane section 6H is formed) of the cross section F shown in FIG. 10.

In FIG. 9, a plurality of cylindrical lens sections (first optical action sections) 6P with a converging action on generally parallel luminous flux incident thereon are formed on the exit surface of the prism 6 in the cross section E. In FIG. 9, in opposition to the cylindrical lens sections 6P, a lens plate 7 having a cylindrical lens section (second optical action section) 7N with a diverging action canceling out the refractivity of the lens sections 6P is disposed generally in close contact therewith.

In this state, since the convergence of the cylindrical lens sections 6P and the divergence of the cylindrical lens section 7N cancel each other out, generally parallel luminous flux incident on the cylindrical lens sections 6P exits generally as it is toward the subject from the lens plate 7.

As shown in FIGS. 11, 12, 15, and 16, in an intermediate portion in the left-right direction on the sheet on the exit surface of the prism 6, the aforementioned exit plane section 6H is formed to have a size overlaid with the two lens plates 7, 8. In peripheral portions at both ends in the left-right direction on the sheet on the exit surface of the prism 6, the aforementioned plurality of cylindrical lens sections 6P are formed to have a size overlaid with the respective lens plates 7, 8.

The lens plate 7 is slidingly movable in the left-right direction or longitudinal direction of the light emitting tube 1 between a position where the lens plate 7 totally overlies the left cylindrical lens sections 6P and a position where the lens plate 7 totally overlies the left half of the exit plane section 6H (a position where it does not overlie the cylindrical lens sections 6P at all). The lens plate 8 is slidingly movable in the left-right direction between a position where the lens plate 8 totally overlies the right cylindrical lens sections 6P and a position where the lens plate 8 totally overlies the right half of the exit plane section 6H (a position where it does not overlie the cylindrical lens sections 6P at all).

While a slide driving mechanism for the lens plates 7, 8 is not described in detail, it is possible to employ, for example, a mechanic feature for sliding the lens plates 7,8 associated with zooming of an optical system for taking pictures.

In FIGS. 11, 12 (FIGS. 9, 10), the cylindrical lens sections 6P with convergence are generally totally overlaid with the cylindrical lens sections 7N, 8N with divergence in the lens plates 7, 8 slid to the both ends in the left-right direction of the prism 6. In this state, as described in FIG. 9, since the cylindrical lens sections 6P are generally in close contact with the cylindrical lens sections 7N, 8N, generally parallel luminous flux incident on the cylindrical lens sections 6P exits as generally parallel luminous flux from the lens plate 7 (8) without being converged or diverged.

On the other hand, in FIG. 10, since the exit plane section 6H of the prism 6 inherently has no converging or diverging action, luminous flux incident on the exit plane section 6H exits as it is from the exit plane section 6H.

In this manner, in the state shown in FIGS. 9 to 12, luminous flux emitted from the center of the light emitting tube 1 exits from the overall exit surface of the lighting device without being spread out vertically on the sheet, that is, as generally parallel luminous flux.

When the lens plates 7, 8 are slid to the center of the prism 6 as shown in FIGS. 13, 14 (FIGS. 15, 16), the cylindrical lens sections 7N, 8N with divergence totally overlie the exit plane section 6H of the prism 6. In this state, as shown in FIG. 14, generally parallel luminous flux exiting from the exit plane section 6H of the prism 6 is diverged vertically on the sheet by the cylindrical lens section 7N (8N) with divergence.

On the other hand, in FIG. 13, since the lens plate 7 (8) is retracted from the front of the cylindrical lens sections 6P with convergence of the prism 6, luminous flux exiting from the cylindrical lens sections 6P is once condensed vertically on the sheet by the converging action of the cylindrical lens sections 6P, and then diverged.

In this manner, in the state shown in FIGS. 13 to 16, luminous flux emitted from the center of the light emitting tube 1 exits from the overall exit surface of the lighting device while being spread out vertically on the sheet.

As described above, in this embodiment, the lens plates 7, 8 are moved between the positions where they overlie the cylindrical lens sections 6P and the positions where they overlie the exit plane section 6H to change the area where the cylindrical lens sections 6P with convergence are overlaid with the cylindrical lens sections 7N, 8N with divergence (or the area of the region where luminous flux exiting from the lighting device is diverged or spread out) between zero and maximum. Thus, a light distribution angle of luminous flux exiting from the lighting device can be changed between the minimum light distribution angle for generally parallel luminous flux and the maximum light distribution angle for diverged luminous flux.

Figure 15:
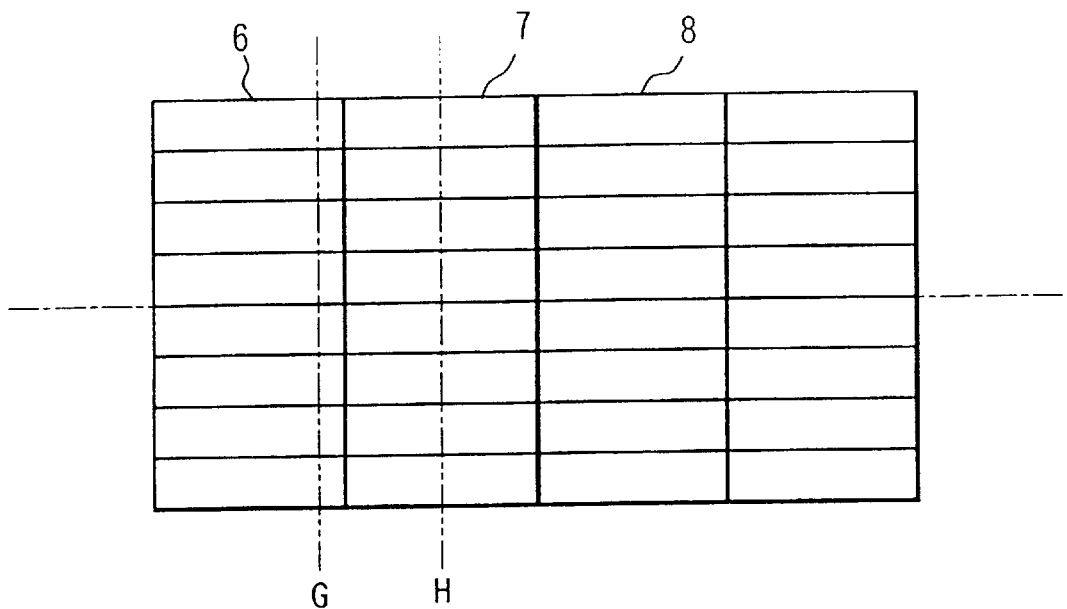
FIG. 15 is a front view of the lighting device according to the second embodiment in the wide light distribution angle state.
Figure 16:
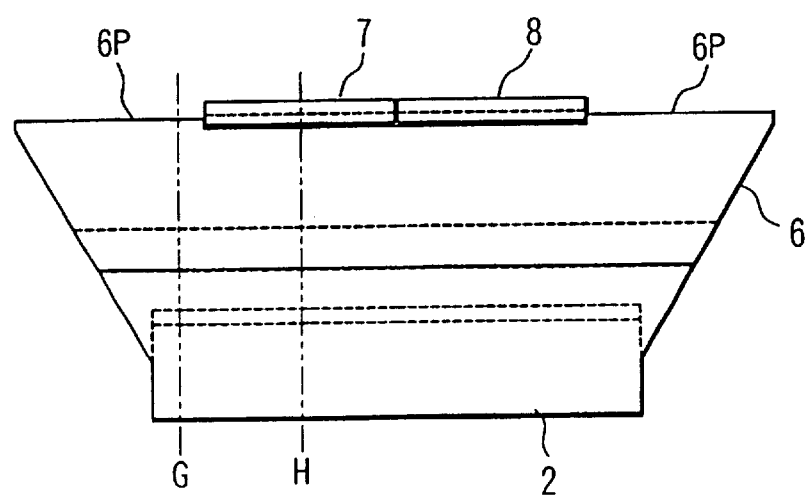
FIG. 16 is a bottom view of the lighting device according to the second embodiment in the wide light distribution angle state.

When the lens plates 7, 8 lie at the midpoint between the position shown in FIGS. 11, 12 and the position shown in FIGS. 15, 16, the area where the cylindrical lens sections 6P are overlaid with the cylindrical lens sections 7N, 8N is half of that in FIGS. 11, 12, thereby reducing to half the area of the region where exiting luminous flux is diverged or spread out vertically in the overall exit surface. The light distribution angle in the vertical direction is thus intermediate between the aforementioned minimum and maximum light distribution angles. Continuously changing the area where the cylindrical lens sections 6P are overlaid with the cylindrical lens sections 7N, 8N between zero and maximum can also change the light distribution angle continuously between the minimum and maximum.

With this configuration, when the optical system for taking pictures is a zoom optical system, an optimal light distribution angle of illuminating light can be obtained in accordance with a change of a focal length of the lens.

In the second embodiment, as compared with the first embodiment, the central portion of the prism 6 emitting a larger quantity of light than the peripheral portions is not covered with the lens plates 7, 8 at a narrow light distribution angle shown in FIGS. 9 to 12, so that loss of light quantity due to the surface reflection of the lens plates 7, 8 is reduced and a quantity of exiting light is increased as a whole, thereby allowing a higher guide number to be used.

Figure 17:
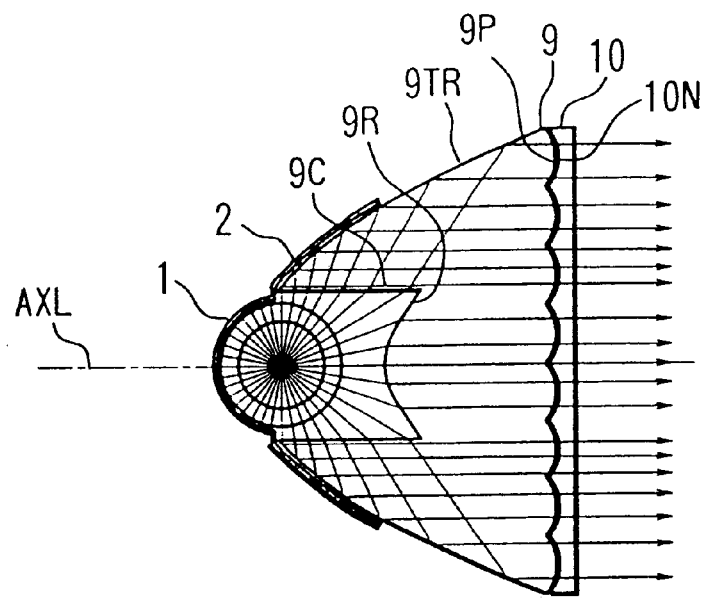
FIG. 17 is a cross section of a lighting device according to a third embodiment of the present invention in a narrow light distribution angle state.
Figure 18:
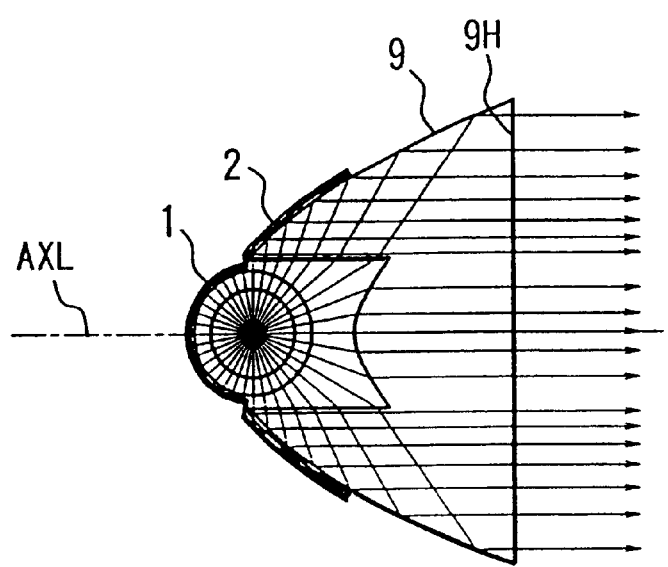
FIG. 18 is a cross section of the lighting device according to the third embodiment in the narrow light distribution angle state.
Figure 19:
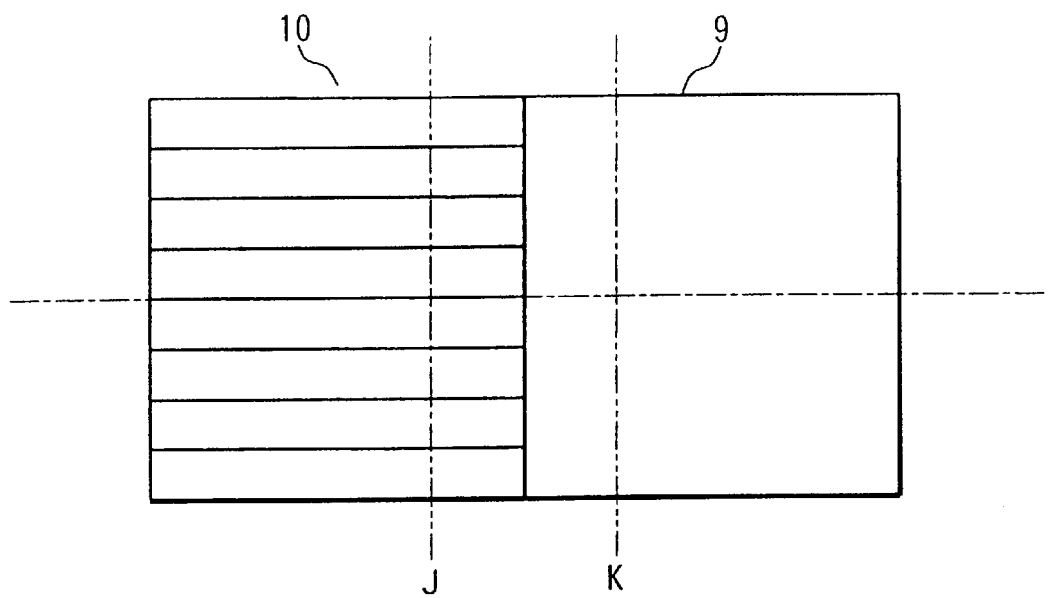
FIG. 19 is a front view of the lighting device according to the third embodiment in the narrow light distribution angle state.
Figure 20:
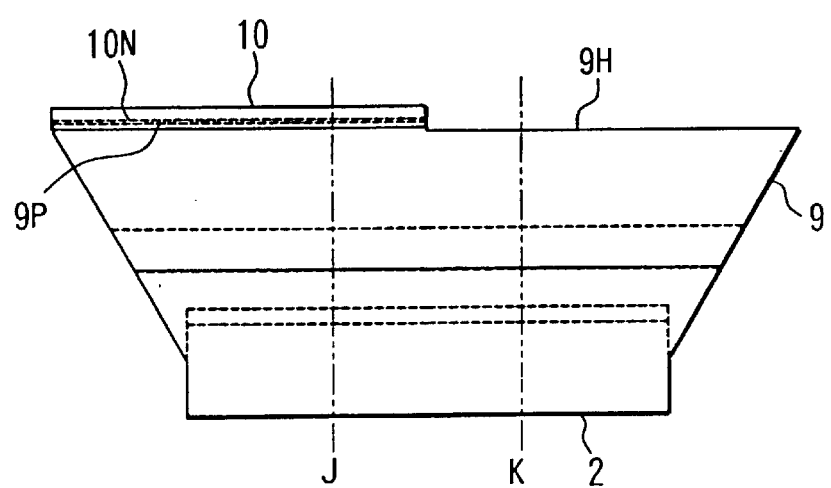
FIG. 20 is a bottom view of the lighting device according to the third embodiment in the narrow light distribution angle state.
Figure 21:
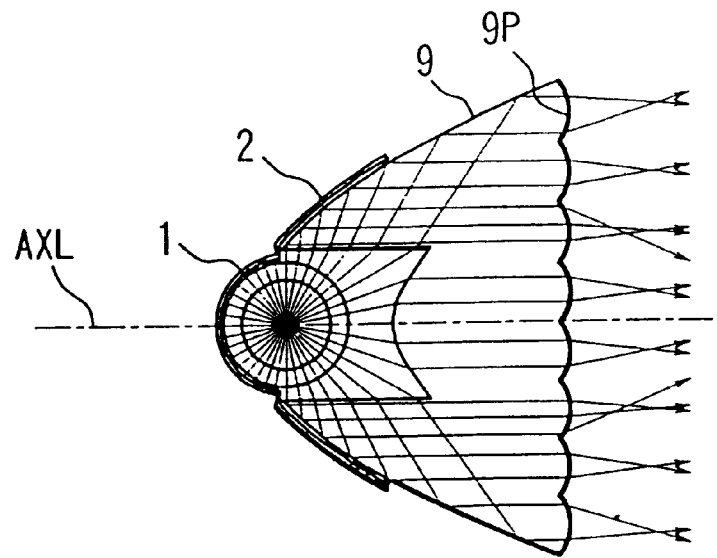
FIG. 21 is a cross section of the lighting device according to the third embodiment in a wide light distribution angle state.
Figure 22:
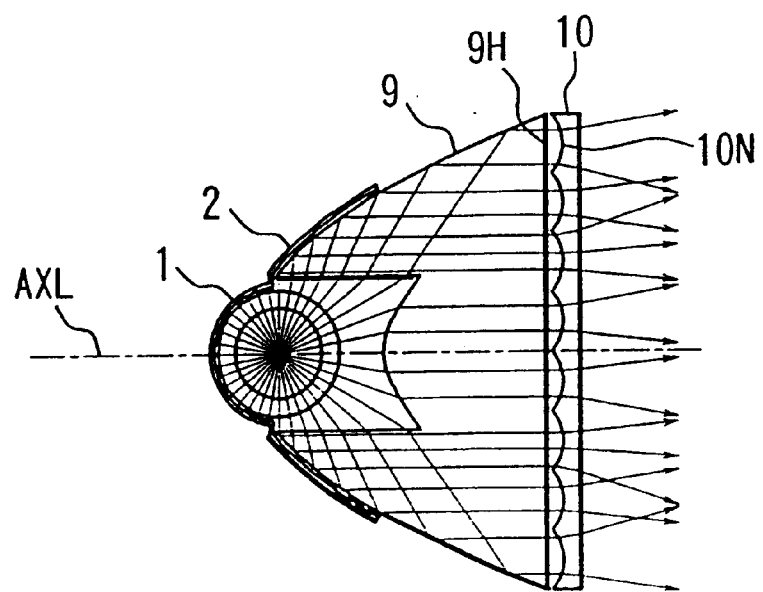
FIG. 22 is a cross section of the lighting device according to the third embodiment in the wide light distribution angle state.

FIGS. 17 to 24 illustrate the configuration and optical actions of a lighting device which is a third embodiment of the present invention. FIGS. 17 and 18 illustrate the lighting device in a narrow light distribution angle state and show cross sections taken along a line J and a line K in FIG. 19 (front view) and FIG. 20 (bottom view) which illustrate the same state, respectively. FIGS. 21 and 22 illustrate the lighting device in a wide light distribution angle state and show cross sections taken along a line L and a line M in FIG. 23 (front view) and FIG. 24 (bottom view) which illustrate the same state, respectively.

While the lighting device in this embodiment is essentially based on the same principle as the first and second embodiments, the former differs from the latter in the position and size of cylindrical lens sections 9P in a prism 9 used instead of the prisms 3, 6 in the first and second embodiments and the number of lens plates 10 used.

In FIGS. 17, 18, 21, and 22, of luminous flux emitted from an light emitting tube 1, light traveling to the left on the sheet opposite to a subject on the right hand on the sheet is reflected by a semicylindrical reflector plate 2 back to the light emitting tube 1, and then exits toward the subject from the light emitting tube 1.

Of luminous flux emitted from the light emitting tube 1 toward the subject, luminous flux emitted upward on the sheet is refracted by an incident surface 9C of the prism (optical element) 9 and then totally reflected by a total reflection surface (parallel conversion optical action section) 9TR to form generally parallel luminous flux which then travels toward an exit surface of the prism 9.

Since the luminous flux emitted toward the upper right on the sheet from the light emitting tube 1 is redirected upward through the refraction by the incident surface 9C, the total reflection surface 9TR of the prism 9 can be of a small size.

Of luminous flux emitted toward the subject from the light emitting tube 1, luminous flux emitted downward on the sheet acts in the same manner as the aforementioned luminous flux since the reflector plate 2 and the prism 9 are configured symmetrically about an optical axis AXL of the prism 9.

Of the luminous flux emitted toward the subject from the light emitting tube 1, light near the optical axis AXL is refracted by a cylindrical lens section (parallel conversion optical action section) 9R of the prism 9 to form generally parallel luminous flux which then travels toward the exit surface of the prism 9.

The reflector plate 2 covers a portion of the outer peripheral surface of the light emitting tube 1 opposite to the subject side (a direction in which illuminating light is irradiated) and a portion of the total reflection surface 9TR of the prism 9 near the optical axis where total reflection conditions are not satisfied.

The shape of the total reflection surface 9TR preferably has a cylindrical aspheric surface of or close to a parabolic shape for maintaining favorable parallelism of exiting luminous flux in FIGS. 17, 18, 21, and 22.

The cylindrical lens section 9R of the prism 9 is preferably formed with a hyperboloid in FIGS. 17, 18, 21, and 22, as in the first embodiment.

In this manner, all of the luminous flux emitted from the center of the light emitting tube 1 is converted into generally parallel luminous flux by the parallel conversion optical actions of the total reflection surface 9TR (reflector plate 2) of the prism 9 and the cylindrical lens section 9R.

The generally parallel luminous flux exits as it is toward the subject from a portion (where an exit plane section 9H is formed) of the cross section K shown in FIG. 18.

In FIG. 17, a plurality of cylindrical lens sections (first optical action sections) 9P with a converging action on generally parallel luminous flux incident thereon are formed on the exit surface of the prism 9 in the cross section J. In FIG. 17, in opposition to the cylindrical lens sections 9P, a lens plate 10 having cylindrical lens sections (second optical action section) 10N with a diverging action canceling out the refractivity of the lens sections 9P is disposed generally in close contact therewith.

In this state, since the convergence of the cylindrical lens sections 9P and the divergence of the cylindrical lens sections 10N cancel each other out, generally parallel luminous flux incident on the cylindrical lens sections 9P exits generally as it is toward the subject from the lens plate 10.

As shown in FIGS. 19, 20, 23, and 24, in the left half on the sheet on the exit surface of the prism 9, the aforementioned plurality of cylindrical lens sections 9P are formed to have a size overlaid with the lens plate 10. In the right half on the sheet on the exit surface of the prism 9, the aforementioned exit plane section 9H is formed to have a size overlaid with the lens plate 10.

The lens plate 10 is slidingly movable in the left-right direction or longitudinal direction of the light emitting tube 1 between a position where the lens plate 10 totally overlies the cylindrical lens sections 9P and a position where the lens plate 10 totally overlies the exit plane section 9H (a position where it does not overlie the cylindrical lens sections 9P at all).

While a slide driving mechanism for the lens plate 10 is not described in detail, it is possible to employ, for example, a mechanic feature for sliding the lens plate 10 associated with zooming of an optical system for taking pictures.

In FIGS. 19, 20 (FIGS. 17, 18), the cylindrical lens sections 9P with convergence are generally totally overlaid with the cylindrical lens sections 10N with divergence of the lens plate 10 slid to the left end of the prism 9. In this state, as described in FIG. 17, since the cylindrical lens sections 9P are generally in close contact with the cylindrical lens sections 10N, generally parallel luminous flux incident on the cylindrical lens sections 9P exits as generally parallel luminous flux from the lens plate 10 without being converged or diverged.

In FIG. 18, since the exit plane section 9H of the prism 9 inherently has no converging or diverging action, generally parallel luminous flux incident on the exit plane section 9H exits as it is from the exit plane section 9H.

In this manner, in the state shown in FIGS. 17 to 20, luminous flux emitted from the center of the light emitting tube 1 exits from the overall exit surface of the lighting device without being spread out vertically on the sheet, that is, as generally parallel luminous flux.

Figure 23:
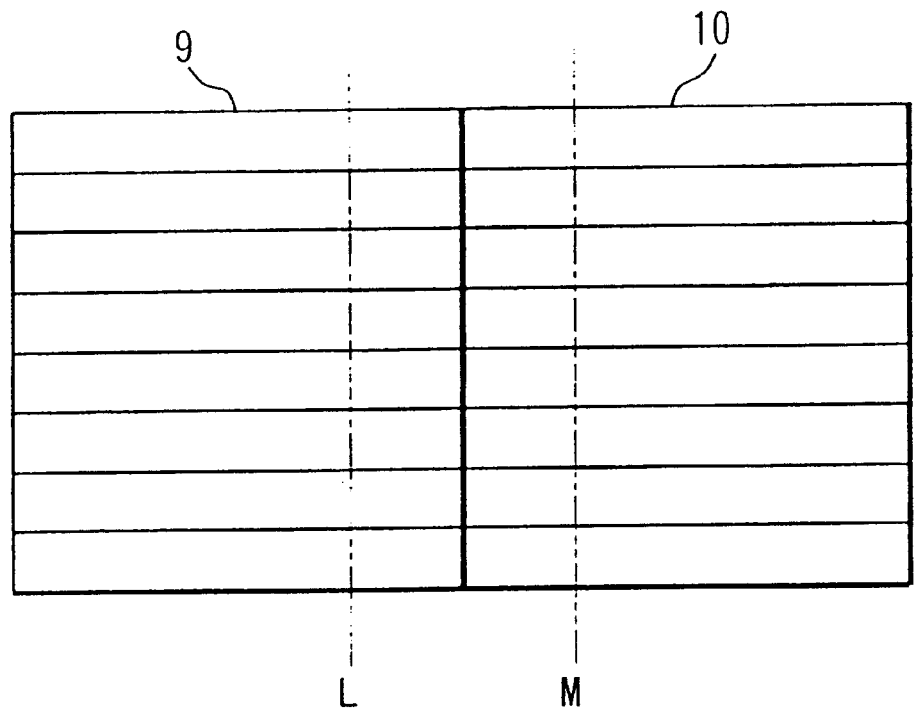
FIG. 23 is a front view of the lighting device according to the third embodiment in the wide light distribution angle state.
Figure 24:
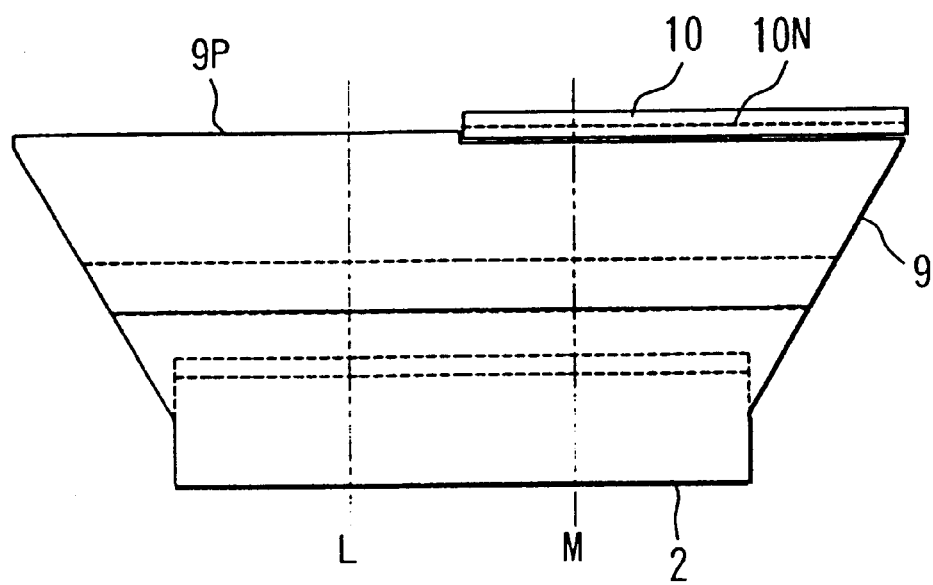
FIG. 24 is a bottom view of the lighting device according to the third embodiment in the wide light distribution angle state.

When the lens plate 10 is slid to the right end of the prism 9 as shown in FIGS. 23, 24 (FIGS. 21, 22), the cylindrical lens sections 10N with divergence totally overlie the exit plane section 9H of the prism 9. In this state, as shown in FIG. 22, generally parallel luminous flux exiting from the exit plane section 9H of the prism 9 is diverged vertically on the sheet by the cylindrical lens sections 10N with divergence.

On the other hand, in FIG. 21, since the lens plate 10 is retracted from the front of the cylindrical lens sections 9P with convergence of the prism 9, luminous flux exiting from the cylindrical lens sections 9P is once condensed vertically on the sheet by the converging action of the cylindrical lens sections 9P, and then diverged.

In this manner, in the state shown in FIGS. 21 to 24, luminous flux emitted from the center of the light emitting tube 1 exits from the overall exit surface of the lighting device while being spread out vertically on the sheet.

As described above, in this embodiment, the lens plate 10 is moved between the position where it overlies the cylindrical lens sections 9P and the position where it overlies the exit plane section 9H to change the area where the cylindrical lens sections 9P with convergence are overlaid with the cylindrical lens sections 10N with divergence (or the area of the region where luminous flux exiting from the lighting device is diverged or spread out) between zero and maximum. Thus, a light distribution angle of luminous flux exiting from the lighting device can be changed between the minimum light distribution angle for generally parallel luminous flux and the maximum light distribution angle for diverged luminous flux.

When the lens plate 10 lies at the midpoint between the position shown in FIGS. 19, 20 and the position shown in FIGS. 23, 24, the area where the cylindrical lens sections 9P are overlaid with the cylindrical lens sections 10N is half of that in FIGS. 19, 20, thereby reducing to half the area of the region where exiting luminous flux is diverged or spread out vertically in the overall exit surface. The light distribution angle in the vertical direction is thus intermediate between the aforementioned minimum and maximum light distribution angles. Continuously changing the area where the cylindrical lens sections 9P are overlaid with the cylindrical lens sections 10N between zero and maximum can also change the light distribution angle continuously between the minimum and maximum.

With this configuration, when the optical system for taking pictures is a zoom optical system, an optimal light distribution angle of illuminating light can be obtained in accordance with a change of a focal length of the lens.

In the third embodiment, as compared with the first and second embodiments, the single lens plate 10 having the plurality of cylindrical lens sections 10N with divergence allows a reduction in the number of parts to achieve reduced cost. In addition, since only one lens plate 10 is required to slidingly move, the slide driving mechanism for the lens plate can be simplified in structure as compared with the first and second embodiments in which the two lens plates are slidingly moved mutually in opposite directions.

Figure 25:
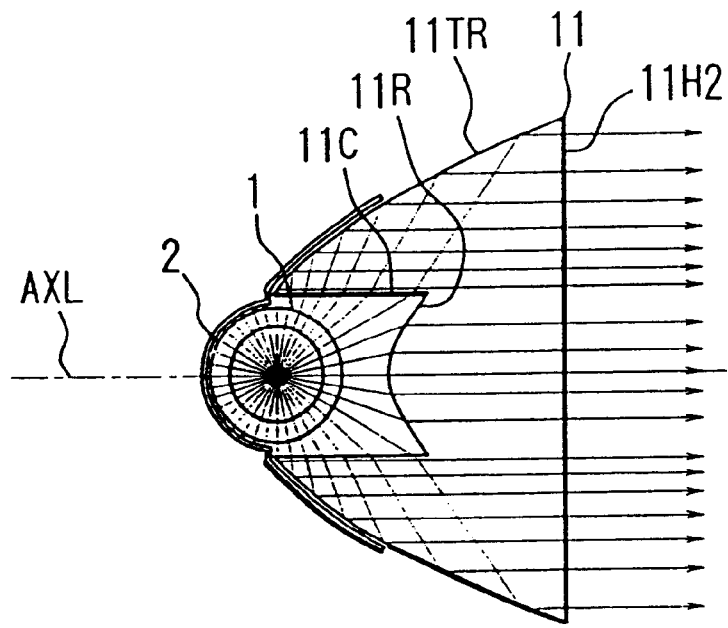
FIG. 25 is a cross section of a lighting device according to a fourth embodiment of the present invention in a narrow light distribution angle state.
Figure 26:
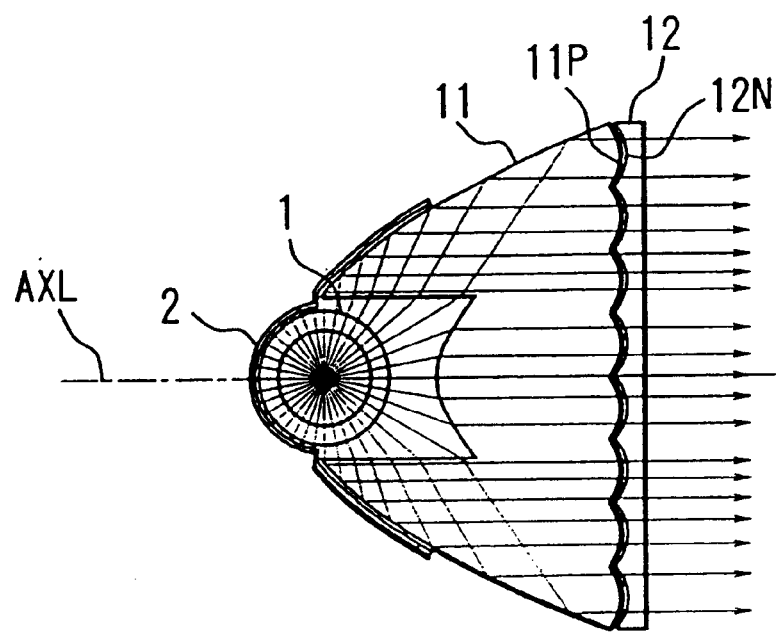
FIG. 26 is a cross section of the lighting device according to the fourth embodiment in the narrow light distribution angle state.
Figure 27:
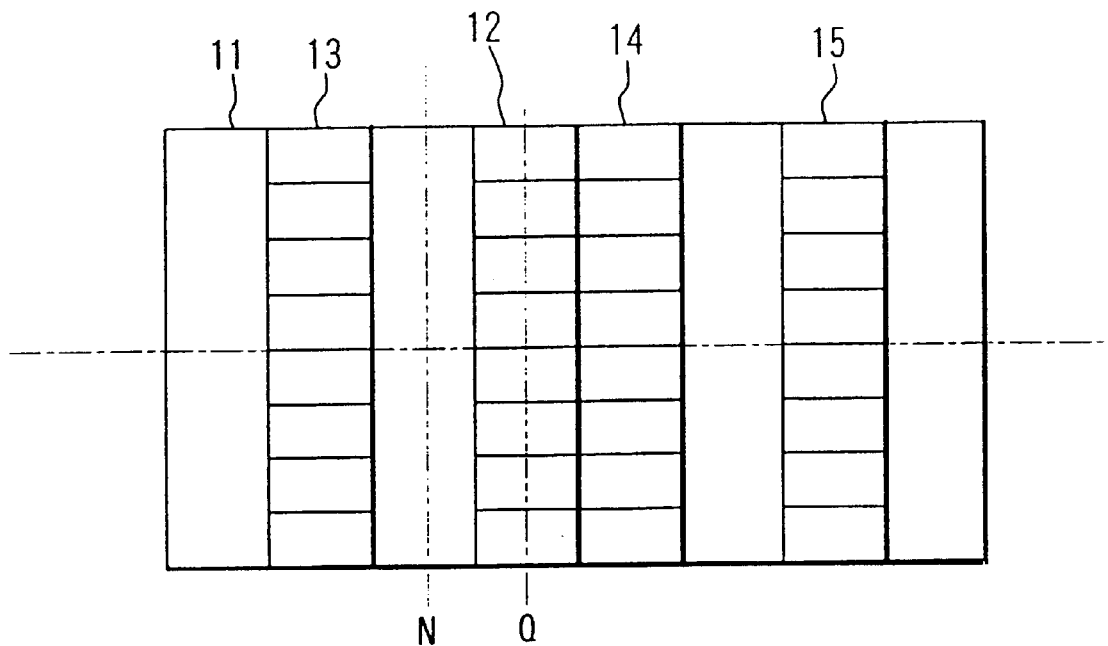
FIG. 27 is a front view of the lighting device according to the fourth embodiment in the narrow light distribution angle state.
Figure 28:
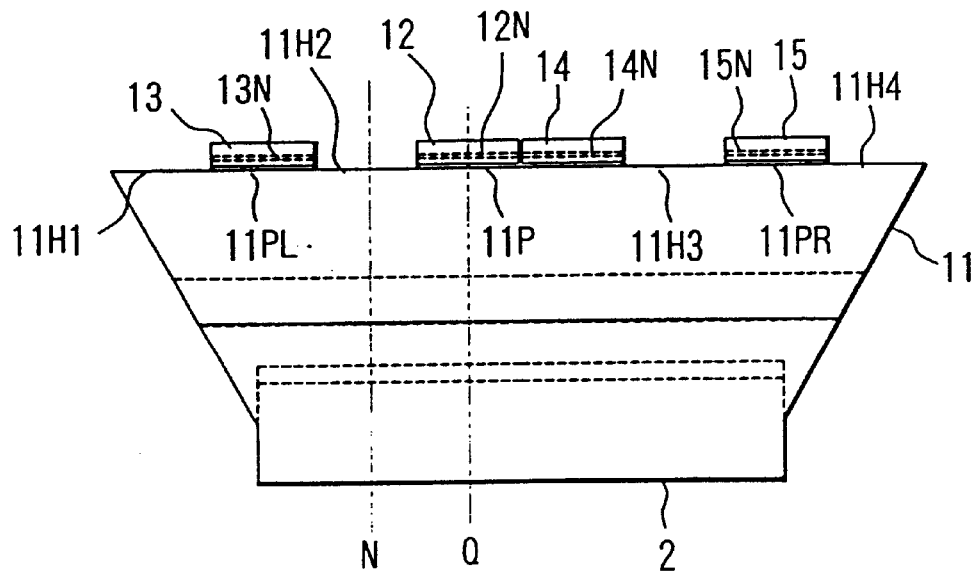
FIG. 28 is a bottom view of the lighting device according to the fourth embodiment in the narrow light distribution angle state.
Figure 29:
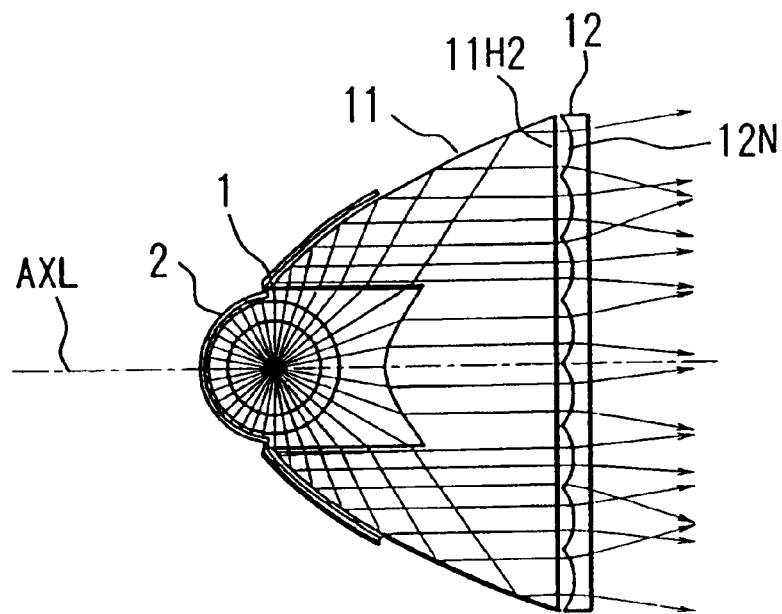
FIG. 29 is a cross section of the lighting device according to the fourth embodiment in a wide light distribution angle state.
Figure 30:
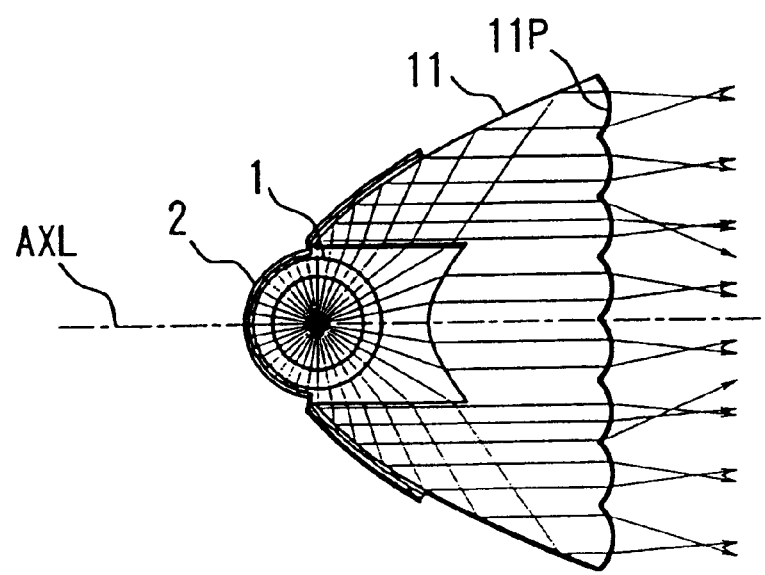
FIG. 30 is a cross section of the lighting device according to the fourth embodiment in the wide light distribution angle state.

FIGS. 25 to 32 illustrate the configuration and optical actions of a lighting device which is a fourth embodiment of the present invention. FIGS. 25 and 26 illustrate the lighting device in a narrow light distribution angle state and show cross sections taken along a line N and a line Q in FIG. 27 (front view) and FIG. 28 (bottom view) which illustrate the same state, respectively. FIGS. 29 and 30 illustrate the lighting device in a wide light distribution angle state and show cross sections taken along a line R and a line S in FIG. 31 (front view) and FIG. 32 (bottom view) which illustrate the same state, respectively.

While the lighting device in this embodiment is essentially based on the same principle as the first and second embodiments, the former differs from the latter in the position and the size of cylindrical lens sections 11P, 11PL, and 11PR in a prism 11 used instead of the prism 3 in the first embodiment and the number of lens plates 12 to 15 used.

In FIGS. 25, 26, 29, and 30, of luminous flux emitted from a light emitting tube 1, light traveling to the left on the sheet opposite to a subject on the right hand on the sheet is reflected by a semicylindrical reflector plate 2 back to the light emitting tube 1, and then exits toward the subject from the light emitting tube 1.

Of luminous flux emitted from the light emitting tube 1 toward the subject, luminous flux emitted upward on the sheet is refracted by an incident surface 11C of the prism (optical element) 11 and then totally reflected by a total reflection surface (parallel conversion optical action section) 11TR to form generally parallel luminous flux which then travels toward an exit surface of the prism 11.

Since the luminous flux emitted toward the upper right on the sheet from the light emitting tube 1 is redirected upward through the refraction by the incident surface 11C, the total reflection surface 11TR of the prism 11 can be of a small size.

Of the luminous flux emitted toward the subject from the light emitting tube 1, luminous flux emitted downward on the sheet acts in the same manner as the aforementioned luminous flux since the reflector plate 2 and the prism 11 are configured symmetrically about an optical axis AXL of the prism 11.

Of the luminous flux emitted toward the subject from the light emitting tube 1, light near the optical axis AXL is refracted by a cylindrical lens section (parallel conversion optical action section) 11R of the prism 11 to form generally parallel luminous flux which then travels toward the exit surface of the prism 11.

The reflector plate 2 covers a portion of the outer peripheral surface of the light emitting tube 1 opposite to the subject side (a direction in which illuminating light is irradiated) and a portion of the total reflection surface 11TR of the prism 11 near the optical axis where total reflection conditions are not satisfied.

The shape of the total reflection surface 11TR preferably has a cylindrical aspheric surface of or close to a parabolic shape for maintaining favorable parallelism of exiting luminous flux in FIGS. 25, 26, 29, and 30.

The cylindrical lens section 11R of the prism 11 is preferably formed with a hyperboloid in FIGS. 25, 26, 29, and 30, as in the first embodiment.

In this manner, all of the luminous flux emitted from the center of the light emitting tube 1 is converted into generally parallel luminous flux by the parallel conversion optical actions of the total reflection surface 11TR (reflector plate 2) of the prism 11 and the cylindrical lens section 11R.

The generally parallel luminous flux exits as it is toward the subject from a portion (where an exit plane section 11H2 is formed) of the cross section N shown in FIG. 25.

In FIG. 26, a plurality of cylindrical lens sections (first optical action sections) 11P with a converging action on generally parallel luminous flux incident thereon are formed on the exit surface of the prism 11 in the cross section Q. In FIG. 26, in opposition to the cylindrical lens sections 11P, a lens plate 12 having a cylindrical lens section (second optical action section) 12N with a diverging action canceling out the refractivity of the lens sections 11P is disposed generally in close contact therewith.

In this state, since the convergence of the cylindrical lens sections 11P and the divergence of the cylindrical lens section 12N cancel each other out, generally parallel luminous flux incident on the cylindrical lens sections 11P exits generally as it is toward the subject from the lens plate 12.

As shown in FIGS. 27, 28, 31, and 32, on the prism end in peripheral portions at both ends and intermediate portions in the left-right direction on the sheet on the exit surface of the prism 11, exit plane sections 11H1 to 11H4 are formed to have sizes overlaid with the four lens plates 12 to 15, respectively. In an intermediate portion in the left-right direction on the sheet on the exit surface of the prism 11, the aforementioned plurality of cylindrical lens sections 11P are formed to have a size overlaid with the two lens plates 12, 14.

In addition, the plurality of cylindrical lens sections 11PL, 11PR with convergence are formed to have sizes overlaid with the lens plates 13, 15, respectively, in the remaining portions on the exit surface of the prism 11.

The lens plates 12 to 15 are slidingly movable in the left-right direction or longitudinal direction of the light emitting tube 1 between positions where they totally overlie the cylindrical lens sections 11P, 11PL, and 11PR and positions where they totally overlie the exit plane sections 11H1 to 11H4 (positions where they do not overlie the cylindrical lens sections 11P, 11PL, and 11PR at all).

While a slide driving mechanism for the lens plates 12 to 15 is not described in detail, it is possible to employ, for example, a mechanic feature for sliding the lens plates 12 to 15 associated with zooming of an optical system for taking pictures.

In FIGS. 27, 28 (FIGS. 25, 26), the cylindrical lens sections 11P, 11PL, 11PR with convergence are generally totally overlaid with the cylindrical lens sections 12N to 15N with divergence in the lens plates 12 to 15. In this state, as described in FIG. 26, since the cylindrical lens sections 11P, 11PL, 11PR are generally in close contact with the cylindrical lens sections 12N to 15N, generally parallel luminous flux incident on the cylindrical lens sections 11P, 11PL, 11PR exits as generally parallel luminous flux from the lens plates 12 to 15 without being converged or diverged.

In FIG. 25, since the exit plane sections 11H1 to 11H4 of the prism 11 inherently have no converging or diverging action, luminous flux incident on the exit plane section 11H2 (11H1, 11H3, 11H4) exits as it is from the exit plane section 11H2 (11H1, 11H3, 11H4).

In this manner, in the state shown in FIGS. 25 to 28, luminous flux emitted from the center of the light emitting tube 1 exits from the overall exit surface of the lighting device without being spread out vertically on the sheet, that is, as generally parallel luminous flux.

Figure 31:
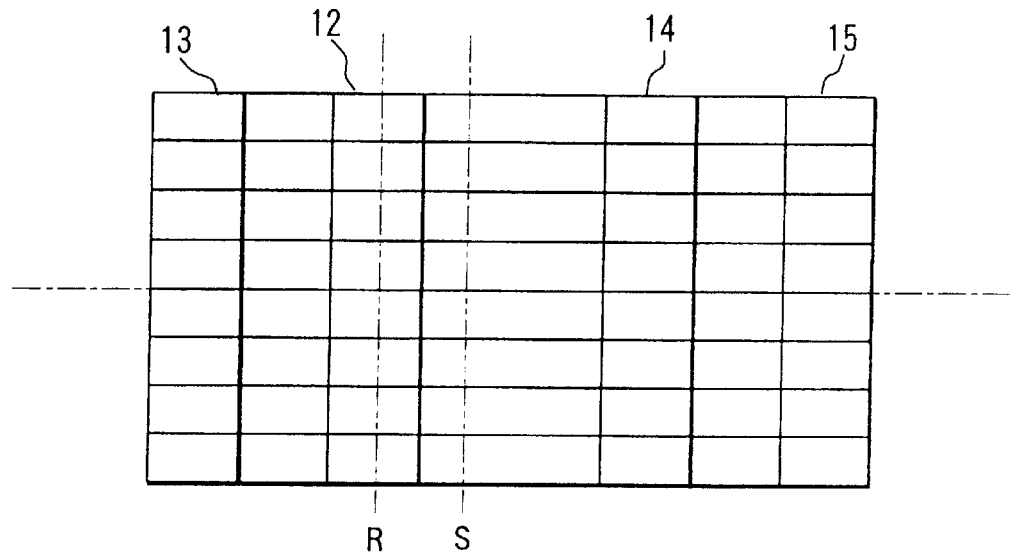
FIG. 31 is a front view of the lighting device according to the fourth embodiment in the wide light distribution angle state.
Figure 32:
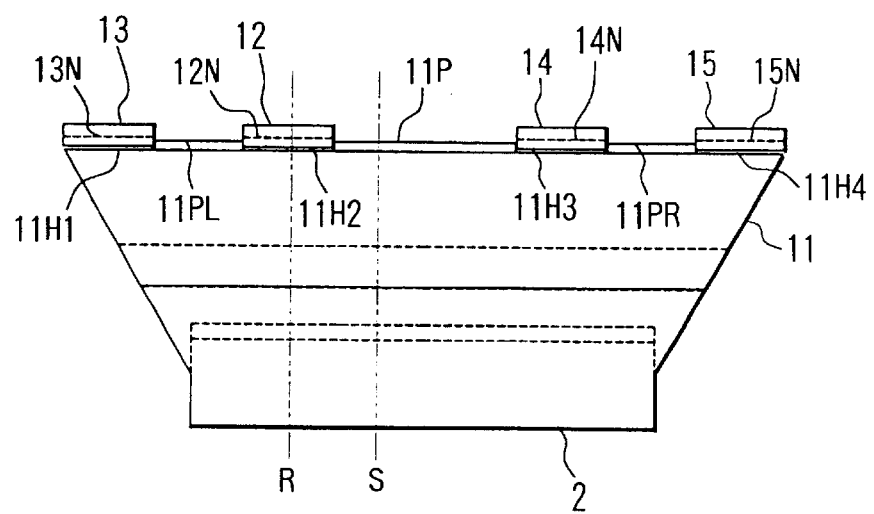
FIG. 32 is a bottom view of the lighting device according to the fourth embodiment in the wide light distribution angle state.

In the state shown in FIGS. 31, 32 (FIGS. 29, 30), the cylindrical lens sections 12N to 15N with divergence of the lens plates 12 to 15 totally overlie the exit plane sections 11H1 to 11H4 of the prism 11. In this state, as shown in FIG. 29, generally parallel luminous flux exiting from the exit plane section 11H2 (11H1, 11H3, 11H4) of the prism 11 is diverged vertically on the sheet by the cylindrical lens section 12N (13N to 15N) with divergence of the lens section 12 (13 to 15).

On the other hand, in FIG. 30, since the lens plate 12 (13, 14, 15) is retracted from the front of the cylindrical lens section 11P (11PL, 11PR) with convergence of the prism 11, luminous flux exiting from the cylindrical lens section 11P (11PL, 11PR) is once condensed vertically on the sheet by the converging action of the cylindrical lens section 11P (11PL, 11PR), and then diverged.

In this manner, in the state shown in FIGS. 25 to 28, luminous flux emitted from the center of the light emitting tube 1 exits from the overall exit surface of the lighting device while being spread out vertically on the sheet.

As described above, in this embodiment, the lens plates 12 to 15 are moved between the positions where they overlie the cylindrical lens sections 11P, 11PL, 11PR and the positions where they overlie the exit plane sections 11H1 to 11H4 to change the area where the cylindrical lens sections 11P, 11PL, 11PR with convergence are overlaid with the cylindrical lens sections 12N to 15N with divergence (or the area of the region where luminous flux exiting from the lighting device is diverged or spread out) between zero and maximum. Thus, a light distribution angle of luminous flux exiting from the lighting device can be changed between the minimum light distribution angle for generally parallel luminous flux and the maximum light distribution angle for diverged luminous flux.

When the lens plates 12 to 15 lie at the midpoint between the position shown in FIGS. 27, 28 and the position shown in FIGS. 31, 32, the area where the cylindrical lens sections 11P, 11PL, 11PR are overlaid with the cylindrical lens sections 12N to 15N is half of that in FIGS. 27, 28, thereby reducing to half the area of the region where exiting luminous flux is diverged or spread out vertically in the overall exit surface. The light distribution angle in the vertical direction is thus intermediate between the aforementioned minimum and maximum light distribution angles. Continuously changing the area where the cylindrical lens sections 11P, 11PL, 11PR are overlaid with the cylindrical lens sections 12N to 15N between zero and maximum can also change the light distribution angle continuously between the minimum and maximum.

With this configuration, when the optical system for taking pictures is a zoom optical system, an optimal light distribution angle of illuminating light can be obtained in accordance with a change of a focal length of the lens.

In the fourth embodiment, as compared with the first and second embodiments in which the two separate lens plates are used, the four separate lens plates 12 to 15 allows a reduction in the amount of movement of the lens plates. Consequently, the slide driving mechanism can be reduced in size.

Figure 33:
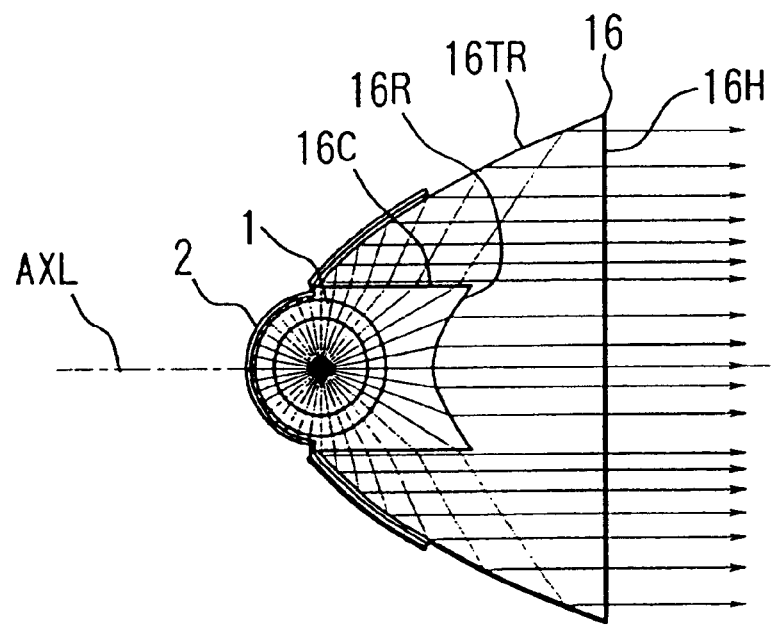
FIG. 33 is a cross section of a lighting device according to a fifth embodiment of the present invention in a narrow light distribution angle state.
Figure 34:
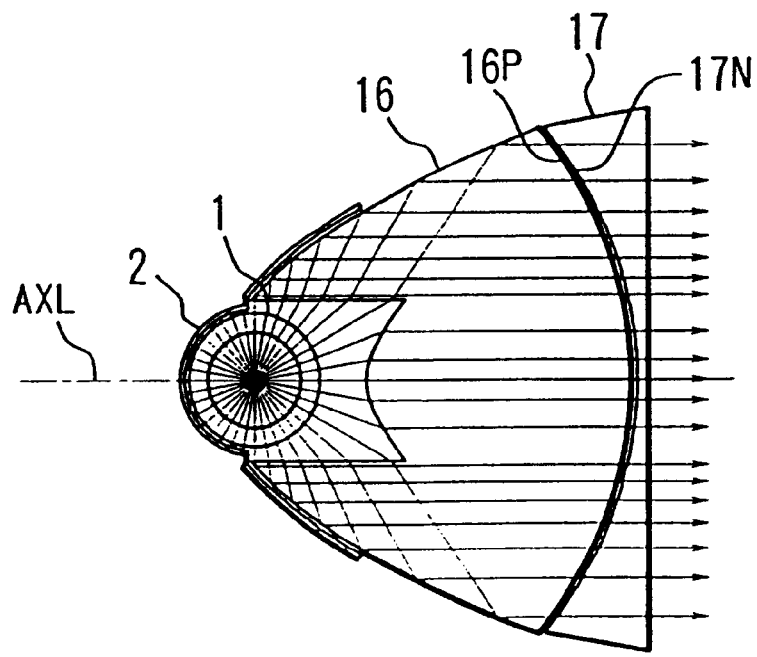
FIG. 34 is a cross section of the lighting device according to the fifth embodiment in the narrow light distribution angle state.
Figure 35:
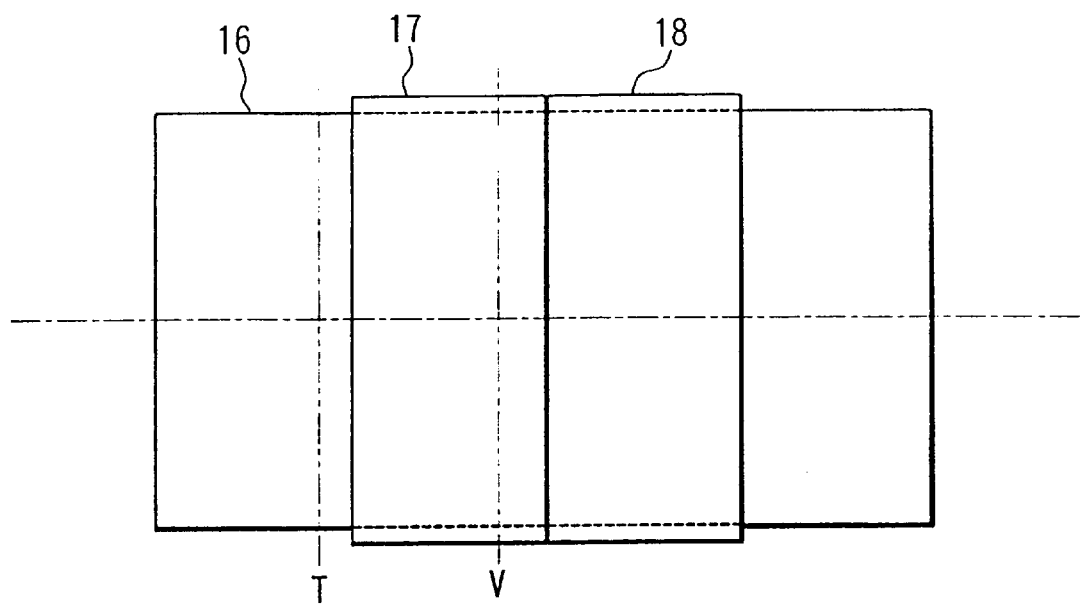
FIG. 35 is a front view of the lighting device according to the fifth embodiment in the narrow light distribution angle state.
Figure 36:
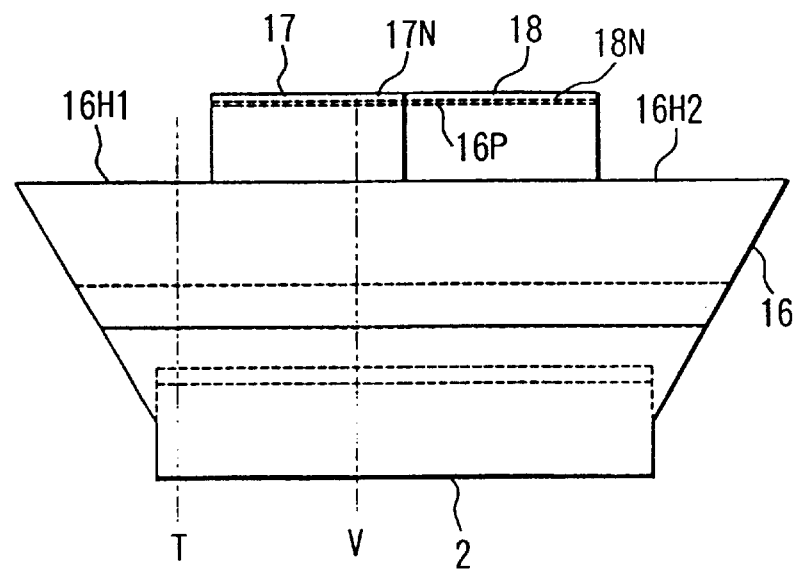
FIG. 36 is a bottom view of the lighting device according to the fifth embodiment in the narrow light distribution angle state.
Figure 37:
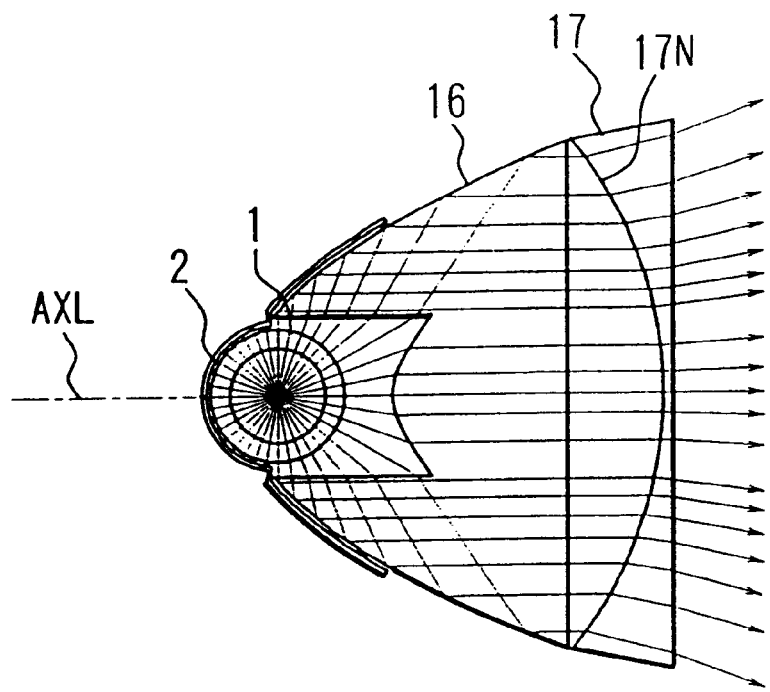
FIG. 37 is a cross section of the lighting device according to the fifth embodiment in a wide light distribution angle state.
Figure 38:
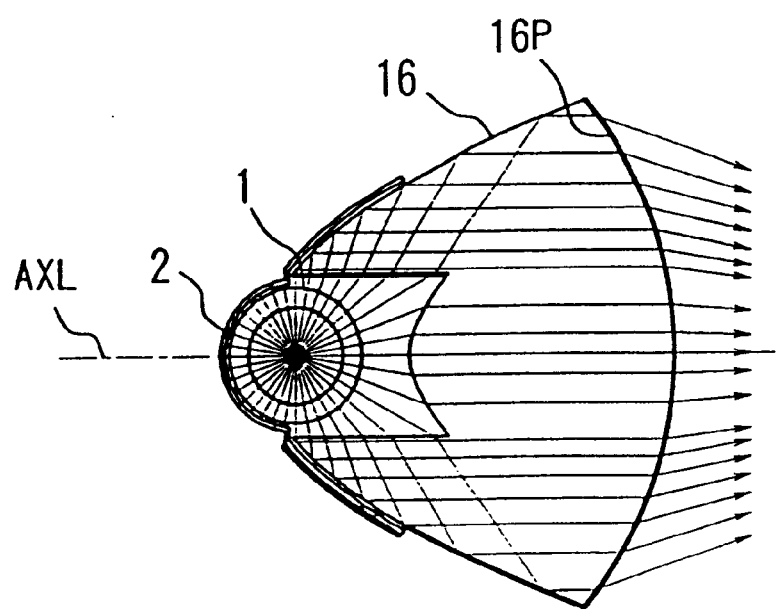
FIG. 38 is a cross section of the lighting device according to the fifth embodiment in the wide light distribution angle state.

FIGS. 33 to 40 illustrate the configuration and optical actions of a lighting device which is a fifth embodiment of the present invention. FIGS. 33 and 34 illustrate the lighting device in a narrow light distribution angle state and show cross sections taken along a line T and a line V in FIG. 35 (front view) and FIG. 36 (bottom view) which illustrate the same state, respectively. FIGS. 37 and 38 illustrate the lighting device in a wide light distribution angle state and show cross sections taken along a line W and a line X in FIG. 39 (front view) and FIG. 40 (bottom view) which illustrate the same state, respectively.

In FIGS. 33, 34, 37, and 38, of luminous flux emitted from an light emitting tube 1, light traveling to the left on the sheet opposite to a subject on the right hand on the sheet is reflected by a semicylindrical reflector plate 2 back to the light emitting tube 1, and then exits toward the subject from the light emitting tube 1.

Of luminous flux emitted from the light emitting tube 1 toward the subject, luminous flux emitted upward on the sheet is refracted by an incident surface 16C of a prism (optical element) 16 and then totally reflected by a total reflection surface (parallel conversion optical action section) 16TR to form generally parallel luminous flux which then travels toward an exit surface of the prism 16.

Since the luminous flux emitted toward the upper right on the sheet from the light emitting tube 1 is redirected upward through the refraction by the incident surface 16C, the total reflection surface 16TR of the prism 16 can be of a small size.

Of the luminous flux emitted toward the subject from the light emitting tube 1, luminous flux emitted downward on the sheet acts in the same manner as the aforementioned luminous flux since the reflector plate 2 and the prism 16 are configured symmetrically about an optical axis AXL of the prism 16.

Of the luminous flux emitted toward the subject from the light emitting tube 1, light near the optical axis AXL is refracted by a cylindrical lens section (parallel conversion optical action section) 16R of the prism 16 to form generally parallel luminous flux which then travels toward the exit surface of the prism 16.

The reflector plate 2 covers a portion of the outer peripheral surface of the light emitting tube 1 opposite to the subject side (a direction in which illuminating light is irradiated) and a portion of the total reflection surface 16TR of the prism 16 near the optical axis where total reflection conditions are not satisfied.

The shape of the total reflection surface 16TR preferably has a cylindrical aspheric surface of or close to a parabolic shape for maintaining favorable parallelism of exiting luminous flux in FIGS. 33, 34, 37, and 38.

The cylindrical lens section 16R of the prism 16 is preferably formed with a hyperboloid in FIGS. 33, 34, 37, and 38, as in the first embodiment.

In this manner, all of the luminous flux emitted from the center of the light emitting tube 1 is converted into generally parallel luminous flux by the parallel conversion optical actions of the total reflection surface 16TR (reflector plate 2) of the prism 16 and the cylindrical lens section 16R.

The generally parallel luminous flux exits as it is toward the subject from a portion (where an exit plane section 16H1 is formed) of the cross section T shown in FIG. 33.

In FIG. 34, a convex cylindrical lens section (first optical action section) 16P with a converging action on generally parallel luminous flux incident thereon is formed on the exit surface of the prism 16 in the cross section V. In FIG. 34, in opposition to the convex cylindrical lens section 16P, a lens plate 17 having a concave cylindrical lens section (second optical action section) 17N with a diverging action canceling out the refractivity of the lens section 16P is disposed generally in close contact therewith.

In this state, since the convergence of the convex cylindrical lens section 16P and the divergence of the concave cylindrical lens section 17N cancel each other out, generally parallel luminous flux incident on the convex cylindrical lens section 16P exits generally as it is toward the subject from the lens plate 17.

As shown in FIGS. 35, 36, 39, and 40, in peripheral portions at both ends in the left-right direction on the sheet on the exit surface of the prism 16, the aforementioned exit plane section 16H1 and an exit plane section 16H2 are formed to have a size overlaid with the lens plate 17 and a lens plate 18 formed in the same shape as the lens plate 17, respectively. The aforementioned convex cylindrical lens section 16P is formed to have a size overlaid with the two lens plates 17, 18 between both peripheral portions on the exit surface of the prism 16.

In addition, the lens plates 17, 18 are slidingly movable in the left-right direction or longitudinal direction of the light emitting tube 1 between positions where they totally overlie the convex cylindrical lens section 16P and positions where they totally overlies the exit plane section 16H1, 16H2 (positions where they do not overlie the convex cylindrical lens section 16P at all).

While a slide driving mechanism for the lens plates 17 and 18 is not described in detail, it is possible to employ, for example, a mechanic feature for sliding the lens plates 17, 18 associated with zooming of an optical system for taking pictures.

In FIGS. 35, 36 (FIGS. 33, 34), the convex cylindrical lens section 16P with convergence is totally overlaid with the concave cylindrical lens sections 17N, 18N with divergence in the lens plates 17, 18 slid to the center side of the prism 16. In this state, since the convex cylindrical lens section 16P is overlaid with the concave cylindrical lens sections 17N, 18N generally in close contact, generally parallel luminous flux incident on the convex cylindrical lens section 16P exits as generally parallel luminous flux from the lens plate 17 (18) without being converged or diverged.

In FIG. 33, since the exit plane section 16H of the prism 16 inherently has no converging or diverging action, luminous flux incident on the exit plane section 16H exits as it is from the exit plane section 16H.

In this manner, in the state shown in FIGS. 33 to 36, luminous flux emitted from the center of the light emitting tube 1 exits from the overall exit surface of the lighting device without being spread out vertically on the sheet, that is, as generally parallel luminous flux.

Figure 39:
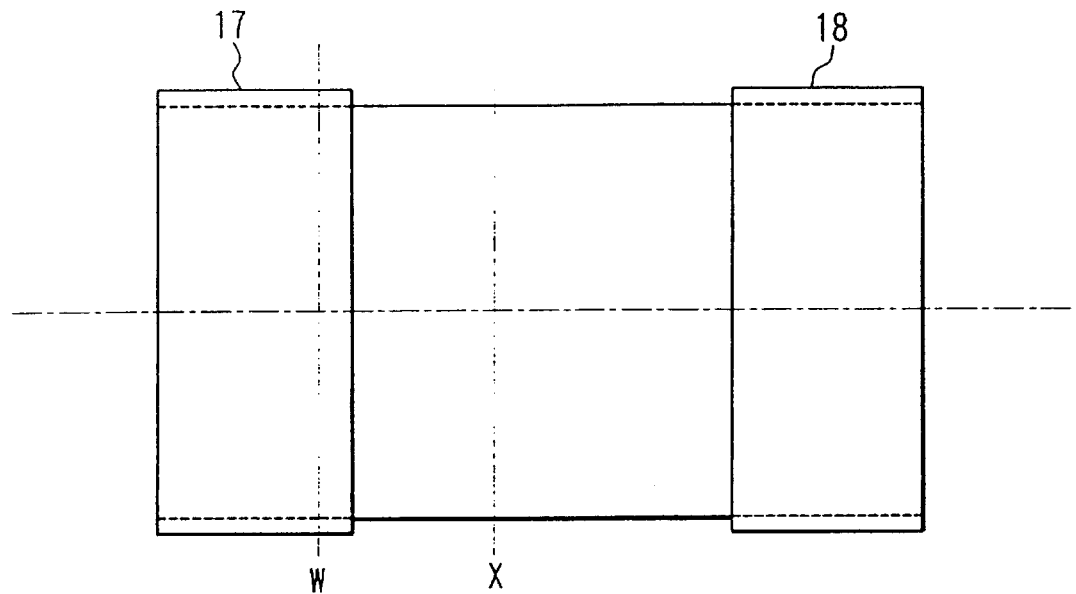
FIG. 39 is a front view of the lighting device according to the fifth embodiment in the wide light distribution angle state.
Figure 40:
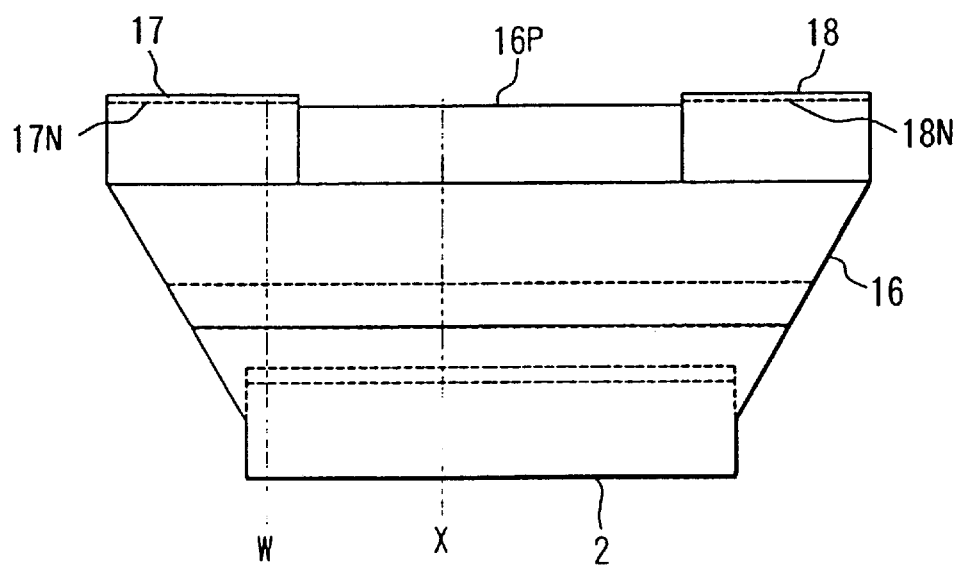
FIG. 40 is a bottom view of the lighting device according to the fifth embodiment in the wide light distribution angle state.

When the lens plates 17, 18 are slid to left and right ends of the prism 16 as shown in FIGS. 39, 40 (FIGS. 37, 38), the concave cylindrical lens sections 17N, 18N with divergence totally overlie the exit plane sections 16H1, 16H2 of the prism 16, respectively. In this state, as shown in FIG. 37, generally parallel luminous flux exiting from the exit plane section 16H1 (16H2) of the prism 16 is diverged vertically on the sheet by the concave cylindrical lens section 17N (18N) with divergence.

On the other hand, in FIG. 38, since the lens plates 17, 18 are retracted from the front of the convex cylindrical lens section 16P with convergence of the prism 16, luminous flux exiting from the convex cylindrical lens section 16P is once condensed vertically on the sheet by the converging action of the convex cylindrical lens section 16P, and then diverged.

In this manner, in the state shown in FIGS. 37 to 40, luminous flux emitted from the center of the light emitting tube 1 exits from the overall exit surface of the lighting device while being spread out vertically on the sheet.

As described above, in this embodiment, the lens plates 17, 18 are moved between the positions where they overlie the convex cylindrical lens section 16P and the positions where they overlie the exit plane sections 16H1, 16H2 to change the area where the convex cylindrical lens section 16P with convergence is overlaid with the concave cylindrical lens sections 17N, 18N with divergence (or the area of the region where luminous flux exiting from the lighting device is diverged or spread out) between zero and maximum. Thus, a light distribution angle of luminous flux exiting from the lighting device can be changed between the minimum light distribution angle for generally parallel luminous flux and the maximum light distribution angle for diverged luminous flux.

When the lens plates 17, 18 lie at the midpoint between the position shown in FIGS. 35, 36 and the position shown in FIGS. 39, 40, the area where the convex cylindrical lens section 16P is overlaid with the concave cylindrical lens sections 17N, 18N is half of that in FIGS. 35, 36, thereby reducing to half the area of the region where exiting luminous flux is diverged or spread out vertically in the overall exit surface. The light distribution angle in the vertical direction is thus intermediate between the aforementioned minimum and maximum light distribution angles. Continuously changing the area where the convex cylindrical lens section 16P is overlaid with the concave cylindrical lens sections 17N, 18N between zero and maximum can also change the light distribution angle continuously between the minimum and maximum.

With this configuration, when the optical system for taking pictures is a zoom optical system, an optimal light distribution angle of illuminating light can be obtained in accordance with a change of a focal length of the lens.

In the fifth embodiment, as compared with the first to fourth embodiments, the shapes of the cylindrical lens sections 16P, 17N, and 18N are simpler than those in the first to fourth embodiments to present an advantage of readily fabricating the lens sections.

While each of the aforementioned embodiments has been described for the cylindrical lens section with convergence or divergence formed on the prism or the lens plate, a cylindrical Fresnel lens section may be formed instead of the cylindrical lens section to reduce thickness.

In addition, while each of the aforementioned embodiments has been described for the cylindrical lens section with convergence formed on the prism and the cylindrical lens section with divergence formed on the movable lens plate, it is possible to form a cylindrical lens section with divergence on a prism and to form a cylindrical lens section with convergence on a movable lens plate.

The prism and the lens plate are preferably made from a transparent resin such as acrylic or molded glass with favorable visible light transmittance in each of the aforementioned embodiments. Those components, however, may be made from another material.

While each of the aforementioned embodiments has been described for a narrow light distribution angle obtained by causing generally parallel luminous flux converted through the prism to exit as it is as luminous flux for illumination, the present invention is not limited thereto. For example, a narrow light distribution angle may be obtained by emitting diverged luminous flux from a light source to a first optical action section of a prism and changing the diverged light into generally parallel luminous flux through a condensing action of the first optical action section.

In addition, while each of the aforementioned embodiments has been described for the lighting device (electric flash device) for use in a camera, it is thought that the present invention can have a number of applications, as a lighting device with variable irradiation areas of illuminating light, including a lighting device for indoor use or a communication device with a flash capable of changing an illuminating range.

In all the embodiments of the present invention described up to now, the shapes of the first optical action section and the second optical action section may be defined such that the maximum deviation angle is 10 degrees or more when parallel light is incident on the first optical action section and the second optical action section, for obtaining sufficient variations in light distribution.

More preferably, the shapes of the first optical action section and the second optical action section may be defined such that the maximum deviation angle is 15 degrees or more.

As described above, according to these embodiments, since a light distribution angle is varied by changing the area where the first optical action section having one of a condensing action and a diverging action is overlaid with the second optical action section having the other of the actions in the optical axis direction, a change in the light distribution angle does not require movement of one of the light source and the irradiation lens with respect to the other in the optical axis direction, thereby making it possible to achieve a reduced size of the first and second optical action sections corresponding to the irradiation lens and thus a reduced size of the entire lighting device.

Especially, since luminous flux from the light source is converted into generally parallel luminous flux by the parallel conversion optical action sections and then guided to the aforementioned first and second optical action sections, luminous flux for illumination also can exit as generally parallel luminous flux when the first and second optical action sections totally overlap each other in the optical axis direction. It is thus possible to obtain a sufficiently narrow light distribution angle.

Therefore, when the lighting device of the aforementioned embodiments is used as a zoom electronic flash for a picture taking device, a small electronic flash can be realized with a very high guide number used for a narrow light distribution angle and favorable illumination efficiency.

The relative movement of the first and second optical action sections in the longitudinal direction of the light source to change the overlapping area allows relative movement of the first and second optical action sections such that they do not extend off the irradiation area of the lighting device. Thus, a reduction in size of the lighting device is not obstructed.

In addition, especially when the first and second optical action sections are formed of cylindrical lenses with refractivity of different signs, both optical action sections can be moved generally in close contact along the longitudinal direction of the cylindrical lenses, which leads to a further reduction in size and advantageously ensures optical performance such as the cancellation of the condensing action and diverging action.

FIGS. 41 to 46 illustrate a lighting device (hereinafter called "flash emission device") with variable irradiation angles according to a further embodiment of the present invention.

Figure 41:
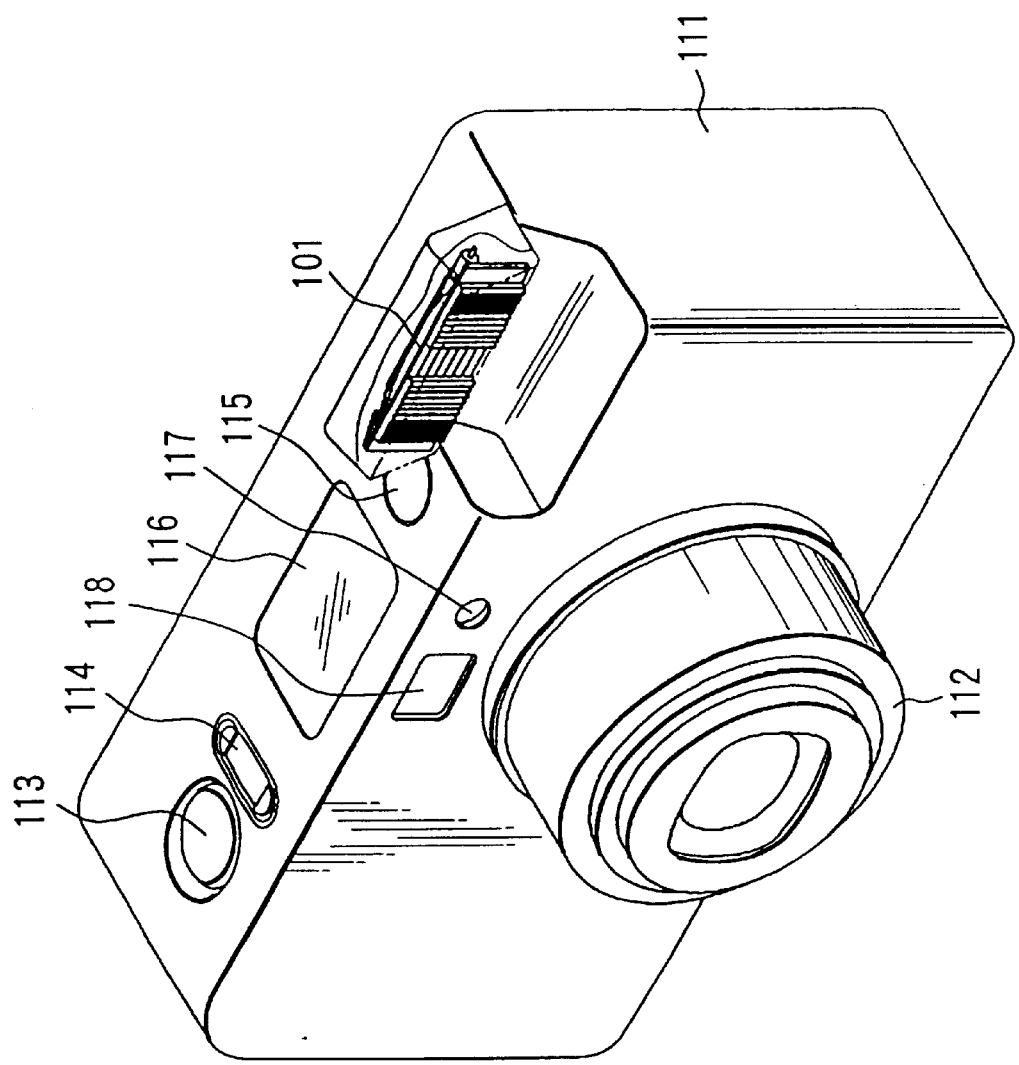
FIG. 41 is a perspective view showing the appearance of a camera to which a flash emission device is applied according to another embodiment of the present invention.
Figure 42:
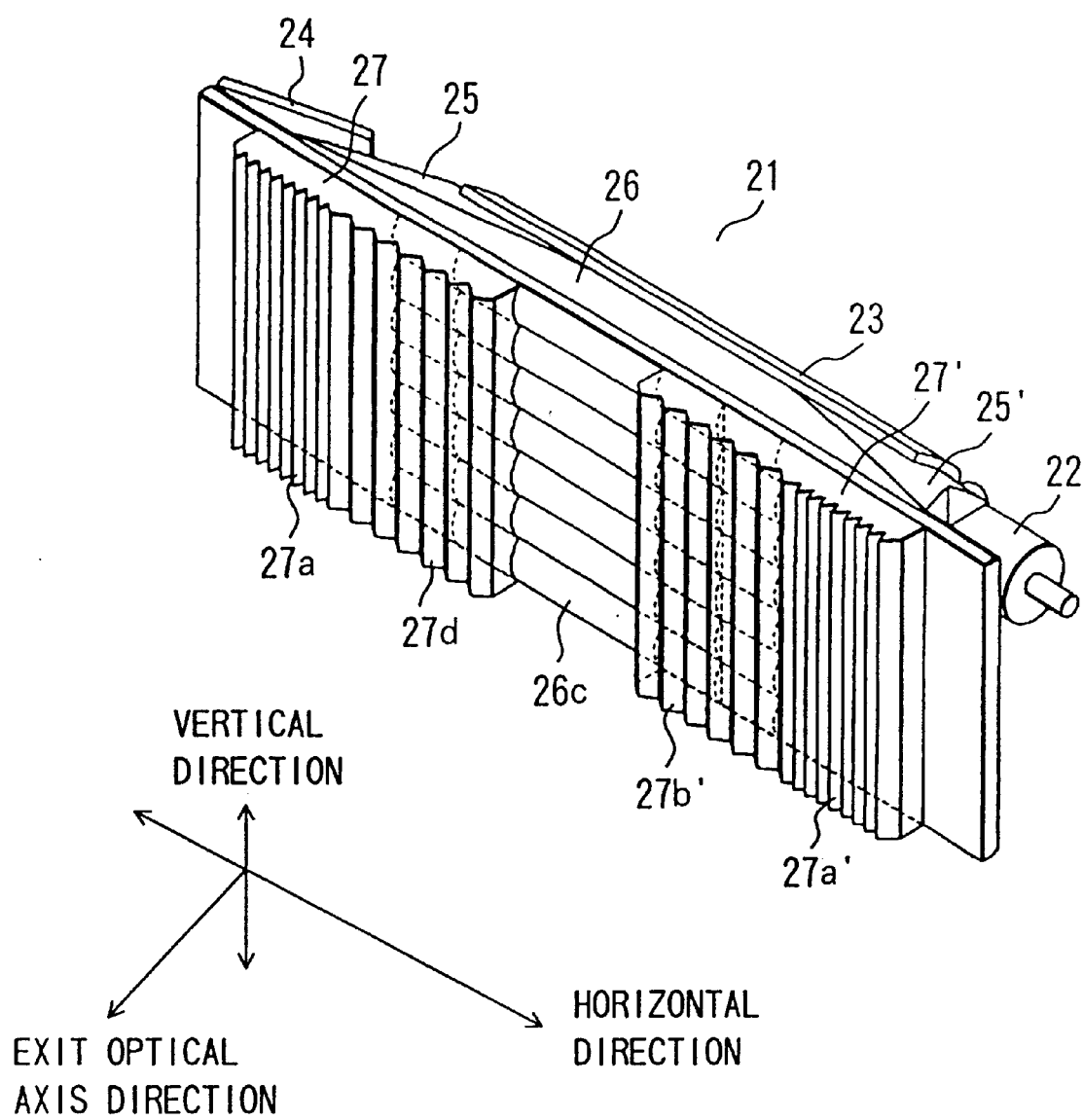
FIG. 42 is a perspective view of the essentials showing an optical system of the flash emission device of the embodiment shown in FIG. 41.
Figure 43:
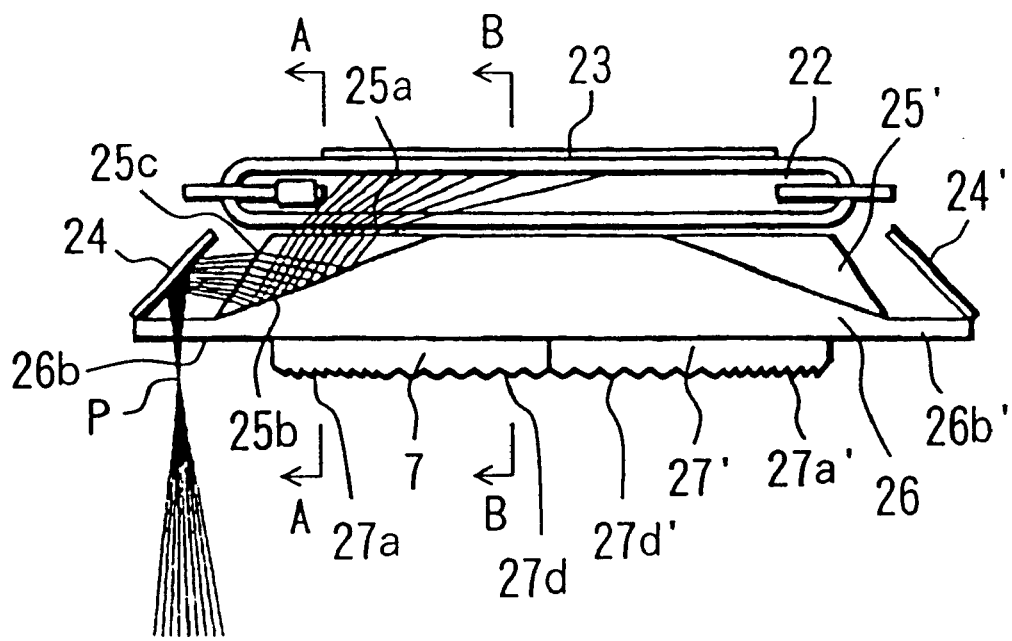
FIGS. 43(a) to 43(d) are horizontal sectional views showing the flash emission device of the embodiment shown in FIG. 42 when a narrow irradiation angle is provided.
Figure 43:
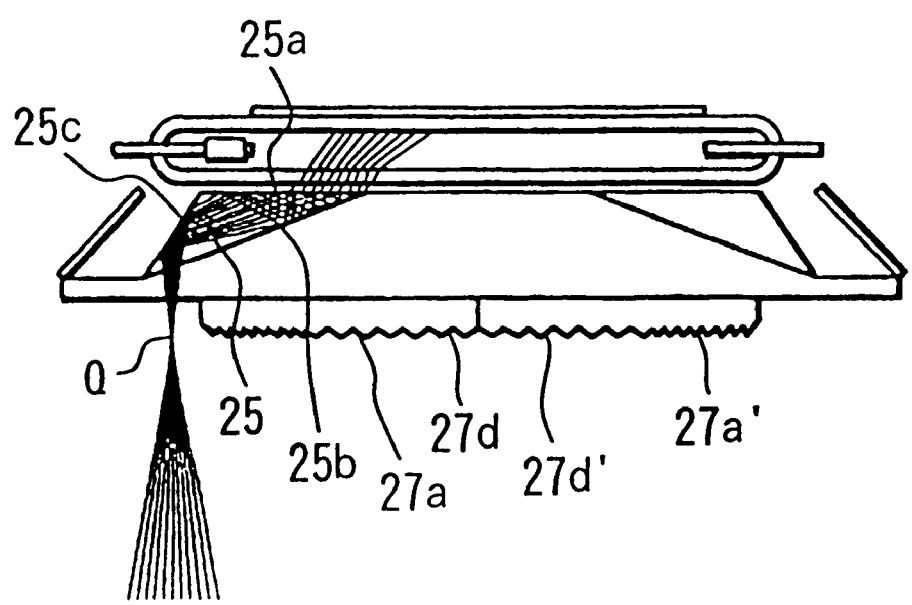
Figure 43:
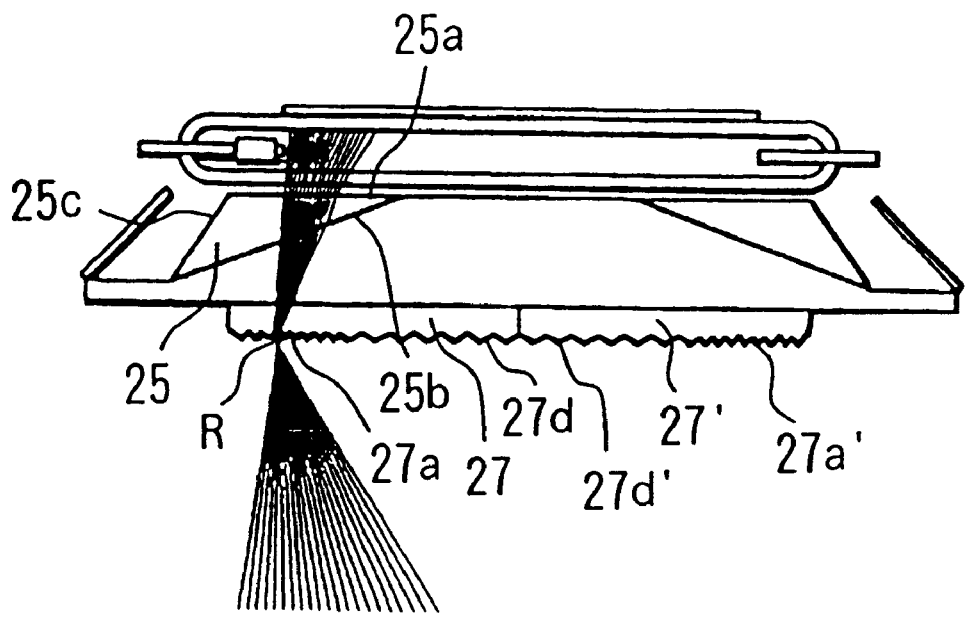
Figure 43:
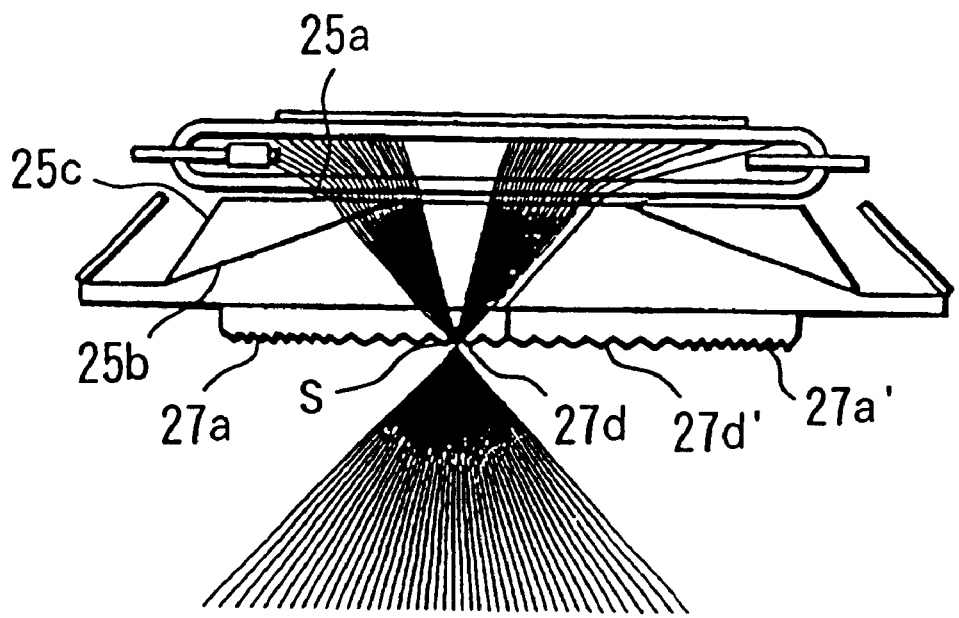
Figure 44:
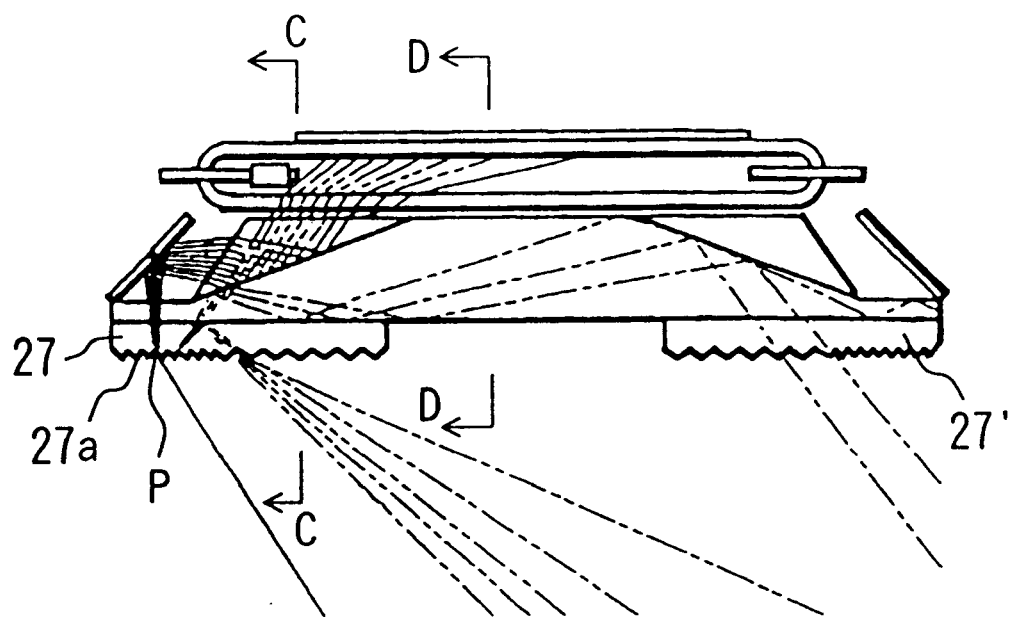
FIGS. 44(a) to 44(d) are horizontal sectional views showing the flash emission device of the embodiment shown in FIG. 42 when a wide irradiation angle is provided.
Figure 44:
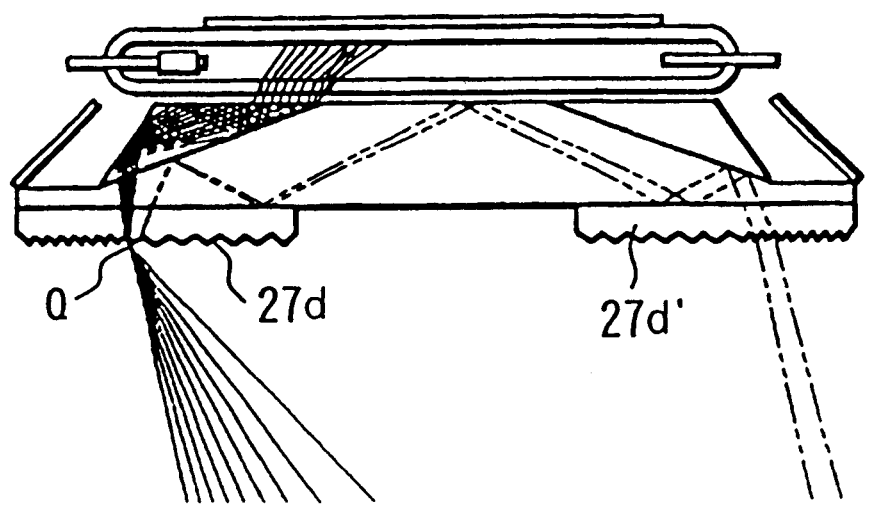
Figure 44:
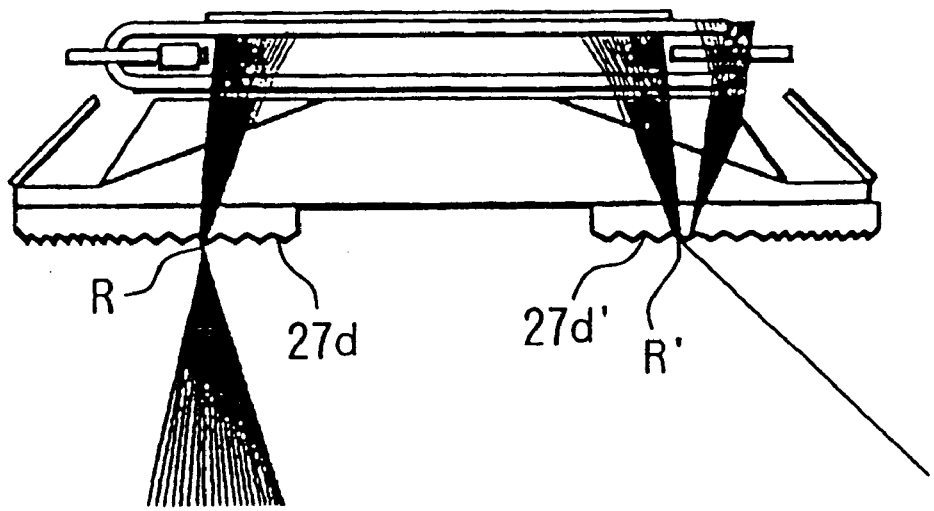
Figure 44:
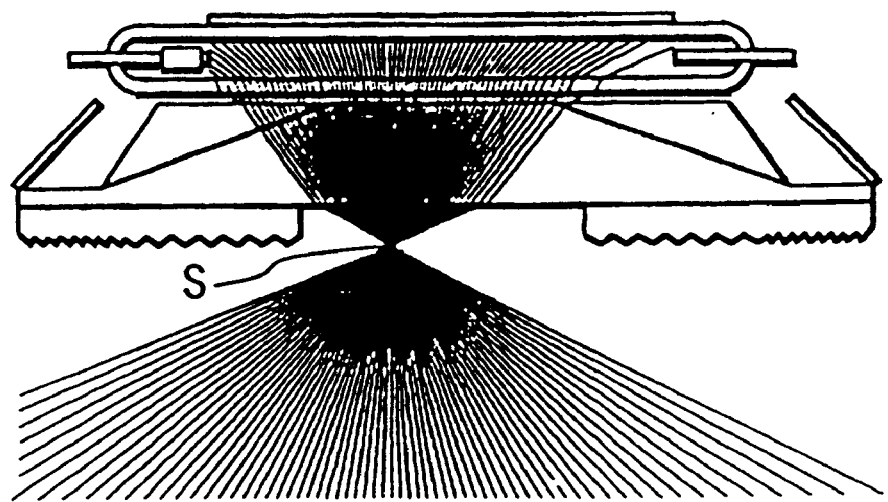
Figure 45:
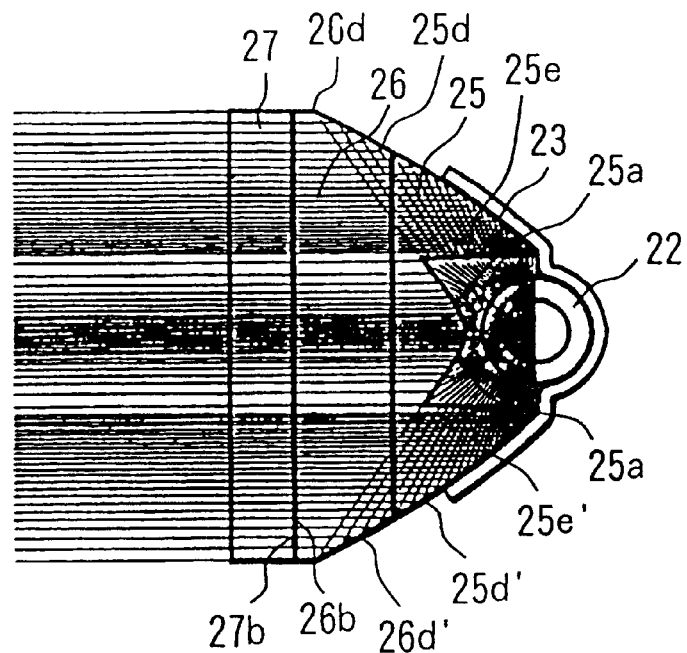
FIGS. 45(a) and 45(b) are vertical sectional views showing the flash emission device of the embodiment shown in FIG. 42 when the narrow irradiation angle is provided.
Figure 45:
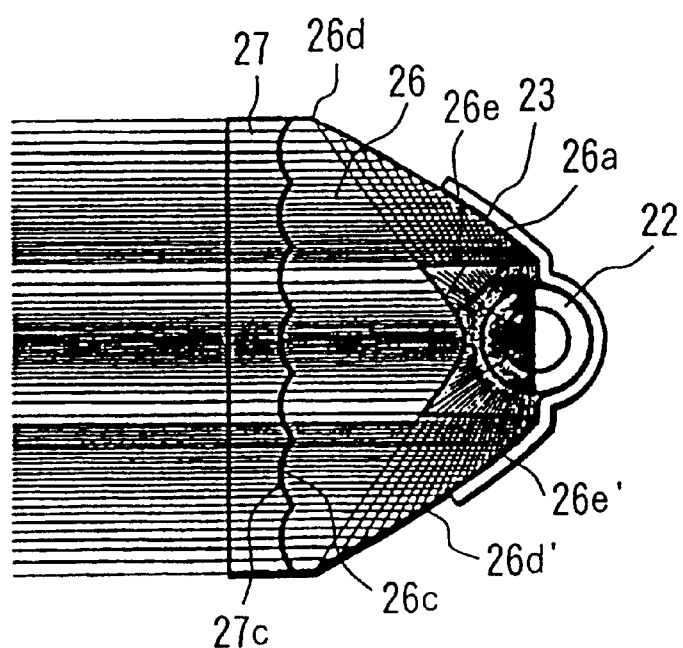
Figure 46:
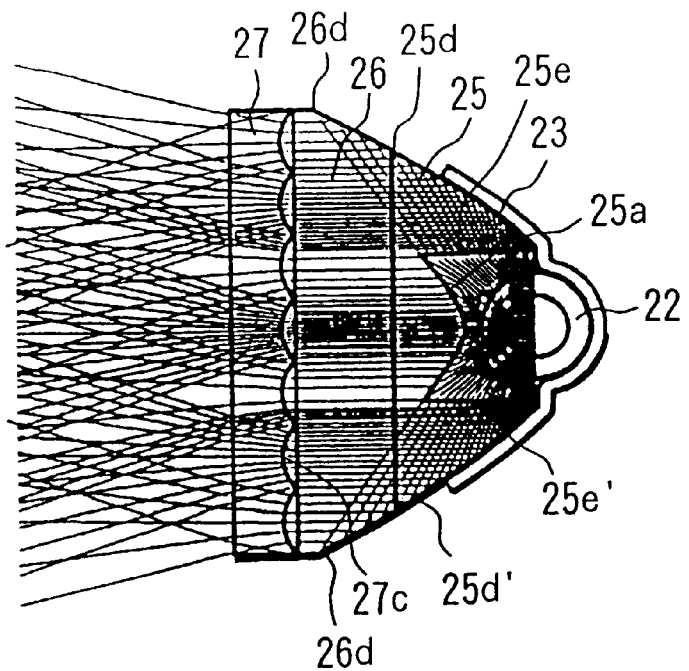
FIGS. 46(a) and 46(b) are vertical sectional views showing the flash emission device of the embodiment shown in FIG. 42 when the wide irradiation angle is provided.
Figure 46:
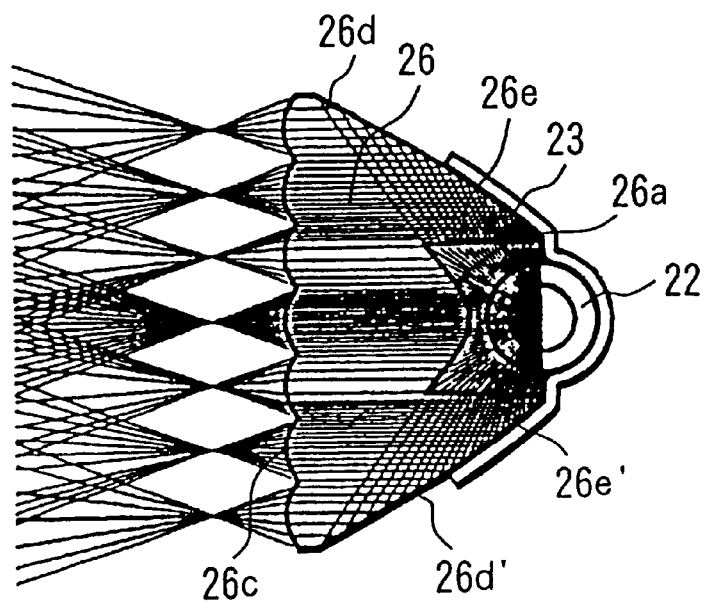

FIG. 41 is a perspective view showing the appearance of a camera including a partial sectional view of the flash emission device to which the present invention is applied. FIG. 42 is a perspective view of the essentials showing only a main optical system of the flash emission device in FIG. 41. FIGS. 43, 44 are horizontal sectional views showing the configuration of the optical system of the flash emission device. FIGS. 45, 46 are vertical sectional views showing the configuration of the optical system of the flash emission device. FIGS. 43 to 46 also show light beam traces of representative light beams emitted from a light source.

The flash emission device shown in FIG. 41 is disposed in an upper right portion of a body of the camera and formed to project over the camera during the use of the camera.

In FIG. 41, reference numeral 101 shows the flash emission device, 111 a body of a picture taking device, 112 a lens barrel provided with a photographic lens, and 113 a release button. Reference numeral 114 shows an operation member for a zooming operation of the photographic lens, in which pushing the operation member frontward allows zooming toward the tele side and pushing it backward allows zooming toward the wide side. Reference numeral 115 shows an operation button for switching between various modes of the camera, 116 a liquid crystal display window for letting a user know the operation of the camera, 117 a window of a photometric device for measuring luminance of outside light, and 118 a window of a viewfinder.

Since the respective functions of the components except the flash emission device 101 are known techniques, detailed description thereof is omitted here. It should be noted that mechanical components of this embodiment are not limited to the aforementioned ones.

In FIG. 42, reference numeral 22 shows a flash discharge tube (xenon tube) of a straight-tube shape (cylindrical shape) having an illuminant elongated in a horizontal direction for producing a flash.

Reference numeral 23 shows a reflector for reflecting luminous flux traveling to the rear of a light emission direction (toward a subject), of luminous flux emitted from the flash discharge tube 22, back to the light emission direction (toward the subject). The reflector 23 is made from a metal material such as bright aluminum with its inner surface formed of a high reflectance surface, or a resin material with its inner surface formed of a metal evaporated surface of high reflectance.

Reference numerals 24, 24' show reflector plates disposed near both ends of the flash discharge tube 22.

Reference numerals 25, 25' show prisms which are positioned on the subject side to face both ends of the flash discharge tube 22 in the horizontal direction and form a pair arranged symmetrically about an optical axis (the center line of light emitted from the light source, hereinafter referred to as "exit optical axis") of light emitted from the flash discharge tube 22. Each of the prism 25, 25' has a triangular shape in horizontal section. The outer surfaces of the triangles disposed as a pair in the horizontal direction symmetrically about the exit optical axis face the reflection surfaces of the reflector plates 24, 24', respectively.

Reference numeral 26 shows an optical member (prism) positioned on the subject side of the flash discharge tube 22 and having a plurality of cylindrical lens surfaces 26c with positive refractivity in a vertical direction formed in a generally half area of an exit surface near the center thereof. The optical member 26 is made of a trapezoidal prism member having inclined surfaces such that spacings in a horizontal section between the flash discharge tube 22 and the optical member 26 are widened toward both ends in the horizontal direction. The inclined surfaces are formed to face the longest inclined surfaces of the triangles of the prisms 25, 25' with air layers interposed between them, respectively.

Reference numerals 27, 27' show second optical members (optical plates) positioned on the subject side of the optical member (prism) 26 and arranged as a pair symmetrically about the exit optical axis of the light source. On incident surfaces of the second optical members 27, 27', a plurality of cylindrical lens surfaces 27c (FIGS. 45(a) and 45(b)) with negative refractivity in the vertical direction canceling out the refractivity of the cylindrical lens surfaces 26c of the optical member (prism) 26 are formed in a generally half area near the center in the horizontal direction, and flat surfaces 27b, 27b' are formed on the remaining surface.

In addition, a plurality of vertically elongated prism rows 27d, 27d' with refractivity in the horizontal direction are formed close to the center in the horizontal direction on an exit surface of the second optical members 27, 27'. Fresnel lens surfaces 27a, 27a' with refractivity in the horizontal direction elongated vertically are formed in peripheral portions in the horizontal direction on the exit surface.

The prism 25, 25' and the optical member (prism) 26 are disposed in opposition to each other with the air layers existing between them obliquely to the longitudinal direction of the flash discharge tube 22. The second optical members 27, 27' are disposed with a fixed spacing maintained from the exit surface of the optical member (prism) 26, and are formed to be movable horizontally. The length of each of the exit surfaces of the second optical members 27, 27' is about a half of the length of the exit surface of the optical member 26 (the total length of the exit surfaces of the second optical members 27, 27' is ±10% of the length of the exit surface of the optical member 26).

In the aforementioned configuration, the flash discharge tube 22, reflector 23, reflector plates 24, 24', prisms 25, 25', optical member (prism) 26 are collectively put in a holding case or the like, not shown, to constitute a light emission unit, and the second optical members 27, 27' are moved as appropriate to a predetermined position for optical arrangement, thereby making it possible to continuously change a condensing degree. Each second optical member may be formed of a plurality of members.

As materials of the prisms 25, 25', the optical member (prism) 26, and the second optical members 27, 27', an optical resin material with high transmittance such as an acrylic resin or a glass material is suitable.

In the aforementioned configuration, when the picture taking device 111 is set, for example, to a "stroboscope auto mode," a central processing unit, not shown, determines whether it instructs the flash emission device 101 to emit light based on luminance of outside light measured by a photometric device, not shown, and the speed of a loaded film, after the release button 113 is pressed by a user. When the central processing unit determines that "the flash emission device 101 should emit light" in a situation where a picture is to be taken, the central processing unit provides a light emission signal to cause the flash discharge tube 22 to emit light through a trigger lead wire attached to the reflector 23.

Luminous flux emitted to the rear (in a direction opposite to a subject) of the central axis of the illuminant of the flash discharge tube 22 is returned to the light source through the reflector 23 and then irradiated toward the subject. Luminous flux emitted in the irradiation direction (toward the subject) is incident on the prisms 25, 25' or the optical member (prism) 26 disposed in front of the flash discharge tube 22, and converted to have predetermined distribution characteristic through the reflectors 24, 24', the second optical members 27, 27' or the like, and then irradiated toward the subject.

The change in light distribution characteristic is achieved by horizontal movement of the second optical members 27, 27'.

The embodiment is a proposal of a lighting device which, especially when the photographic lens of the picture taking device 111 is a zoom lens, simultaneously matches light distribution characteristics in vertical and horizontal directions with the range supported by the photographic lens in taking pictures by adjusting as appropriate an amount of horizontal movement of the second optical members 27, 27' in accordance with a focal length of the lens. In the following, a setting method of an optimal distribution shape in the lighting device will be described in more detail with reference to FIGS. 43 to 46.

FIGS. 45, 46 are vertical sectional views of the flash emission device 101 for illustrating basic principles in varying an irradiation angle vertically. FIG. 45(a) and FIG. 45(b) are cross sections taken along lines AA and BB in FIG. 43(a), respectively, while FIG. 46(a) and FIG. 46(b) are cross sections taken along lines CC and DD in FIG. 44(a), respectively. The reference numerals in FIGS. 45, 46 correspond to those in FIGS. 42 to 44.

As apparent from FIGS. 42, 45, and 46, the plurality of cylindrical lens surfaces 26c formed on the exit surface of the optical member (prism) 26 and having positive refractivity in the vertical direction are formed only in the generally half area near the center in the horizontal direction on the exit surface of the optical member (prism) 26, and peripheral portions in the horizontal direction on the exit surface of the optical member (prism) 26 have flat surfaces 26b, 26b' formed thereon.

Description will be first made for a condensed or diverged state of exiting light in the horizontal direction with reference to FIGS. 43, 44. FIG. 43(a) to 43(d) illustrates the most condensed state in this embodiment, in which the second optical members 27, 27' serving as operating members for varying an irradiation angle are disposed in proximity to each other near the center in the horizontal direction. With this state, light beam traces in FIG. 43(a) to FIG. 43(d) represent luminous flux emitted from the light source at representative light exit points P, Q, R, and S of the second optical member 27. From the condensed state of the light beams, an irradiation angle range can be estimated to a certain degree.

As shown in FIG. 43(a), luminous flux exiting from the outermost point P is light which was incident on an incident surface 25a of the prism 25, totally reflected by a reflector plate 25b, exited from an exit surface 25c, reflected by the reflector plate 24, passed through the optical member (prism) 26, and then reached the P point. The luminous flux has an extremely narrow irradiation angle range with high directivity.

As shown in FIG. 43(b), luminous flux exiting from the point Q is light which was incident on the incident surface 25a of the prism 25, totally reflected by the reflector plate 25b, also totally reflected by the exiting surface 25c, passed through the optical member (prism) 26, and then reached the Q point. The luminous flux has an extremely narrow irradiation angle range with high directivity similarly to the luminous flux exiting from the point P in FIG. 43(a).

As shown in FIG. 43(c), luminous flux exiting from the point R is light which was incident on the incident surface 25a of the prism 25, refracted by the reflector plate 25b, passed through the optical member (prism) 26, and then refracted by the Fresnel lens surface 27a formed on the exit surface of the second optical member 27. The luminous flux has an irradiation range limited to a certain angle range.

As shown in FIG. 43(d), for luminous flux near the center which is near the light source and most difficult to converge, the prism row 27d (with a constant apical angle of 105 degrees in the embodiment) are formed near the center of the second optical member 27 in the horizontal direction to provide a converging action. As shown, luminous flux from a wide range of the light source reaches the area where the point S exists, and luminous flux exiting from the second optical member 27 can be converted to have uniform distribution in a certain angle range.

Next, description will be made for the state of the widest irradiation angle range in the horizontal direction, or the state where the light is most widely diverged with reference to FIGS. 44(a) to 44(d). Shown herein is a state in which the second optical members 27, 27' serving as operating members for varying an irradiation angle have been moved to positions most widely spaced from each other corresponding to both ends of the optical member (prism) 26. For light beam traces in FIGS. 44(a) to 44(d), luminous flux before it reaches the respective exit points P, Q, R, and S is traced under the same conditions as in FIGS. 43(a) to 43(d), and the luminous flux thereafter is shown with emphasis put on changes in the exiting directions to observe changes from the luminous flux in FIGS. 43(a) to 43(d). As shown, it can be seen that luminous flux after each point is diverged and exit angle distribution is largely changed. In the following, situations for each point will be described in more detail.

At the point P shown in FIG. 44(a), the Fresnel lens surface 27a of the second optical member 27 causes significant refraction or total reflection to greatly change luminous flux in angle toward the exit optical axis direction. As a result, no luminous flux travels in a direction along the exit optical axis and most of the light is converted into luminous flux outside a required view angle range.

At the point Q shown in FIG. 44(b), the prism row 27d of the second optical member 27 refract and turn luminous flux to a direction along the exit optical axis. The resultant luminous flux is not changed in angle as largely as the aforementioned luminous flux in FIG. 44(a), and is used to a certain degree as luminous flux in a required view angle range. FIG. 44(b) shows that, at the Q point, light impinges on the surface of the prism rows 27d, 27d' for refracting light in a direction along the exit optical axis. Even when light is refracted by the surface of the prism rows 27d, 27d' forming a pair with the aforementioned surface, however, the light is converted into luminous flux in a required view angle range and effectively used while that refraction involves a certain change in angle to a direction away from a direction along the exit optical axis.

At the point R shown in FIG. 44(c), light distribution largely varies depending on the position of incidence on the prism row 27d of the second optical member 27. Specifically, when light is incident on the surface of the prism row 27d for refracting light in a direction along the exit optical axis as shown in the point R, the light is hardly influenced except for a slight outward shift of the irradiation direction. On the other hand, when light is refracted by the surface forming a pair with the aforementioned surface, the light is totally reflected by the prism surface as shown at a point R' in FIG. 44(c) to irradiate no light in a required view angle range.

Thus, similarly to the case in FIG. 44(a), luminous flux traveling in a direction along the exit optical axis is partly reduced and an irradiation angle range is effectively widened relatively.

At the point S shown in FIG. 44(d), the second optical member 27 does not exist at this position since the second optical member 27 has been moved, and thus uniform and wide light distribution is obtained without any converging action by the respective optical members.

As shown in the respective states in FIGS. 44(a) to 44(d), since luminous flux traveling in a direction along the exit optical axis is reduced without fail and more luminous flux is diverged and spread out, it can be seen that conversion can be made into light distribution of an extremely wide irradiation angle range as compared with the states in FIGS. 43(a) to 43(d).

Next, description will be made with reference to FIGS. 45, 46 for a change in irradiation angle in the vertical direction in synchronization with a change in irradiation range in the horizontal direction shown in FIGS. 43, 44.

In FIGS. 45, 46, a glass tube is shown with its inner and outer diameters as the flash discharge tube 22. For an actual light emitting phenomenon of the flash discharge tube 22 of the flash emission device 101 of this type, light is often emitted in the full inner diameter to improve efficiency, and it can be safely said that the flash discharge tube 22 emits light generally uniformly from the light emission point over the entire inner diameter. For facilitating description, however, luminous flux emitted from the center of a light source is considered as representative luminous flux, and FIGS. 45 and 46 intentionally show only the luminous flux emitted from the center of the light source. In actual light distribution, besides the shown representative luminous flux, luminous flux also is emitted from peripheral portions in the longitudinal direction of the flash discharge tube 22 and thus light distribution is changed such that the light is spread out slightly as a whole, although the tendency of the light distribution is almost the same. Thus, the following description will be made on the basis of the representative luminous flux.

First, characteristic shapes of the optical system of the flash emission device 101 configured as above will be described in order. The reflector 23 has a portion behind the central axis of the light source (in a direction opposite to a subject) in a semicylindrical shape substantially concentric with the flash discharge tube 22. This shape is effective for returning light reflected by the reflector 23 toward the center of the light source and advantageously resists adverse effect due to refraction by the glass of the flash discharge tube 22. This configuration also facilitates this discussion since light reflected by the reflector 23 can be handled as emitted light substantially equivalent to direct light from the light source, and the overall shape of the subsequent optical system can advantageously be reduced in size. The shape is exactly a semicylinder because a smaller size leads to an increased size of the prisms 25, 25' and the optical member (prism) 26 for condensing side light, and a larger size leads to reduced efficiency due to an increased quantity of luminous flux held within the reflector 23, and thus both of them are not desirable.

The (vertically) upper and lower peripheral portions of the reflector 23 are formed to extend behind the prisms 25, 25' and the optical member 26 (reflection surfaces 25d, 26d) for the following reasons.

Specifically, luminous flux emitted from the center of the light source can be ideally reflected by the back reflection surfaces 25d, 26d as shown, while some of luminous flux emitted from the left of the central axis of the light source in FIGS. 45, 46 cannot be totally reflected and thus exits from the reflection surfaces 25d, 26d especially when the light source has a large inner diameter. The aforementioned shape of the reflector 23 is provided to effectively use such luminous flux.

More specifically, as shown, the shape of the reflector 23 extending to the back faces (reflection surfaces 25d, 26d) of the prisms 25, 25' and the optical member (prism) 26 and extending along the shapes of the reflection surfaces 25d, 26d allows reentrance of luminous flux which was not totally reflected and once exited from the reflection surfaces 25d, 26d, and the reflected luminous flux can be efficiently condensed in a predetermined irradiation range.

The prisms 25, 25' and the optical member (prism) 26 are designed to have shapes as described below in the embodiment.

Luminous flux traveling in a direction along the exit optical axis is converted to be parallel with the exit optical axis as shown by the cylindrical lens surfaces 25a, 26a providing positive refractivity in the vertical direction formed on the incidence surfaces of the prism 25 and the optical member 26.

On the other hand, luminous flux at a large angle with respect to the exit optical axis is refracted by the incidence surfaces 25e, 26e of the prism 25 and the optical member 26, and then totally reflected by the reflection surfaces 25d, 26d positioned behind them. The luminous flux emitted from the center of the light source is similarly converted to be parallel with the exit optical axis in the section.

In this manner, the luminous flux emitted from the center of the light source is once made in parallel with the exit optical axis. Then, the luminous flux can be changed in its irradiation angle range continuously by the shape of the exit surface of the optical member (prism) 26 and the shape of the incidence surface of the second optical member 27 as shown in FIGS. 45 and 46.

First, in a peripheral portion in the horizontal direction shown in FIG. 45(a), the exit surface 26b of the optical member (prism) 26 and the incidence surface 27b of the second optical member 27 have no power for the section to maintain the most condensed state.

In a portion near the center in the horizontal direction shown in FIG. 45(b), since the plurality of cylindrical lens surfaces 26c with positive refractivity in the vertical direction are formed on the exit surface of the optical member (prism) 26 and the plurality of cylindrical lens surfaces 27c with negative refractivity in the vertical direction are formed on the second optical member 27 to cancel out the power of the lens surfaces 26c, the most converged state is also maintained in this case.

Consequently, in the state corresponding to FIGS. 43(a) to 43(d) where the second optical members 27, 27' are close to each other, luminous flux in all the area is converged as shown in FIG. 45(a) or FIG. 45(b), resulting in the most converged state.

On the other hand, when the second optical members 27, 27' are most widely spaced as shown in FIGS. 44(a) to 44(d), the optical member (prism) 26 has no power in the section 26b in a peripheral portion in the horizontal direction shown in FIG. 46(a), while the second optical member 27 has the plurality of cylindrical lens surfaces 27c formed thereon with negative refractivity in the vertical direction, so that luminous flux after passing through both of them is diverged by the cylindrical lens surfaces 27c.

In a portion near the center in the horizontal direction shown in FIG. 46(b), the irradiation angle is widened by the plurality of cylindrical lens surfaces 26c with positive refractivity in the vertical direction formed in the center in the horizontal direction on the exit surface of the optical member (prism) 26, and the second optical member 27 does not exist in front of the lens surfaces 26c, thereby maintaining the diverged state.

Consequently, in the state corresponding to FIGS. 44(a) to 44(d) where the second optical members 27, 27' are most widely spaced, luminous flux in all the area is diverged in FIG. 46(a) or FIG. 46(b), and as a result, the widest irradiation angle range can be provided.

At each point during movement of the second optical members 27, 27' other than the aforementioned two states, the ratio of condensing area range to diverging area range is continuously changed, and the irradiation angle as a whole can be continuously changed.

In this manner, for light distribution characteristic in the vertical direction, the irradiation angle can be continuously changed by moving the second optical members 27, 27' horizontally over a required distance with respect to the fixed optical member (prism) 26.

Figure 47:
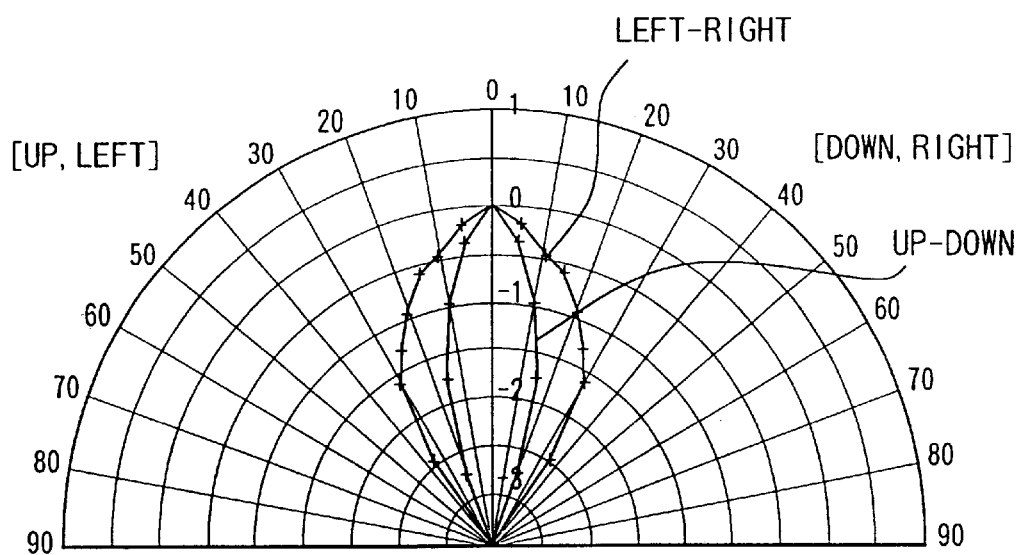
FIG. 47 is a light distribution characteristic view for the flash emission device of the embodiment shown in FIG. 42 when the narrow irradiation angle is provided.
Figure 48:
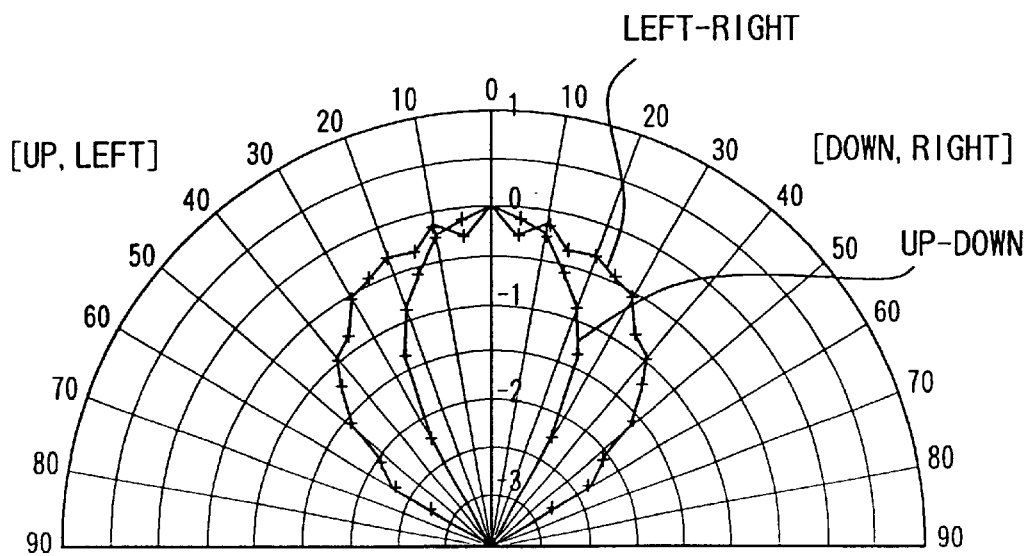
FIG. 48 is a light distribution characteristic view for the flash emission device of the embodiment shown in FIG. 42 when the wide irradiation angle is provided.

FIGS. 47, 48 show actual light distribution characteristics obtained by the configuration described above. FIG. 47 illustrates a narrow irradiation angle range corresponding to FIGS. 43, 45, while FIG. 48 illustrates a wide irradiation angle range corresponding to FIGS. 44, 46.

As shown, it can be seen that the irradiation angle range significantly varies in the vertical and horizontal directions. While FIGS. 47, 48 show light distribution characteristic diagrams for two states of the most converged state (FIG. 47) and the most diverged state (FIG. 48), light distribution characteristic obtained in the embodiment is not limited to the two states, and light distribution characteristics between the two states can be continuously obtained in accordance with an amount of movement of the second optical members 27, 27'.

While the second optical members 27, 27' in the embodiment have been described as moved symmetrically about the exit optical axis in the horizontal direction, the movement of the second optical members 27, 27' is not necessarily limited to such symmetrical one. For example, when the optical axis for taking pictures is deviated from the lighting optical system, it is necessary to match the optical axis for taking pictures with the optical axis center of the lighting optical system in a predetermined distance, in which case an operation for inclining the lighting optical axis is performed (parallax correction) and thus the members can be moved over different distances from each other intentionally to obtain bilaterally asymmetrical light distribution characteristic.

While the prism rows 27d, 27d' are provided for the exit surface of the second optical members 27, 27' to achieve a converging action in the aforementioned embodiment, the shape of the exit surface is not limited to such prism row, and may be formed of, for example, a cylindrical lens surface with a constant radius of curvature or a Fresnel lens.

Figure 49:
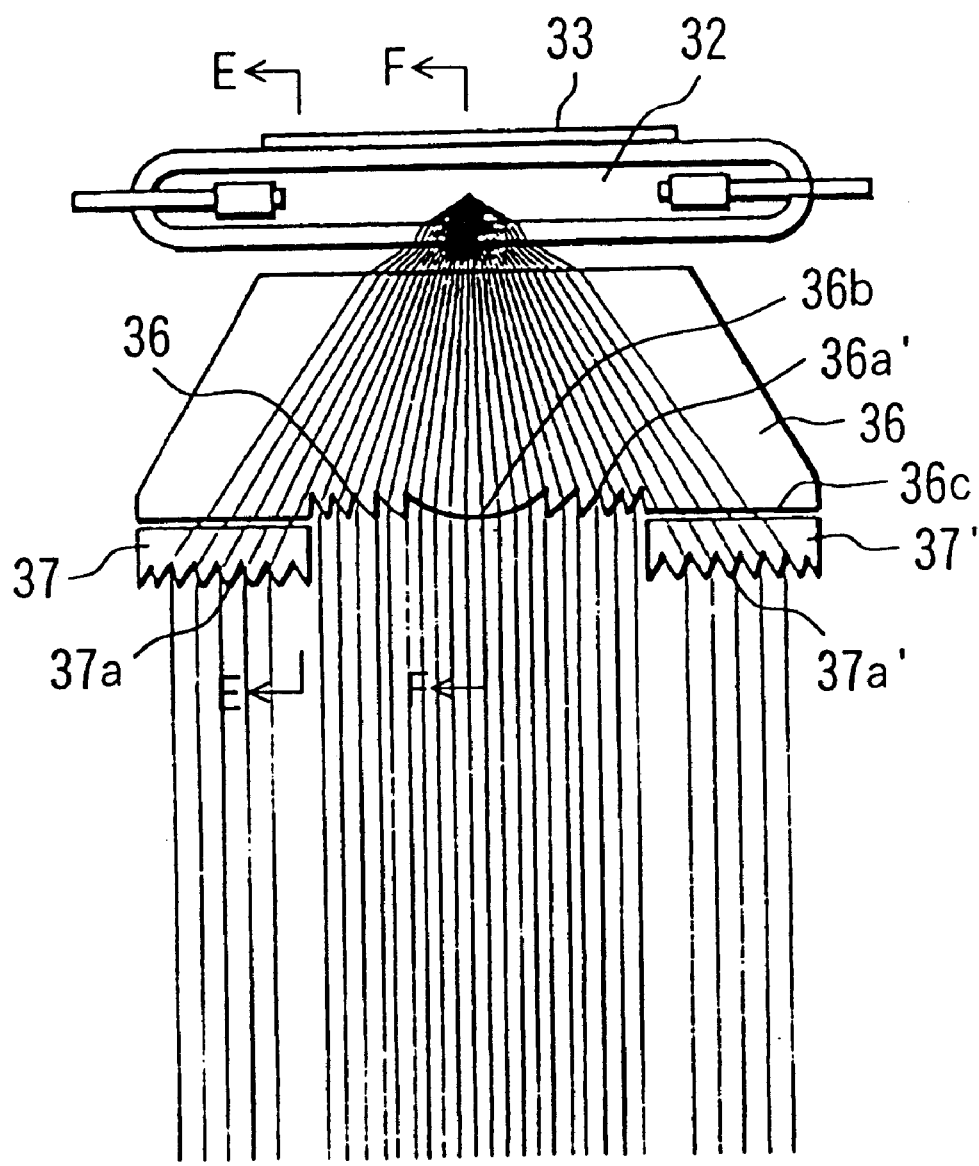
FIG. 49 is a horizontal sectional view showing a flash emission device according to a further embodiment of the present invention when a narrow irradiation angle is provided.
Figure 50:
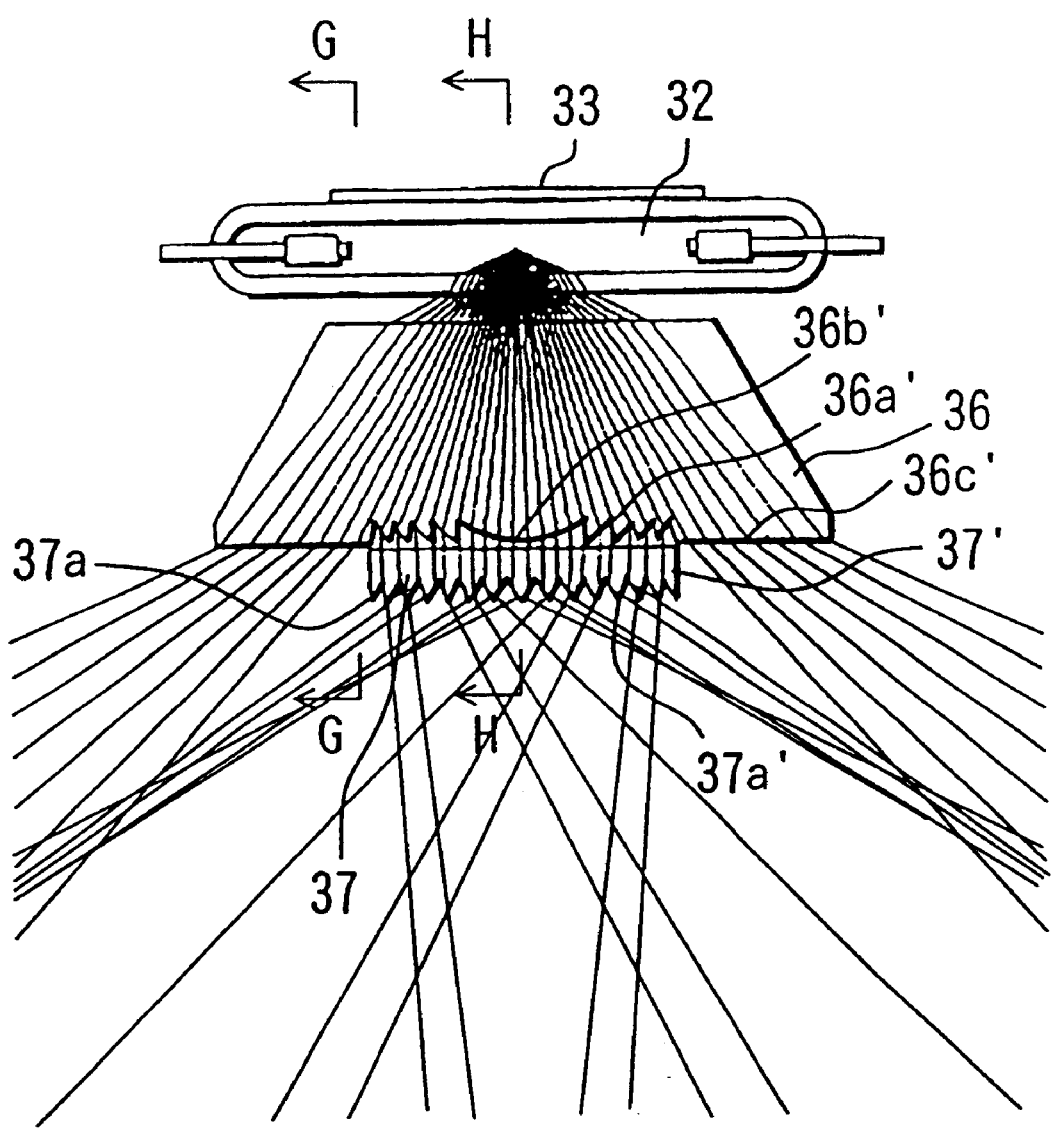
FIG. 50 is a horizontal sectional view showing the flash emission device of the embodiment shown in FIG. 49 when a wide irradiation angle is provided.
Figure 51:
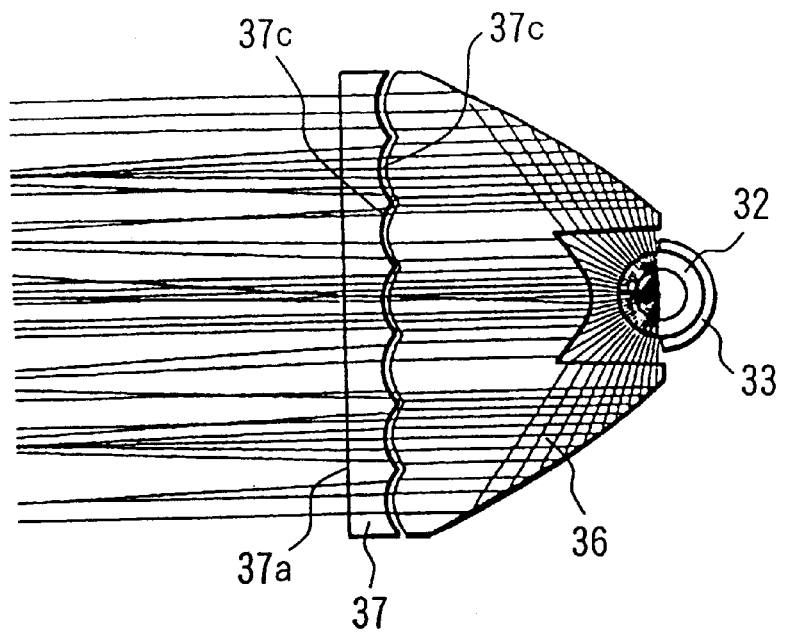
FIGS. 51(a) and 51(b) are vertical sectional views showing the flash emission device of the embodiment shown in FIG. 49 when the narrow irradiation angle is provided.
Figure 51:
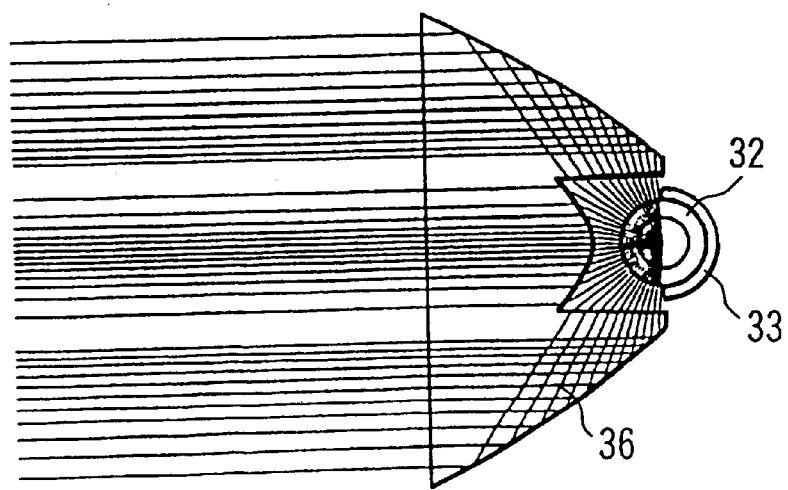
Figure 52:
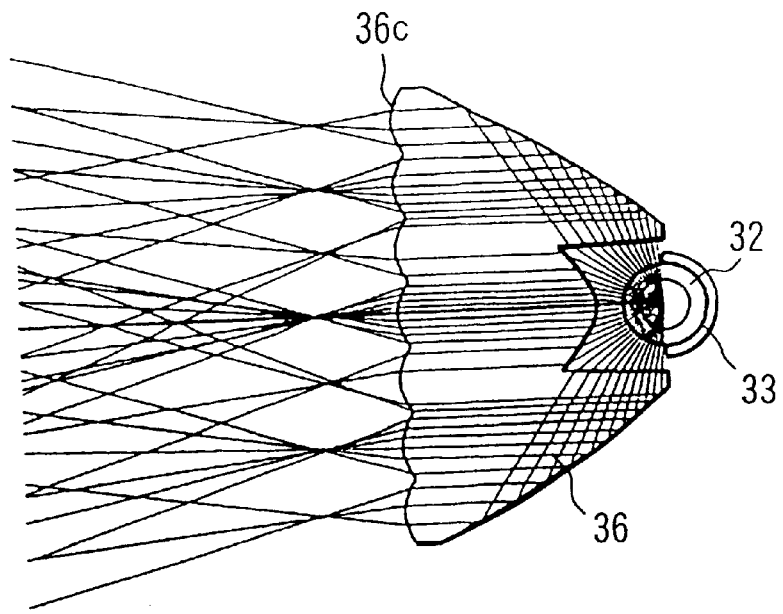
FIGS. 52(a) and 52(b) are vertical sectional views showing the flash emission device of the embodiment shown in FIG. 49 when the wide irradiation angle is provided.
Figure 52:
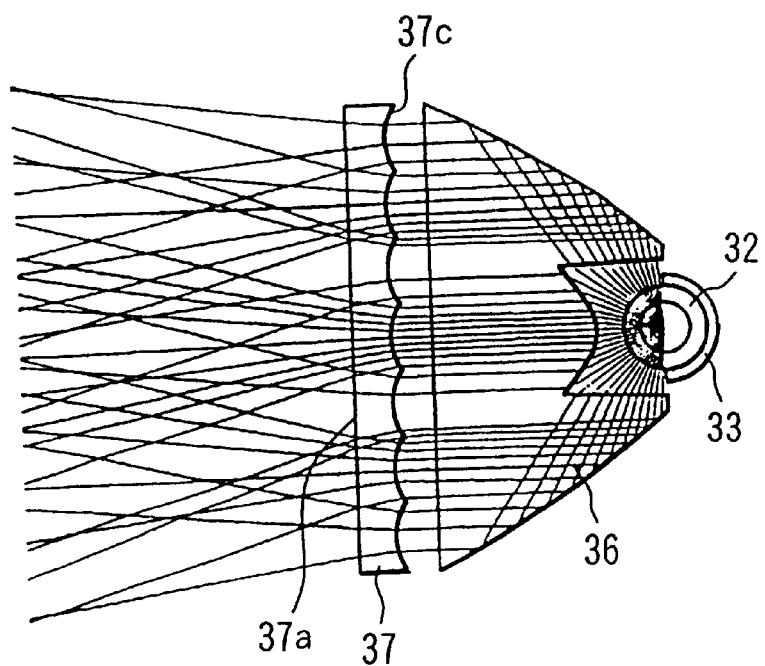

Next, another embodiment of the present invention will be described with reference to FIGS. 49 to 52 which show a flash emission device 101. FIGS. 49, 50 are horizontal sectional views showing the configuration of an optical system of the flash emission device 101 and FIGS. 51, 52 are vertical sectional views showing the configuration of the optical system of the flash emission device 101. FIGS. 49 to 52 also show light beam traces of representative light beams emitted from a light source.

In FIGS. 49 to 52, reference numeral 32 shows a cylindrical flash discharge tube (xenon tube) producing a flash and having a small effective arc length which is approximately one half of the flash discharge tube 22 shown in the immediately preceding embodiment.

Reference numeral 33 shows a reflector for reflecting luminous flux traveling to the rear of the central axis of the light source (in a direction opposite to a subject), of luminous flux emitted from the flash discharge tube 32, back to a light exit direction. The reflector 33 is smaller than the reflector 23 shown in the immediately preceding embodiment and is formed to cover the rear side of the flash discharge tube 32.

Reference numeral 36 shows a prism for condensing light formed of a single part, unlike the immediately preceding embodiment. The prism is a first optical member having an incidence surface of substantially the same shape as the immediately preceding embodiment and an exit surface on which a cylindrical lens surface 36b with refractivity in a horizontal direction is formed near the center, Fresnel lens surfaces 36a, 36a' with refractivity in the horizontal direction are formed in portions outside the cylindrical lens surface 36b in the horizontal direction, and a plurality of cylindrical lens surfaces 36c, 36c' with positive refractivity in a vertical direction are formed in peripheral portions in the horizontal direction.

Reference numerals 37, 37' show second optical members arranged symmetrically about an exit optical axis. The second optical members 37, 37' have, on the side of incidence surfaces, a plurality of cylindrical lens surfaces 37c, 37c' with negative refractivity in the vertical direction canceling out the refractivity of the plurality of cylindrical lens surfaces 36c, 36c' with positive refractivity in the vertical direction of the first optical member (prism) 36, and on the side of exit surfaces, Fresnel lens surfaces 37a, 37a' with refractivity in the horizontal direction. The second optical members 37, 37' are disposed with a fixed spacing maintained from the exit surface of the first optical member (prism) 36 and formed to be movable horizontally.

In the aforementioned configuration, the flash discharge tube 32, the reflector 33, and the first optical member (prism) 36 are collectively put in a holding case or the like, not shown, to constitute a light emission unit, and the second optical members 37, 37' are moved as appropriate to a predetermined position for optical arrangement, thereby making it possible to continuously change a condensing degree. Each second optical member may be formed of a plurality of members.

As materials of the first optical member (prism) 36 and the second optical members 37, 37', an optical resin material with high transmittance such as an acrylic resin or a glass material is suitable, as in the immediately preceding embodiment.

Similarly to the foregoing embodiment, this embodiment is a proposal of a lighting device which, when photographic lens of a picture taking device 111 is a zoom lens, simultaneously matches light distribution characteristics in vertical and horizontal directions with the range supported by the photographic lens in taking pictures by adjusting as appropriate an amount of horizontal movement of the second optical members 37, 37' in accordance with a focal length of the lens. In the following, a setting method of an optimal distribution shape will be described in more detail with reference to FIGS. 49 to 52.

FIGS. 51, 52 are vertical sectional views of the flash emission device 101 of this embodiment for illustrating basic principles in varying an irradiation angle vertically. FIG. 51(a), FIG. 51(b) are cross sections taken along lines EE and FF in FIG. 49, respectively, while FIG. 52(a), FIG. 52(b) are cross sections taken along lines GG and HH in FIG. 50, respectively. The reference numerals in FIGS. 51 and 52 correspond to those in FIGS. 49 to 50.

The plurality of cylindrical lens surfaces 36c, 36c' with positive refractivity in the vertical direction formed on the exit section of the first optical member (prism) 36 are formed only in areas corresponding to the peripheral portions in the horizontal direction.

First, description will be made for a condensed or diverged state of emanating light in the horizontal direction with reference to FIGS. 49, 50. FIG. 49 shows the most condensed state in this embodiment, in which the second optical members 37, 37' for varying an irradiation angle are open to the left and right and have been moved to positions corresponding to the peripheral portions of the first optical member (prism) 36. This position of the second optical members 37, 37' is in direct contrast to the second optical members 27, 27' positioned near the center of the light source to abut on each other in the most condensed state in the foregoing embodiment.

In this state, the condensing effect is exerted by the Fresnel lens surfaces provided near the center (in the portions outside the cylindrical lens surface 36b in the horizontal direction) on the exit surface of the first optical member (prism) 36 and by the Fresnel lens surfaces provided on the exit surfaces of the second optical members 37, 37' to convert all luminous flux emitted from the light source center into luminous flux in parallel with the optical axis, as shown in the light beam traces in FIG. 49.

Next, description will be made for the state of the widest irradiation angle range in the horizontal direction, or the state where light is most widely diverged with reference to FIG. 50. Shown herein is a state in which the second optical members 37, 37' serving as operating members for varying an irradiation angle have been moved to positions at which they abut on each other in the central portion of the first optical member (prism) 36.

As shown, lumens flux emitted from the light source center is diverged. Specifically, luminous flux in the central portion is diverged horizontally by the double Fresnel lenses constituted by the first optical member (prism) 36 and the second optical members 37, 37', while luminous flux in the peripheral portions in the horizontal direction exits at an angle at which it was incident on the first optical member (prism) 36 due to no contributions of the Fresnel lens surfaces 37a, 37a' with refractivity in the horizontal direction, that is, the luminous flux exits in a diverged state without being subjected to any converging action.

Consequently, it can be seen that exit angle distribution is changed to be significantly wider, as compared with the state in FIG. 49.

Next, description will be made with reference to FIGS. 51 and 52 for a change in irradiation angle in the vertical direction in synchronization with a change in irradiation range in the horizontal direction shown in FIGS. 49 and 50. In FIGS. 51, 52, components identical to those in FIG. 49, 50 are designated by the same reference numerals.

The vertical sectional shape shown in FIGS. 51, 52 has substantially the same characteristics as the shape in the foregoing embodiment. Since the only difference between them is the combination of the shapes of the exit surface of the first optical member (prism) 36 and the incidence surfaces of the second optical members 37, 37', the following description will be focused on those shapes.

Luminous flux emitted from the optical axis center is once converted into luminous flux in parallel with the exit optical axis by the actions of the respective surfaces of the first optical member (prism) 36. Then, the combination of the first optical member (prism) 36 and the second optical members 37, 37' can change a condensed or diverged state. Each of the states will be described in order.

As shown in FIG. 49, when the second optical members 37, 37' are most widely spaced, in a peripheral portion shown in FIG. 51(a) (EE section in FIG. 49), the plurality of cylindrical lens surfaces 36c with positive refractivity in the vertical direction formed in the peripheral portions in the horizontal direction on the exit surface of the first optical member (prism) 36 and the plurality of cylindrical lens surfaces 37c with negative refractivity formed in the second optical member 37 act to cancel out the powers of each other, in which case the most condensed state is maintained.

In a portion near the center shown in FIG. 51(b) (FF section in FIG. 49), since the first optical member (prism) 36 has no power for this section and the second optical members 37, 37' do not exist at this position, the most condensed state is maintained.

Therefore, in the state corresponding to FIG. 49 where the second optical members 37, 37' have been moved to and widely spaced at the position corresponding to the peripheral portions in the horizontal direction on the exit surface of the first optical member 36, the luminous flux in all the area is converged shown in FIG. 51(a) or FIG. 51(b). Consequently, the most converged state is obtained.

On the other hand, when the second optical members 37, 37' are positioned closest to each other as shown in FIG. 50, in a peripheral portion shown in FIG. 52(a) (GG section in FIG. 50), luminous flux is diverged by the plurality of cylindrical lens surfaces 36c with positive refractivity in the vertical direction formed in the peripheral portions in the horizontal direction on the exit surface of the first optical member (prism) 36, and the second optical member 37 does not exist in the front thereof, so that certain wide light distribution is provided.

In a portion near the center shown in FIG. 52(b) (HH section in FIG. 50), the first optical member (prism) 36 has no power for the section, while the plurality of cylindrical lenses 37c with negative refractivity in the vertical direction are formed on the incidence surface of the second optical member 37. Thus, luminous flux after passing through both of them is diverged by the cylindrical lenses 37c.

Therefore, in the state corresponding to FIG. 50 where the second optical members 37, 37' are closest to each other, luminous flux in all the area is diverged in FIG. 52(a) or FIG. 52(b). Consequently, the widest irradiation angle range can be obtained.

At each point during movement of the second optical members 37, 37' other than the aforementioned two states, the ratio of the condensing area range to the diverging area range is continuously changed, and the irradiation angle as a whole can be continuously changed.

In this manner, for vertical light distribution of exiting luminous flux, the irradiation angle can be continuously changed by moving the second optical members 37, 37' over a required distance horizontally to the exit optical axis with respect to the fixed first optical member (prism) 36.

While the second optical members 37, 37' in the embodiment have been described as moved symmetrically about the exit optical axis in the horizontal direction, the movement of the second optical members 37, 37' is not limited to such symmetrical one. The members may be moved over different distances from each other intentionally to obtain bilaterally asymmetrical light distribution.

In addition, while the Fresnel lens surfaces 37a, 37a' are provided for the exit surfaces of the second optical members 37, 37' to achieve a converging action in the aforementioned embodiment, the shape of the exit surface is not limited to such a Fresnel lens surface, and may be formed of, for example, a cylindrical lens surface with a constant radius of curvature, in which configuration an optical system can be formed with a smaller loss of light quantity.

Next, a further embodiment of the present invention will be described with reference to FIGS. 53, 54. The embodiment is a modification of the foregoing embodiment obtained by changing the shape of the second optical members 37, 37', and is characterized in that a second optical member consists of one member, while the second optical members 37, 37' consist of two members in the foregoing embodiment. Since the states when an irradiation angle is varied vertically are the same as shown in FIGS. 51, 52, description thereof is omitted in this embodiment.

Figure 53:
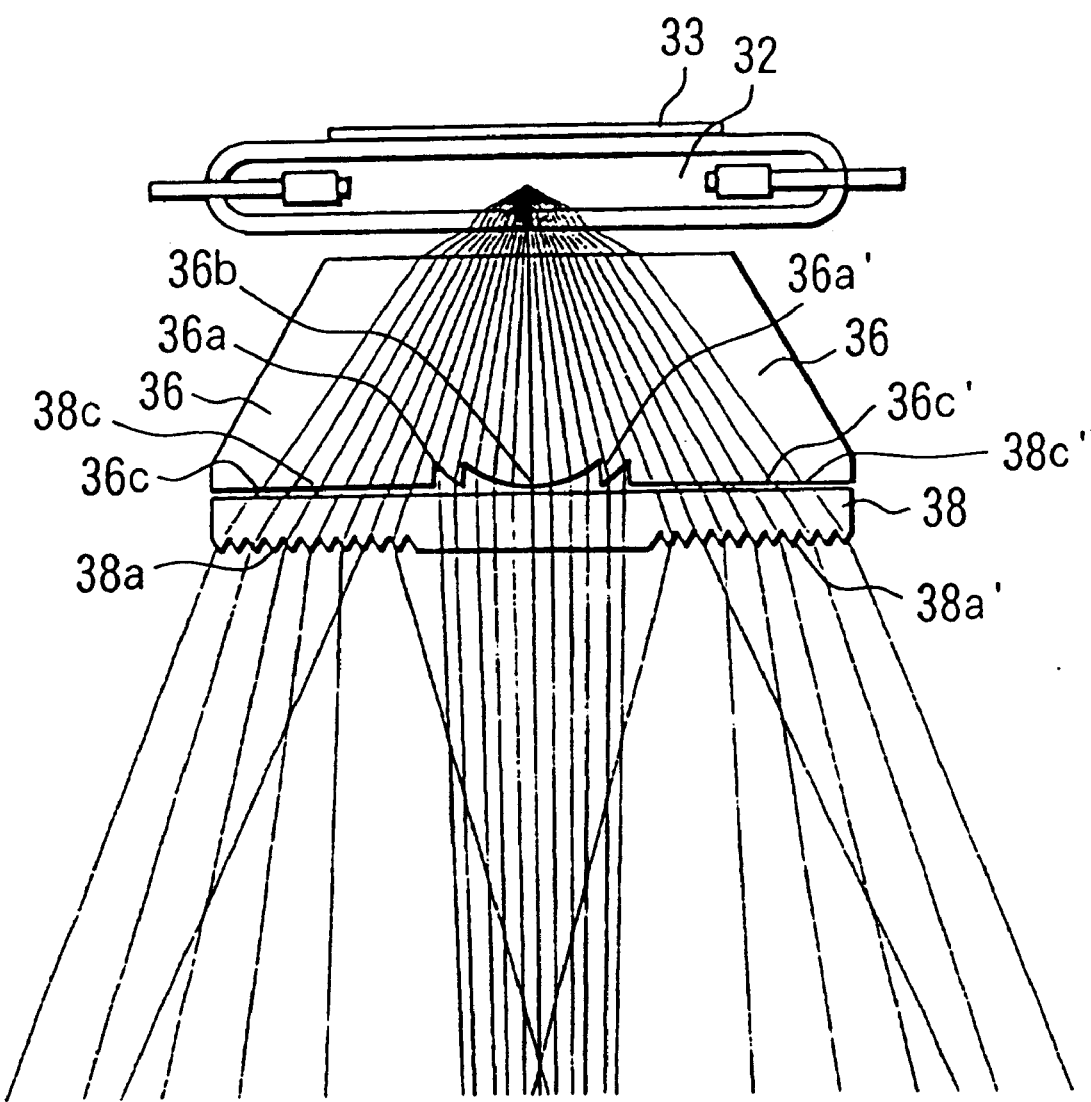
FIG. 53 is a horizontal sectional view showing a flash emission device according to a further embodiment of the present invention when a narrow irradiation angle is provided.
Figure 54:
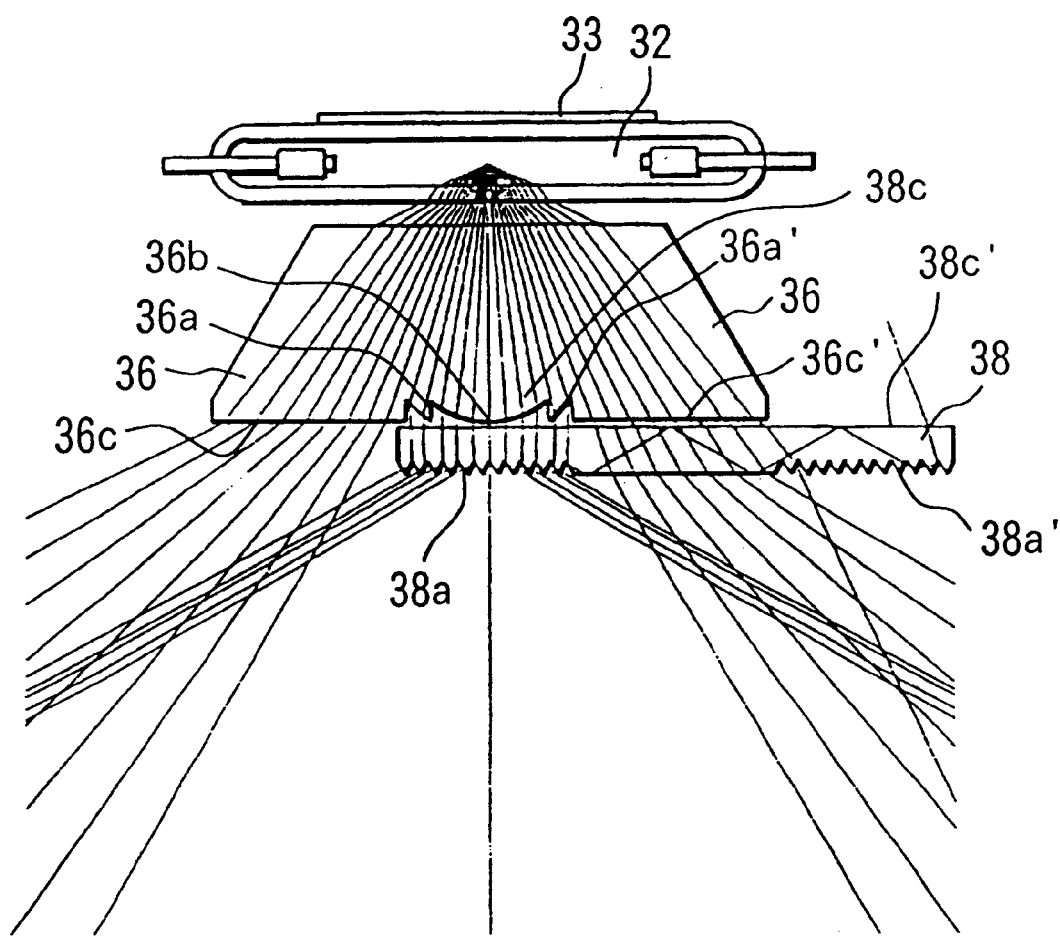
FIG. 54 is a horizontal sectional view showing the flash emission device of the embodiment shown in FIG. 53 when a wide irradiation angle is provided.

FIGS. 53, 54 illustrates a lighting device, particularly a flash emission device 101 in this embodiment, and are horizontal sectional views showing the configuration of an optical system of the flash emission device 101. FIGS. 53, 54 also show light beam traces of representative light beams emitted from a light source.

In FIGS. 53, 54, reference numeral 38 shows a second optical member which consisting of a single member, unlike the foregoing embodiment. The second optical member 38 has flat surfaces on both incidence and exit surfaces in a central portion in a horizontal direction. In peripheral portions in the horizontal direction on the incidence surface, a plurality of cylindrical lens surfaces 38c, 38c' with negative refractivity in a vertical direction are formed similarly to the forgoing embodiment, and in the peripheral portions in the horizontal direction on the exit surface, Fresnel lens surfaces 38a, 38a' with refractivity in the horizontal direction are formed.

The second optical member 38 is arranged with a fixed spacing maintained from an exit surface of a first optical member (prism) 36 and formed to be movable horizontally.

The first optical member (prism) 36 has a plurality of cylindrical lens surfaces 36c, 36c' with positive refractivity in the vertical direction formed in peripheral portions in the horizontal direction on the exit surface. The other components are the same as the foregoing embodiment.

In the aforementioned configuration, a flash discharge tube 32, a reflector 33, and the first optical member (prism) 36 are collectively put in a holding case or the like, not shown, to constitute a light emission unit, and the second optical members 38 is slid horizontally, thereby making it possible to continuously change a condensing degree. This embodiment allows optical characteristics substantially equivalent to that in the foregoing embodiment in the aforementioned two states. In a phase between the two states during movement, however, light distribution characteristics shapes on the left and right in the horizontal direction are asymmetrical.

In the following, description will be made for a condensed or diverged state in the horizontal direction with reference to FIGS. 53, 54. FIG. 53 shows the most condensed state in the embodiment, in which the second optical member 38 for varying an irradiation angle is arranged to face and completely overlie with the first optical member (prism) 36. In this state, the first optical member (prism) 36 has a cylindrical lens surface 36b with refractivity in the horizontal direction formed near the center of the exit surface, and converging actions are obtained by Fresnel lens surfaces 36a, 36a' with refractivity in the horizontal direction provided outside the cylindrical lens surface 36b in the horizontal direction and Fresnel lens surfaces 38a, 38a' provided on the exit surface of the second optical member 38 to convert luminous flux emitted from the light source center into condensed light as shown in the light beam traces in FIG. 53.

Next, description will be made for the state of the widest irradiation angle range in the horizontal direction, or the state where light is most widely diverged with reference to FIG. 54. Shown herein is a state in which the second optical member 38 serving as an operating member for varying an irradiation angle has been moved to the position at which the horizontal right end of the first optical member (prism) 36 aligns with the flat surfaces at the center of the second optical member 38.

As shown, lumens flux emitted from the light source center is significantly diverged. Specifically, luminous flux in the central portion is diverged by the double Fresnel lenses constituted by the first optical member (prism) 36 and the second optical member 38, while luminous flux in the peripheral portions in the horizontal direction exits at angles at which it was incident on and refracted by the first optical member (prism) 36 due to no contributions of the Fresnel lens surfaces, and thus exits in a diverged state without being subjected to any converging action. Consequently, as compared with the state in FIG. 53, the exit angle distribution is largely changed. It should be noted that vertically elongated prism row with refractivity in the horizontal direction may be arranged on the exit surface of the second optical member for achieving divergence similarly.

In this manner, even the single part can realize the most condensed state and the most diverged state. In addition, a simple operation of sliding the single part to the left and right can vary an irradiation angle simultaneously in the vertical and horizontal directions. It is thus possible to realize a lighting optical system which can provide great variations in the irradiation angle in limited space.

Figure 55:
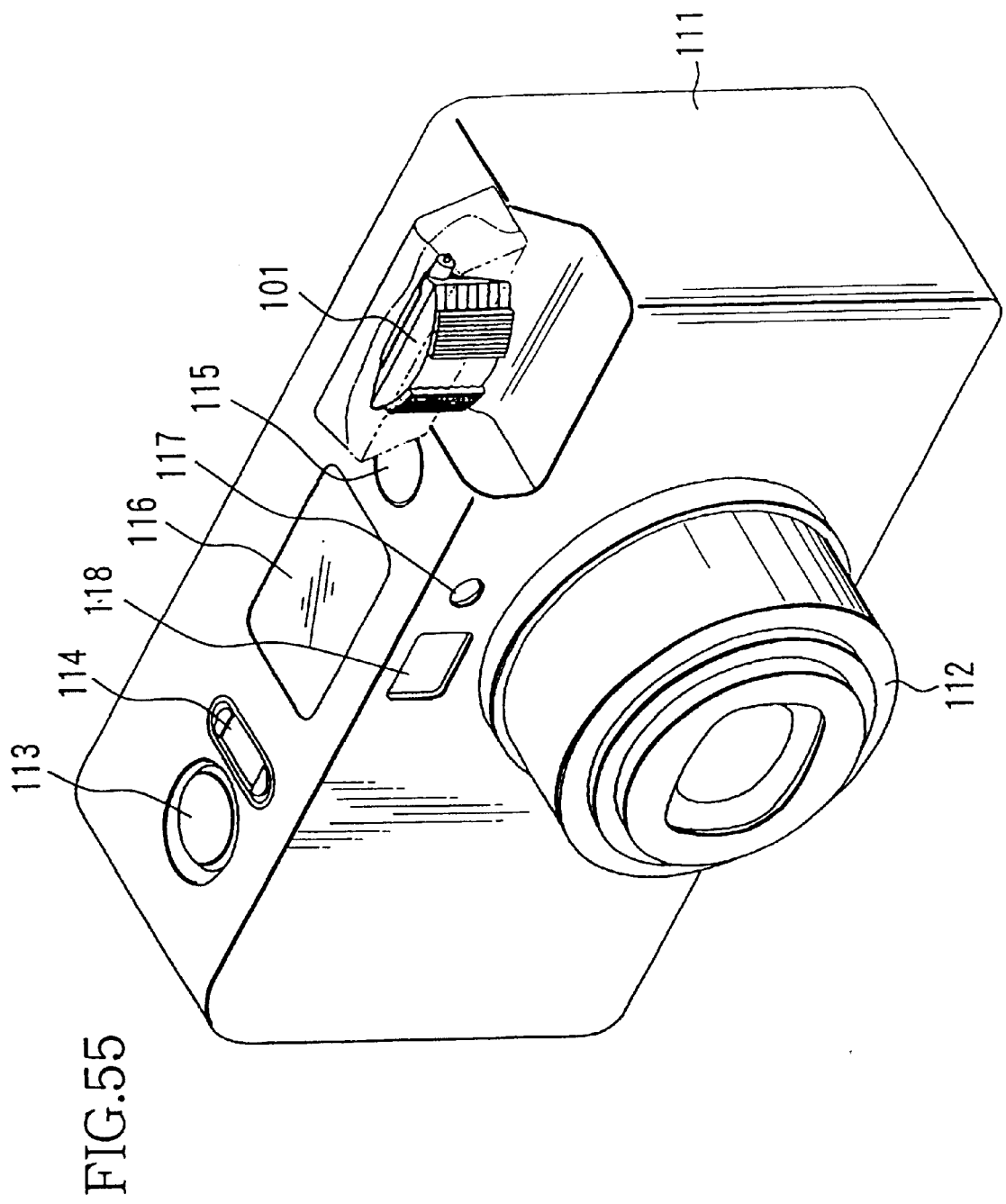
FIG. 55 is a perspective view showing the appearance of a camera to which a flash emission device is applied according to another embodiment of the present invention.
Figure 56:
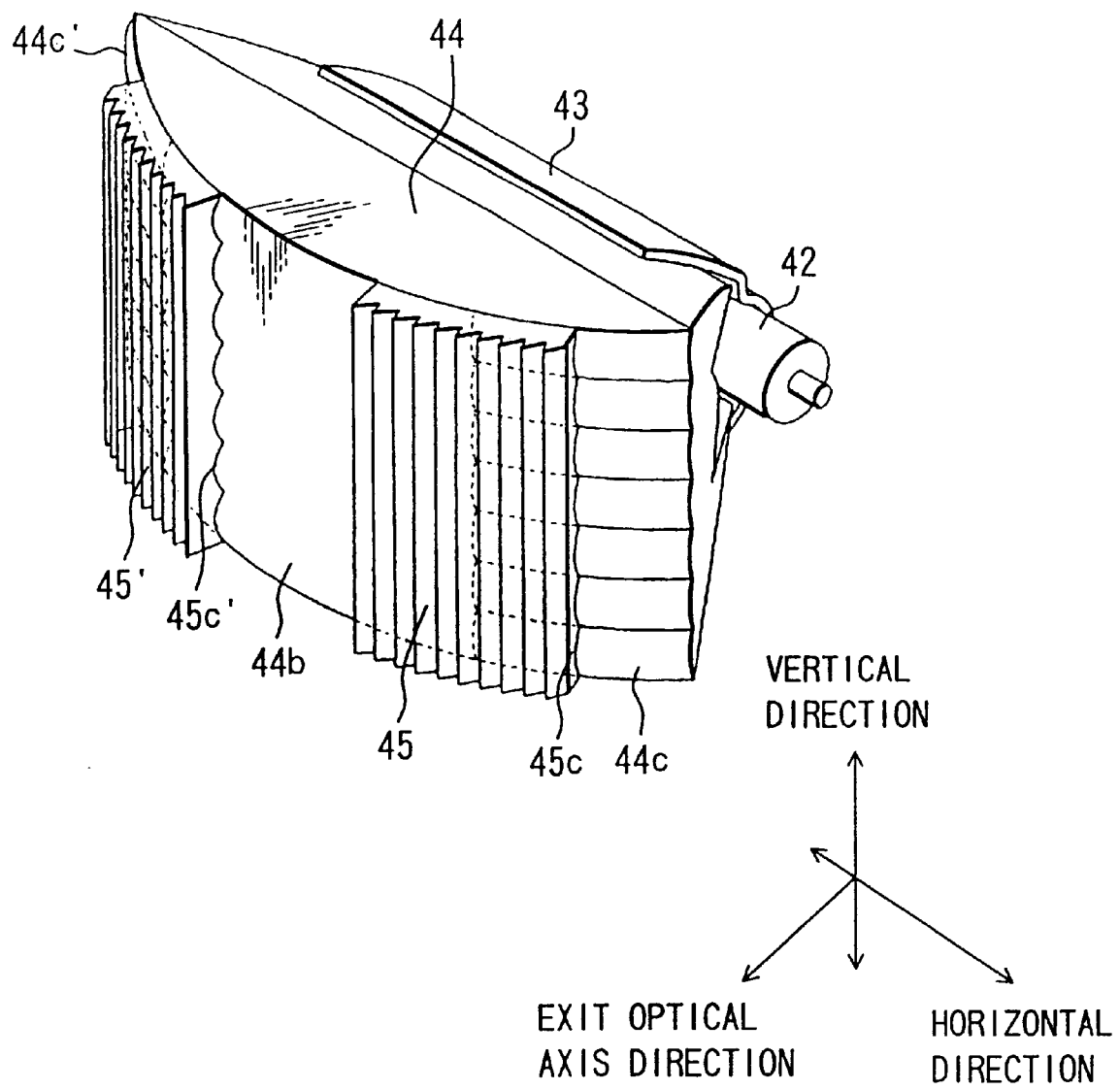
FIG. 56 is a perspective view of the essentials showing an optical system of the flash emission device of the embodiment shown in FIG. 55.
Figure 57:
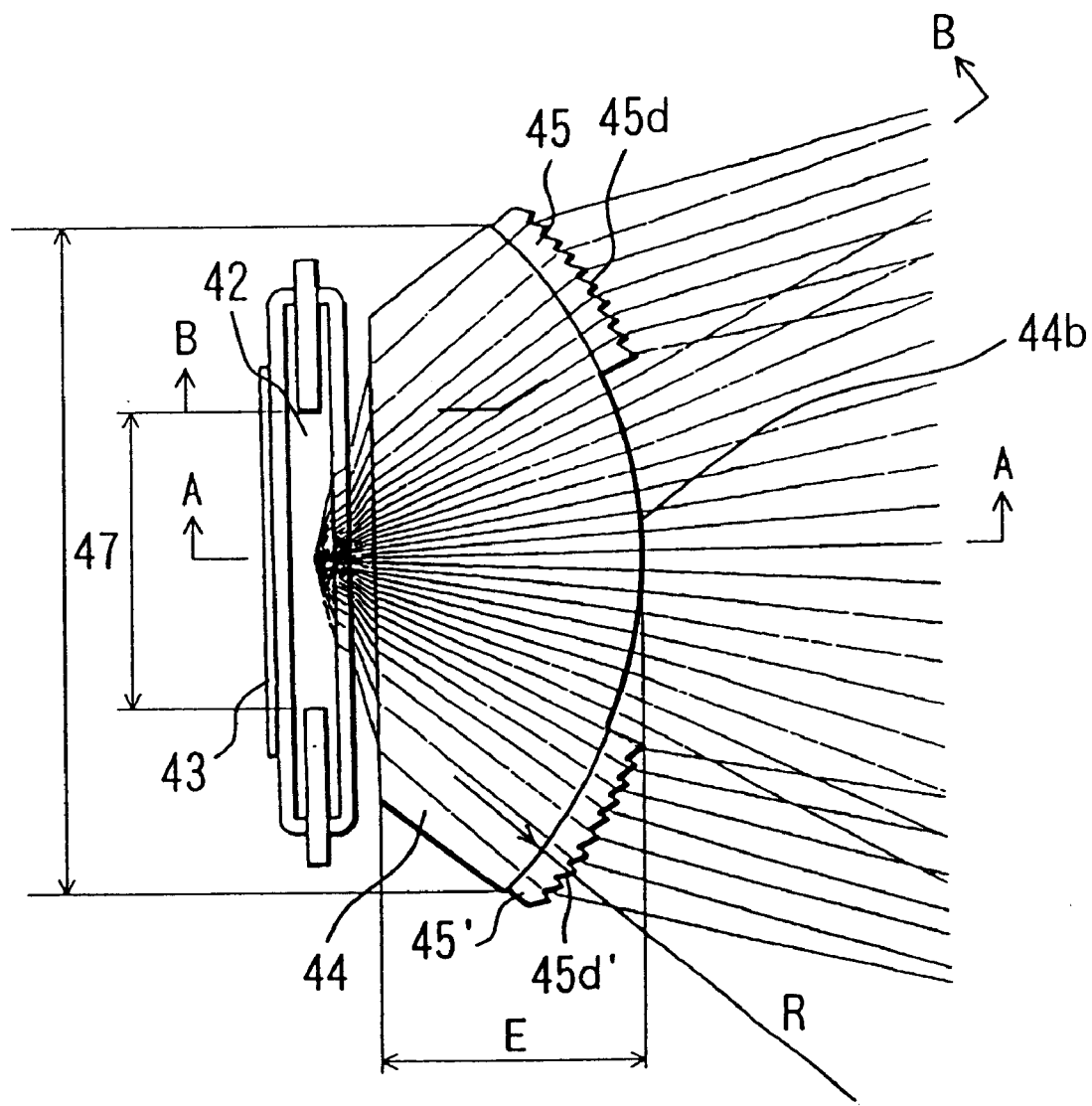
FIG. 57 is a horizontal sectional view showing the flash emission device of the embodiment shown in FIG. 56 when a narrow irradiation angle is provided in a horizontal direction.
Figure 58:
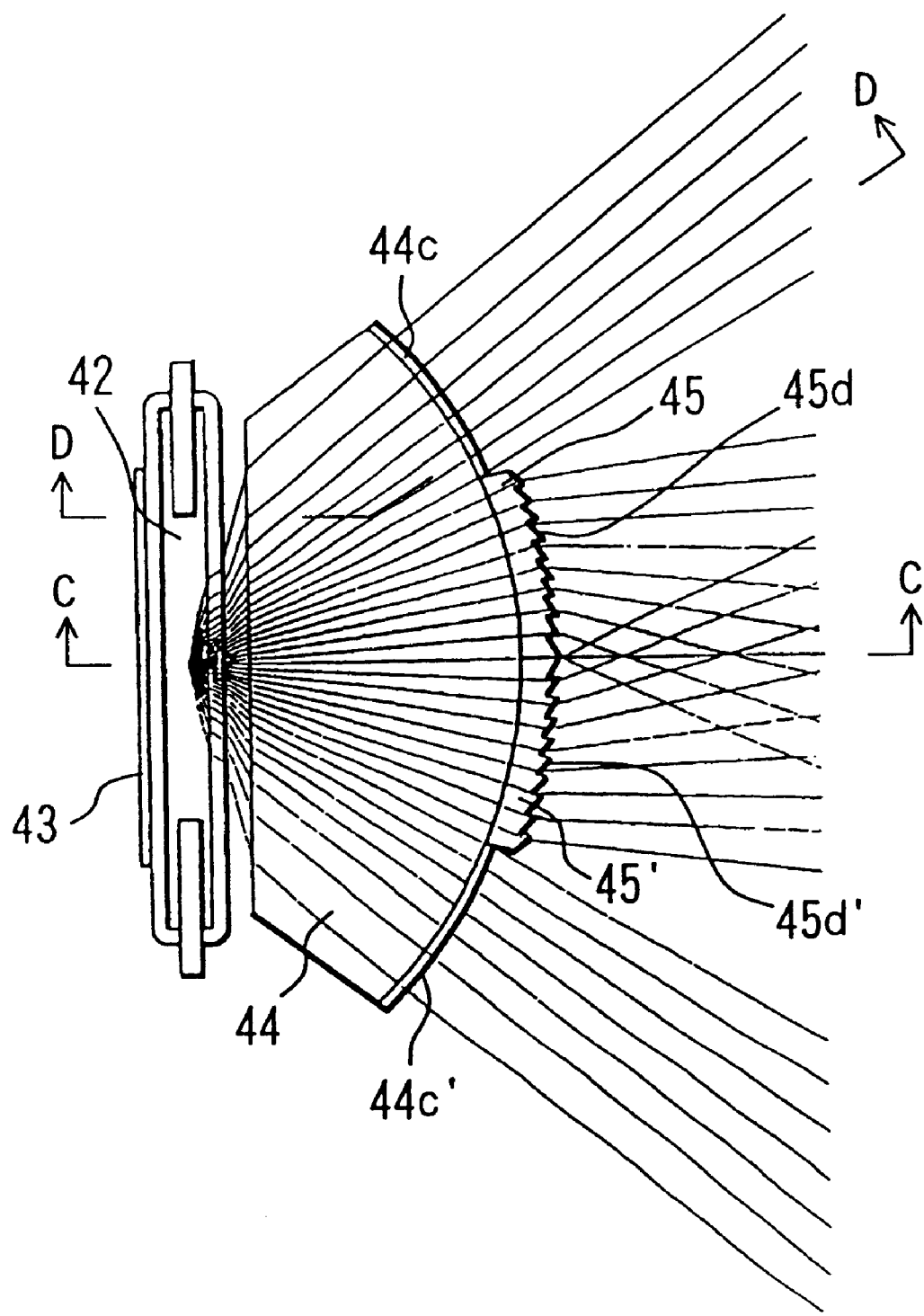
FIG. 58 is a horizontal sectional view showing the flash emission device of the embodiment shown in FIG. 56 when a wide irradiation angle is provided in the horizontal direction.
Figure 59:
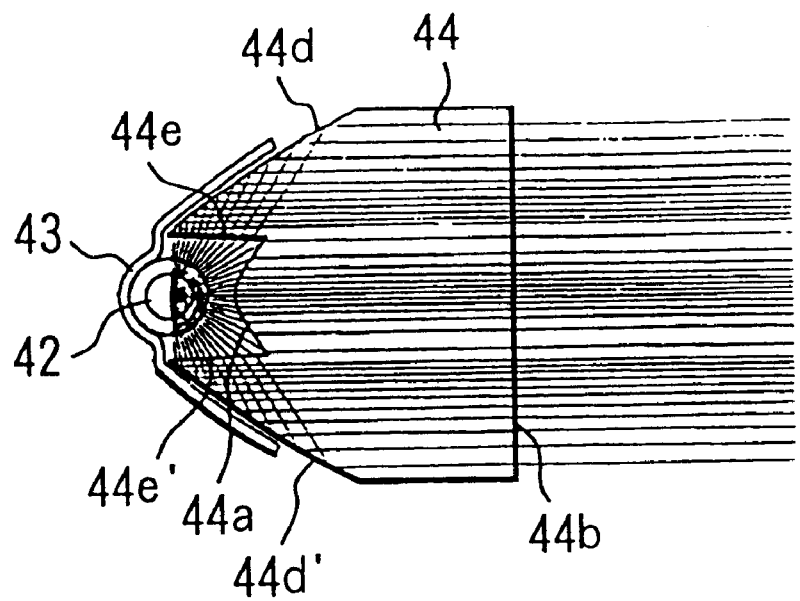
FIGS. 59(a) and 59(b) are vertical sectional views showing the flash emission device of the embodiment shown in FIG. 56 when the narrow irradiation angle is provided in the horizontal direction.
Figure 59:
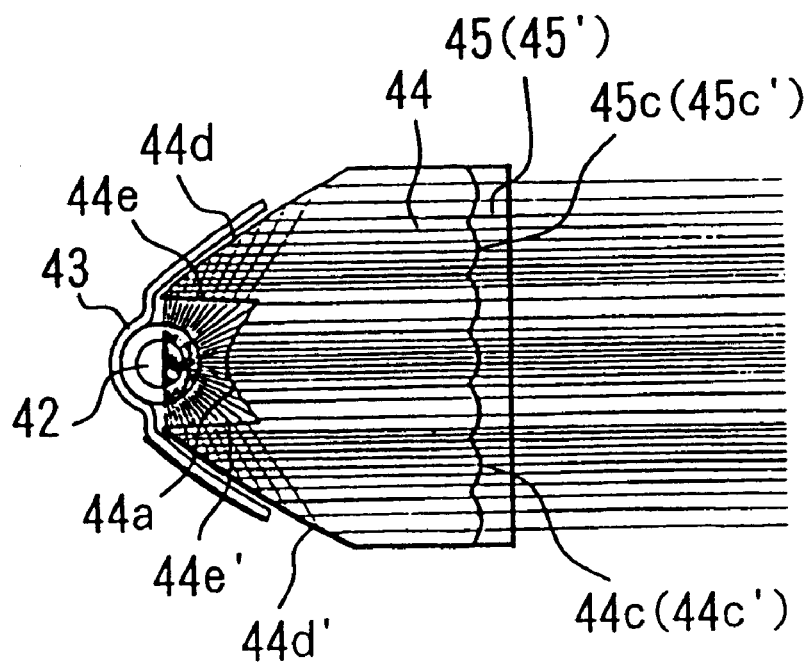
Figure 60:
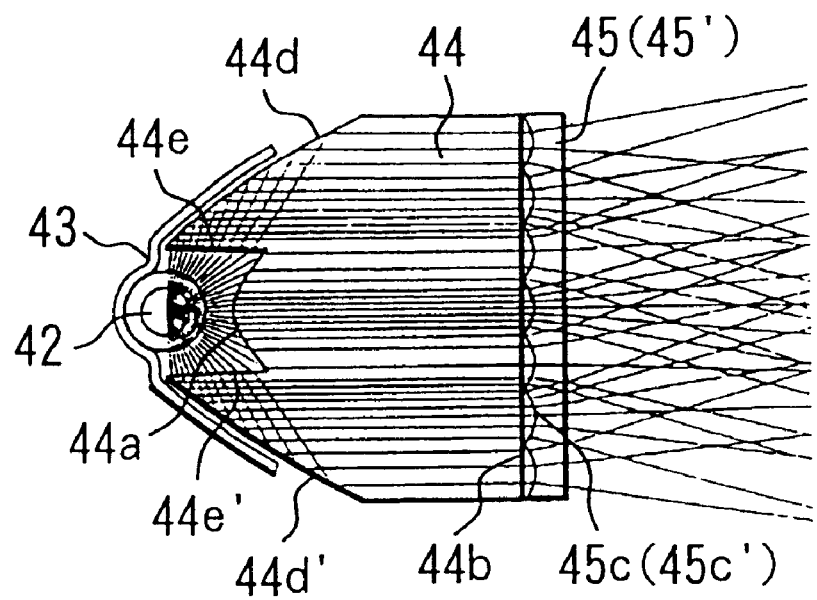
FIGS. 60(a) and 60(b) are vertical sectional views showing the flash emission device of the embodiment shown in FIG. 56 when the wide irradiation angle is provided in the horizontal direction.
Figure 60:
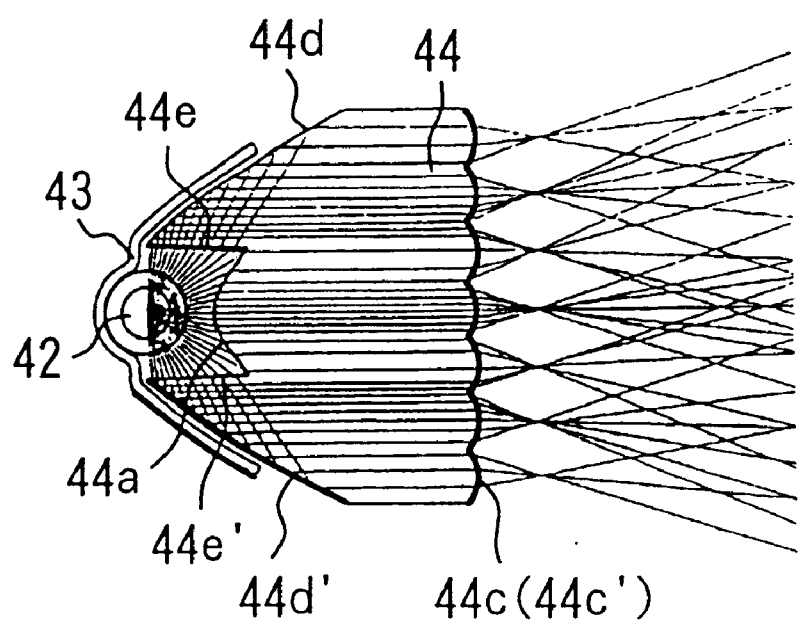

FIGS. 55 to 60 show a lighting device according to a further embodiment of the present invention, specifically a flash emission device in this embodiment. FIG. 55 is a perspective view showing the appearance of a camera including a partial sectional view of the flash emission device to which the present invention is applied. FIG. 56 is a perspective view of the essentials showing only a main optical system of the flash emission device. FIGS. 57, 58 are horizontal sectional views of the essentials constituting the optical system of the flash emission device. FIGS. 59, 60 are vertical sectional views of the essentials constituting the optical system of the flash emission device. FIGS. 57 to 60 also show light beam traces of representative light beams emitted from the center of a light source (flash discharge tube 42).

As shown in FIG. 55, the flash emission device according to this embodiment is disposed in an upper portion of a body of the camera and formed to project over the body of the camera during the use of the camera. In FIG. 55, reference numeral 101 shows the flash emission device, 111 the body of a picture taking device, 112 a lens barrel having a photographic lens, and 113 a release button. Reference numeral 114 shows an operation member for a zooming operation of the photographic lens, in which pushing the operation member forward allows zooming toward the tele side while pushing it backward allows zooming toward the wide side. Reference numeral 115 shows an operation button for switching between various modes of the camera, 116 a liquid crystal display window for letting a user know the operation of the camera, 117 a window of a photometric device for measuring luminance of outside light, and 118 a window of a viewfinder. Since the respective functions of the components except the flash emission device 101 are known techniques, detailed description thereof is omitted here. The mechanical components of this embodiment are not limited to the aforementioned ones.

Next, the components providing the optical characteristics of the flash emission device 101 of the embodiment will be described in more detail with reference to FIGS. 56, 57, and 58.

In FIGS. 56, 57, and 58, reference numeral 42 shows a flash discharge tube (xenon tube) of a straight-tube shape having a longitudinal direction for producing a flash. Reference numeral 43 shows a reflector for reflecting luminous flux traveling to the rear of an irradiation direction (in a direction opposite to a subject), of luminous flux emitted from the flash discharge tube 42, back to the irradiation direction (toward the subject). The reflector 43 is made from a metal material such as bright aluminum with its inner surface formed of a high reflectance surface, or a resin material with its inner surface formed of a metal evaporated surface of high reflectance. Reference numeral 44 shows a prism (first optical member) serving as a fixed optical member having a plurality of cylindrical lens surfaces 44c, 44c' with positive refractivity formed in portions on its exit surface in a horizontal direction. Reference numerals 45, 45' show optical panels (second optical members) serving as movable optical members having, on incidence surfaces, a plurality of cylindrical lens surfaces 45c, 45c' (FIGS. 59, 60) with negative refractivity which cancels out the refractivity of the cylindrical lens surfaces 44c, 44c' of the first optical member 44, and on exit surfaces, Fresnel lens surfaces 45d, 45d'. The second optical members 45, 45' are disposed with a fixed spacing maintained from the exit surface of the first optical member 44 and formed to be movable in the longitudinal direction of the flash discharge tube 42 and along a curved surface of the first optical member 44. The second optical members 45, 45' are movable along the first optical member 44 in contact with or in proximity to the curved surface.

In the aforementioned configuration, the flash discharge tube 42, the reflector 43, and the first optical member 44 are collectively put in a holding case or the like, not shown, to constitute a light emission unit, and the second optical members 45, 45' are moved as appropriate to a predetermined position for optical arrangement, thereby making it possible to continuously change a condensing degree. As materials of the first optical member 44 and the second optical members 45, 45', an optical resin material with high transmittance such as an acrylic resin or a glass material is suitable.

In the picture taking device 111 of the aforementioned configuration, as in the conventionally known technique, when the camera is set, for example to a "stroboscope auto mode," a central processing unit, not shown, determines whether it instructs the flash emission device 101 to emit light based on luminance of outside light measured by a photometric device, not shown, and the speed of a loaded film after the release button 113 is pressed by a user. When the central processing unit determines that "the flash emission device 101 should emit light" in a situation where a picture is to be taken, the central processing unit provides a light emission signal to cause the flash discharge tube 42 to emit light through a trigger lead wire attached to the reflector 43. Luminous flux emitted in the direction opposite to the irradiation direction (toward the subject) is incident on the first optical member 44 after reflection by the reflector 43, and luminous flux emitted in the irradiation direction is incident on the first optical member 44 disposed in the front of the flash discharge tube 42 (on the side of the subject). The luminous flux is converted to have predetermined light distribution characteristic through the first optical member 44, the second optical members 45, 45' or the like, and then exits toward the subject. The change in light distribution characteristic is achieved in this embodiment by the movement of the second optical members 45, 45' in the longitudinal direction of the flash discharge tube 42 and along the exit surface of the first optical member 44.

The embodiment is a proposal of a lighting device which, especially when photographic lens of the picture taking device is a zoom lens, simultaneously matches light distribution characteristics in both vertical and horizontal directions with the range supported by the photographic lens in taking pictures by adjusting as appropriate an amount of movement of the second optical members 45, 45' in accordance with a focal length of the lens. In the following, a setting method of an optimal distribution shape will be described in detail with reference to FIGS. 57 to 60.

FIGS. 59, 60 are vertical sectional views in a diametrical direction of the flash discharge tube 42 for illustrating basic principles in varying an irradiation angle vertically. FIG. 59(*a*), FIG. 59(*b*) are cross sections taken along lines AA and BB in FIG. 57, respectively, while FIGS. 60(*a*), FIG. 60(*b*) are cross sections taken along lines CC and DD in FIG. 58, respectively. The reference numerals in FIGS. 59, 60 correspond to those in FIGS. 56, 57, and 58.

As seen from FIG. 56, the plurality of cylindrical lens surfaces 44*c*, 44*c*' with positive refractivity formed in the peripheral portions in the horizontal direction on the exit surface of the first optical member 44 are formed only in a generally half area of the exit surface corresponding to the peripheral portions in the longitudinal direction of the flash discharge tube 42, and a portion near the center in the horizontal direction on the exit surface of the first optical member 44 has a cylindrical surface (cylindrical lens surface) 44*b* formed thereon with refractivity in the horizontal direction.

First, description will be made for a condensed or diverged state of exiting light in the longitudinal direction of the flash discharge tube 42 with reference to FIGS. 57, 58. FIG. 57 shows the most condensed state in the embodiment, in which the second optical members 45, 45' serving as irradiation angle varying members have been moved to the positions where the end faces thereof align with both ends of the first optical member 44.

In this state, as seen from the traces of the light beams emitted from the center in the longitudinal direction of the central axis of an illuminant, light is condensed horizontally to a certain degree by the cylindrical lens surface 44*b* with refractivity in the horizontal direction formed on the exit surface of the first optical member 44 in the central portion in the horizontal direction of the first optical member 44. In the peripheral portions, light is condensed toward the exit optical axis direction by providing high refractivity in the horizontal direction of the Fresnel lens surfaces 45*d*, 45*d*' formed on the exit surfaces of the second optical members 45, 45' in addition to the refractivity of the cylindrical lens surfaces 44*c*, 44*c*' formed in the peripheral portions in the horizontal direction on the exit surface of the first optical member 44.

FIG. 58 illustrates the state of the widest irradiation range in the horizontal direction in the embodiment, in which the second optical members 45, 45' serving as the irradiation angle varying members have been moved closer to each other to abut in the central portion in the horizontal direction. In this state, as seen from the light beam traces in FIG. 58, in the central portion in the horizontal direction, both lens effects of the cylindrical lens surface 44*b* (FIG. 57) with refractivity in the horizontal direction formed on the exit surface of the first optical member 44 and the Fresnel lens surfaces 45*d*, 45*d*' with refractivity in the horizontal direction on the exit surfaces of the second optical members 45, 45'slightly excessively condense luminous flux emitted from the center in the horizontal direction of the central axis of the illuminant, that is, the luminous flux is once crossed on the exit optical axis and then irradiated toward the subject in a diverged state to a certain degree. In peripheral portions, luminous flux passes through the plurality of cylindrical lens surfaces 44*c*, 44*c*' with refractivity in the vertical direction formed in the peripheral portions in the horizontal direction on the exit surface of the first optical member 44 and then travels toward peripheral areas of a required irradiation angle range. Since no Fresnel lens surface is used, no loss of light quantity is produced due to an unnecessary Fresnel edge surface, and it is possible to obtain an ideal lighting optical system in which unnecessary irradiation light to the outside of a required view angle is reduced to a minimum. In this manner, in the optical system of this embodiment, the shapes of the respective components are designed such that light can be condensed most efficiently in the peripheral portions where light can be limited in its exit direction to a certain degree and that luminous flux efficiently reaches the peripheral portions in the horizontal direction in the state of the widest view angle.

While FIGS. 57, 58 show the maximally condensed state or diverged state in the horizontal direction, the operation of varying an irradiation angle is not limited to the two states. An amount of movement of the second optical members 45, 45' can be set to an arbitrary position between the aforementioned two states, and the irradiation angle can continuously be changed in accordance with the movement amount.

Next, more detailed description will be made for the shape of the cylindrical lens surface 44*b* with refractivity in the horizontal direction in the center in the horizontal direction on the exit surface which considerably influences the aforementioned condensing degree in the longitudinal direction of the central axis of the illuminant, as well as a relationship between that shape and the sizes of the respective components constituting the optical system. For the shape of the cylindrical lens surface 44*b* with refractivity in the horizontal direction provided in the center in the horizontal direction on the exit surface of the first optical member 44, if a surface with high refractivity in the horizontal direction is formed in a portion near the center in the horizontal direction on the exit surface of the first optical member 44, luminous flux emitted from the center in the horizontal direction of the flash discharge tube 42 can be efficiently condensed. However, luminous flux emitted from the peripheral portions in the horizontal direction of the flash discharge tube 42 is diverged since the refractivity is too large, or more luminous flux travels in an unexpected direction due to total reflection, so that an efficient optical system cannot necessarily be formed. In addition, an optimal radius of curvature in this case depends on a size allowable for an optical system.

Since a lighting optical system giving high priority on a smaller size has little space available in a depth dimension of the optical system, it is desirable to minimize the refractivity of the cylindrical lens surface 44*b* of the first optical member 44 formed to have a constant radius of curvature. However, certain refractivity is required for efficiently condensing luminous flux arriving near the center in the horizontal direction. From such a tradeoff, an effective approach for efficiently condensing light is to increase refractivity of the cylindrical lens surface 44*b* within an allowable range in terms of size. On the other hand, certain limitations are imposed on the upper limit to the refractivity. Specifically, as described above, while excessively high refractivity of the cylindrical lens surface 44*b* than is required does not cause too serious a problem for luminous flux emitted from the center in the horizontal direction of the flash discharge tube 42, some of luminous flux emitted from portions near both terminals in the horizontal direction of the flash discharge tube 42 is totally reflected by the cylindrical lens surface 44b of the first optical member 44 to result in loss of light which is out of a predetermined irradiation range. Thus, it is preferable to set refractivity of the cylindrical lens surface 44b such that unnecessary luminous flux as mentioned above is not produced and the largest possible refraction is obtained within an allowable size range.

In the peripheral portions in the horizontal direction of the optical system, it can be seen that the Fresnel lens surfaces 45d, 45d' formed on the exit surfaces of the second optical members 45, 45' in addition to the refractivity of the cylindrical lens surface 44b formed on the first optical member 44 further condense light to form luminous flux which travels toward the exit optical axis. In this manner, for the peripheral portions in the longitudinal direction of the flash discharge tube 42, since luminous flux emitted from the central axis of the illuminant can be limited in its direction to some degree, high refractivity does not cause luminous flux to be totally reflected unnecessarily and light can be efficiently condensed.

Based on the foregoing, the relationship among the sizes of the respective components will be hereinafter described when the optical system is formed in consideration of the aforementioned conditions. First, as a condition for not totally reflecting luminous flux emitted from portions near the terminals of the flash discharge tube 42, the following condition must be satisfied:

$$L/[2 \cos \{\sin^{-1}(1/n)\}] \leq R \quad (1)$$

where R represents the radius of curvature of the cylindrical lens surface 44b, n represents the refractive index of the material of the first optical member 44, and L represents the effective arc length of the flash discharge tube 42.

Considering the balance between the cylindrical lens surface 44b and the overall shape of the optical system, length E of the cylindrical lens surface in the depth direction and opening width F of the cylindrical lens surface preferably fall within a range defined by the following relational expression:

$$0.4 \cdot L \leq E \leq 1.2 \cdot L \quad (2)$$

$$1.2 \cdot L \leq F \leq 3.0 \cdot L \quad (3)$$

With the values set in the aforementioned ranges, an efficient optical system can be formed with a favorable balance between the size and performance. It should be noted that the above equations (2), (3) are defined because a value lower than the lower limit causes a problem in performance and a value higher than the upper limit leads to an unbalanced relationship between an excessively large size and the overall shape. In both cases, a favorable balance is not achieved as a product. This embodiment takes the aforementioned conditions into account and employs values approximately intermediate in the above conditional expressions (2), (3) from the balance between the allowable depth and the effective arc length of the flash discharge tube 42.

Next, description will be made with reference to FIGS. 59, 60 for a change in irradiation angle in the diametrical direction of the flash discharge tube 42 in synchronization with a change in irradiation range in the longitudinal direction of the flash discharge tube 42 shown in FIGS. 57, 58. In FIGS. 59, 60, a glass tube is shown with its inner and outer diameters as the flash discharge tube 42. For a light emitting phenomenon of the flash discharge tube 42 of this type, light is often emitted in the full inner diameter to improve efficiency, and it can be safely said that the flash discharge tube 42 emits light generally uniformly from the light emission point over the entire inner diameter of the flash discharge tube 42. For facilitating description, however, luminous flux emitted from the central axis of the illuminant is considered as representative luminous flux, and FIGS. 59, 60 intentionally show only the luminous flux emitted from the central axis of the illuminant. In actual light distribution, besides the shown representative luminous flux, luminous flux is also emitted from peripheral portions in the diametric direction of the flash discharge tube 42 and thus the light distribution is changed such that the light is spread out slightly as a whole, although the tendency of the light distribution is almost the same. Thus, the following description will be made on the basis of the representative luminous flux.

First, the characteristic shapes of the optical system of the flash emission device 101 configured as above will be described in order. The reflector 43 has a portion behind the central axis of the illuminant (in a direction opposite to a subject) in a semicylindrical shape substantially concentric with the flash discharge tube 42. This shape is effective for returning light reflected by the reflector 43 toward the central axis of the illuminant and advantageously resists adverse effect due to refraction by the glass of the flash discharge tube 42. This configuration also facilitates this discussion since light reflected by the reflector 43 can be handled as emitted light substantially equivalent to direct light from the central axis of the illuminant, and the overall shape of the subsequent optical system can advantageously be reduced size. The shape is exactly a semicylinder because a smaller size leads to an increased size of the first optical member 44 to condense side light, and a larger size leads to reduced efficiency due to an increased quantity of luminous flux held within the reflector 43, and thus both of them are not desirable.

On the other hand, the vertically upper and lower peripheral portions of the reflector 43 are formed to extend behind the first optical member 44 for the following reasons. Specifically, luminous flux emitted from the central axis of the illuminant can be ideally totally reflected by the back reflection surfaces 44d, 44d' as shown, while some of luminous flux (luminous flux on the side of a subject) emitted from the right of the illuminant central axis in FIGS. 57, 58 cannot be totally reflected and exits from the reflection surfaces 44d, 44d' especially when the flash discharge tube 42 has a large inner diameter. The aforementioned shape of the reflector 43 is provided to effectively use such luminous flux. More specifically, as shown, the shape of reflector 43 extending to the back face of the first optical member 44 and extending along the shapes of the reflection surfaces 44d, 44d' allows reentrance of luminous flux which was not totally reflected and once exited from the reflection surfaces 44d, 44d', and the reflected luminous flux can be efficiently guided into a predetermined irradiation range.

The first optical member 44 is designed to have a shape as described below. First, luminous flux directed near the exit optical axis is once converted to be parallel with the exit optical axis as shown in the section by the cylindrical lens surface 44a for providing positive refractivity in the vertical direction formed on the incidence surface of the first optical member 44. Luminous flux at a large angle with respect to the exit optical axis is refracted by the incidence surfaces 44e, 44e' of the first optical member 44, and then totally reflected by the reflection surfaces 44d, 44d'. The luminous flux emitted from the illuminant central axis is similarly converted to be parallel with the exit optical axis in the section.

In this manner, the luminous flux emitted from the illuminant central axis is once made in parallel with the exit optical axis in the section. Then, as shown in FIGS. 59, 60, the luminous flux can be changed in its irradiation angle range continuously by appropriately setting the shape of the exit surface of the first optical member 44 and the shape of the incidence surfaces of the second optical members 45, 45'.

First, in a portion near the center in the horizontal direction shown in FIG. 59(a), the exit surface 44b of the first optical member 44 has no power for the section to maintain the most condensed state. Also, in a peripheral portion in the horizontal direction shown in FIG. 59(b), the most condensed state is maintained due to the plurality of cylindrical lens surfaces 44c, 44c' with positive refractivity in the vertical direction formed in the horizontal direction on the exit surface of the first optical member 44 and the plurality of cylindrical lens surfaces 45c, 45c' with negative refractivity in the vertical direction formed on the incidence surfaces of the second optical members 45, 45' provided to cancel out the power of the cylindrical lens surfaces 44c, 44c'. Consequently, in the state corresponding to FIG. 57 where the second optical members 45, 45' are most widely spaced at positions on both ends in the horizontal direction of the first optical member 44, the luminous flux in all the area is condensed shown in FIG. 59(a) or FIG. 59(b), resulting in the most condensed state.

On the other hand, when the second optical members 45, 45' are positioned closest to each other in the central portion in the horizontal direction as shown in FIG. 58, the first optical member 44 has no power for the section near the center in the horizontal direction shown in FIG. 60(a), while the second optical members 45, 45' have the plurality of cylindrical lens surfaces 45c, 45c' formed thereon with negative refractivity in the vertical direction, so that luminous flux after passing through both of them is diverged by the cylindrical lens surfaces 45c, 45c'. Also, in a peripheral portion in the horizontal direction of the first optical member 44 shown in FIG. 60(b), the irradiation angle is wide due to the plurality of cylindrical lens surfaces 44c, 44c' with positive refractivity in the vertical direction formed in the horizontal direction on the exit surface of the first optical member 44, and this diverged state is maintained since the second optical members 45, 45' have been moved and do not exist in the front thereof. Consequently, in the state corresponding to FIG. 58 where the second optical members 45, 45' are closest to each other, the luminous flux in all the area is diverged vertically in FIG. 60(a) or FIG. 60(b), and as a result, the widest irradiation angle range in the vertical direction can be provided.

Figure 61:
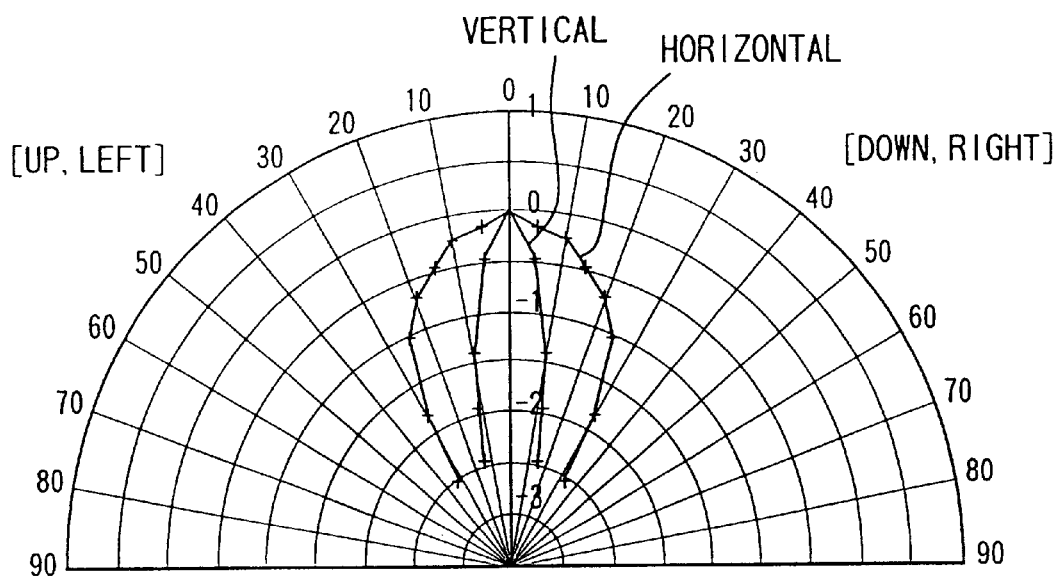
FIG. 61 is a light distribution characteristic view for the flash emission device of the embodiment shown in FIG. 56 when the narrow irradiation angle is provided in the horizontal direction.
Figure 62:
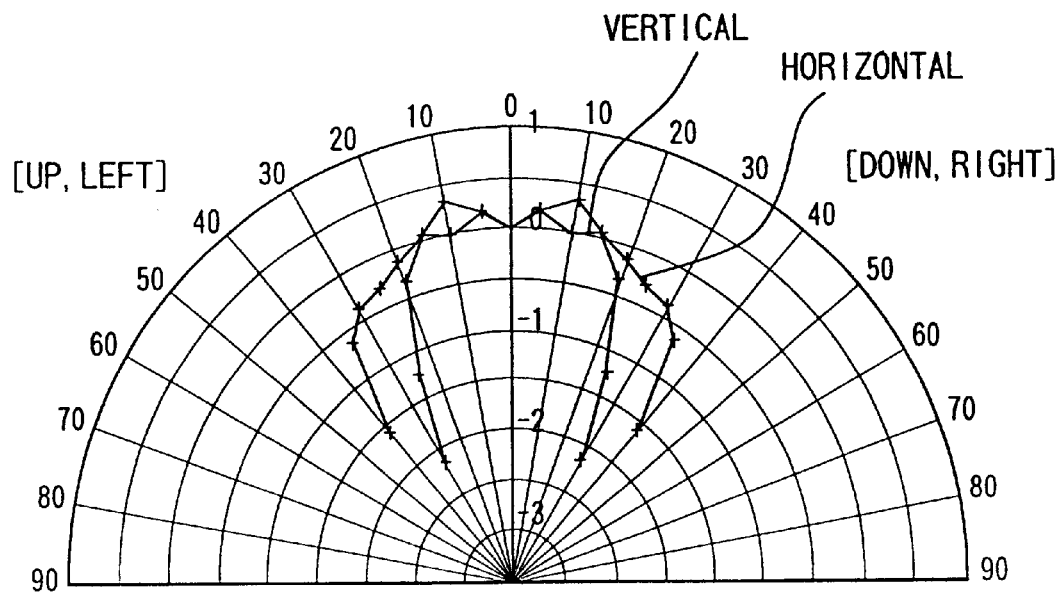
FIG. 62 is a light distribution characteristic view for the flash emission device of the embodiment shown in FIG. 56 when the wide irradiation angle is provided in the horizontal direction.

At each point during movement of the second optical members 45, 45' other than the aforementioned two states, the ratio of condensing area range to diverging area range is continuously changed, and the irradiation angle as a whole can be continuously changed. In this manner, for light distribution characteristic in the vertical direction, the irradiation angle can be continuously changed by moving the second optical members 45, 45' over a required distance horizontally along the cylindrical lens surface on the exit surface of the first optical member 44 with respect to the fixed first optical member 44. FIGS. 61, 62 show actual light distribution characteristics obtained by the configuration described above. FIG. 61 illustrates a narrow horizontal irradiation angle range corresponding to FIGS. 57, 59, while FIG. 62 illustrates a wide horizontal irradiation angle range corresponding to FIGS. 59, 60.

As shown, it can be seen that the irradiation angle range significantly varies in the vertical and horizontal directions.

While FIGS. 61, 62 show light distribution characteristic diagrams for two states of the most condensed state (FIG. 61) and the most diverged state (FIG. 62), light distribution characteristic obtained in the embodiment is not limited to the two states, and light distribution characteristics between the two states can be continuously obtained in accordance with an amount of movement of the second optical members 45, 45'.

While the second optical members 45, 45' in the embodiment have been described as moved symmetrically about the exit optical axis in the horizontal direction, the movement of the second optical members 45, 45' is not necessarily limited to such symmetrical one. For example, when the optical axis for taking pictures is deviated from the lighting optical system, it is necessary to match the optical axis for taking pictures with the optical axis center of the lighting optical system in a predetermined distance, in which case an operation for inclining the lighting optical axis is performed (parallax correction) and thus the members can be moved over different distances from each other intentionally to obtain bilaterally asymmetrical light distribution characteristic.

While the plurality of cylindrical lens surfaces 44c, 44c' with positive refractivity in the vertical direction are formed in the peripheral portions in the horizontal direction on the exit surface of the first optical member 44 and the plurality of cylindrical lens surfaces 45c, 45c' with negative refractivity in the vertical direction are formed on the incidence surfaces of the second optical members 45, 45' in the embodiment, the configuration is not necessarily limited thereto. For example, a cylindrical lens surface with negative refractivity in the vertical direction may be formed on the exit surface of the first optical member 44 and cylindrical lens surfaces with positive refractivity in the vertical direction may be formed on the incidence surfaces of the second optical members 45, 45'. A characteristic advantage is a small loss of light quantity due to leakage to allow an efficient lighting optical system since a spacing is small between the first optical member 44 and the second optical members 45, 45'. In addition, the area of the incidence surfaces of the second optical members is smaller than the area of the exit surface of the first optical member, and the moving range of the second optical members is limited to the range corresponding to the exit surface of the first optical member.

Figure 63:
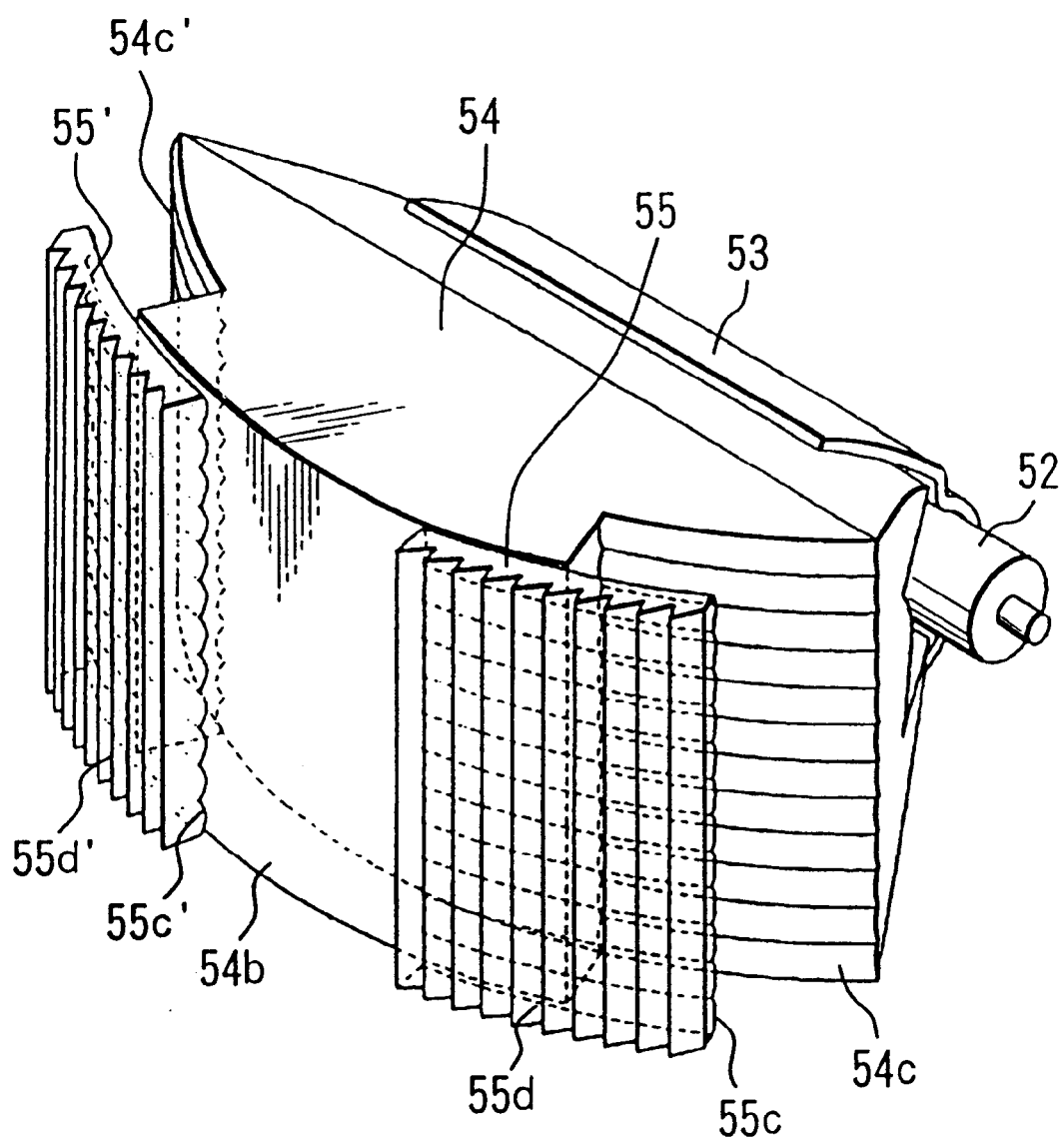
FIG. 63 is a perspective view of the essentials showing an optical system of a flash emission device according to a further embodiment of the present invention.
Figure 64:
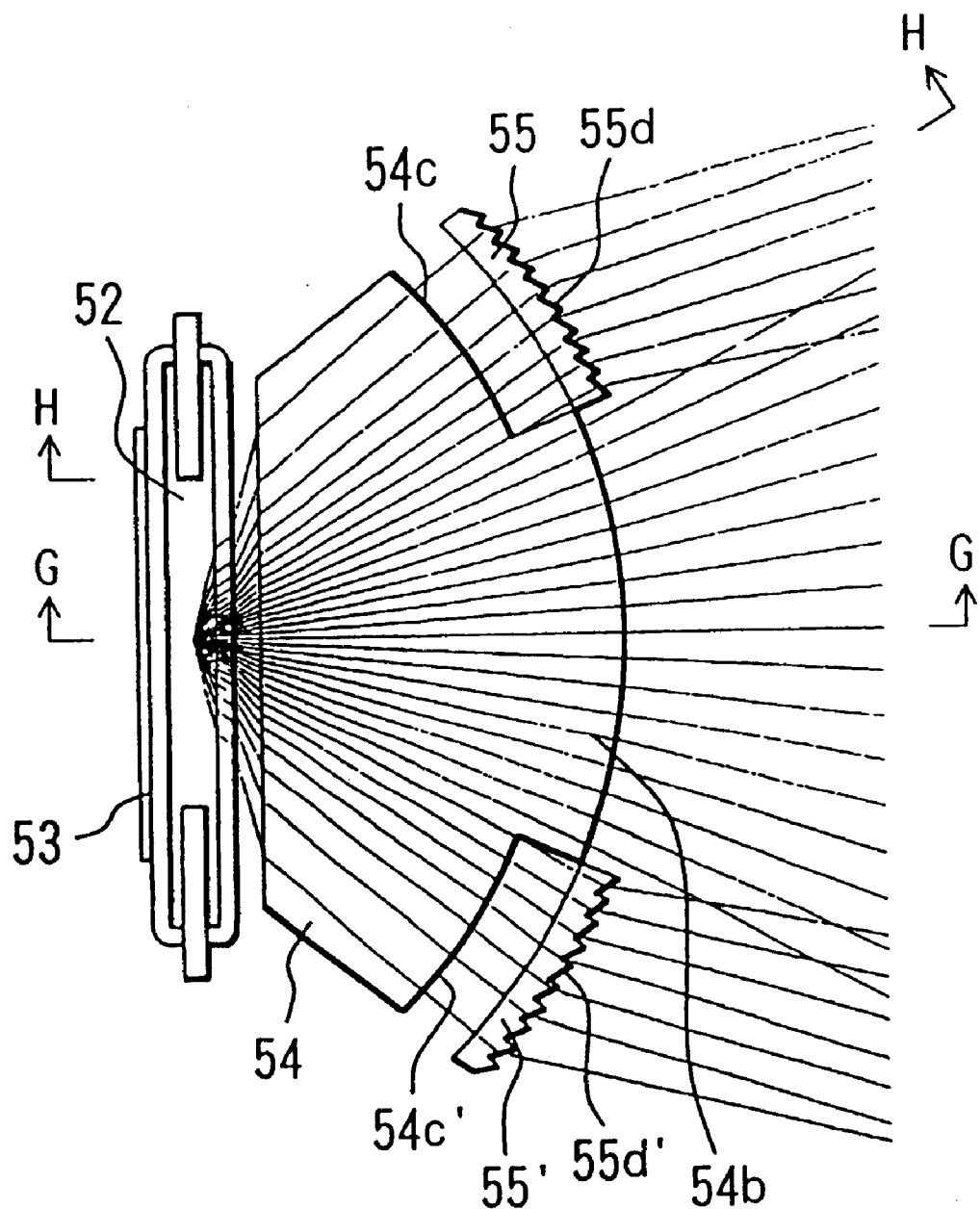
FIG. 64 is a horizontal sectional view showing the flash emission device of the embodiment shown in FIG. 63 when a narrow irradiation angle is provided in a horizontal direction.
Figure 65:
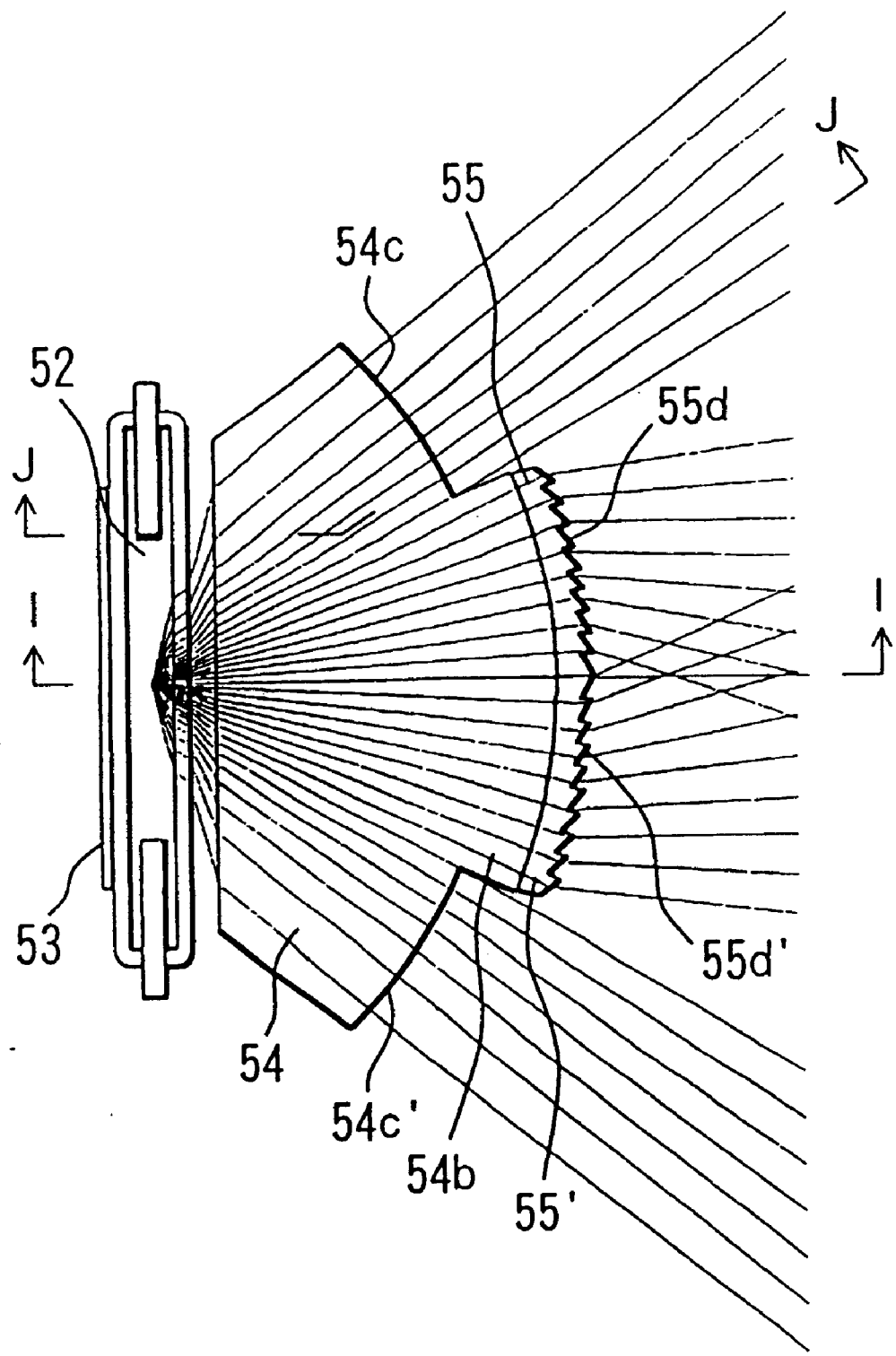
FIG. 65 is a horizontal sectional view showing the flash emission device of the embodiment shown in FIG. 63 when a wide irradiation angle is provided in the horizontal direction.
Figure 66:
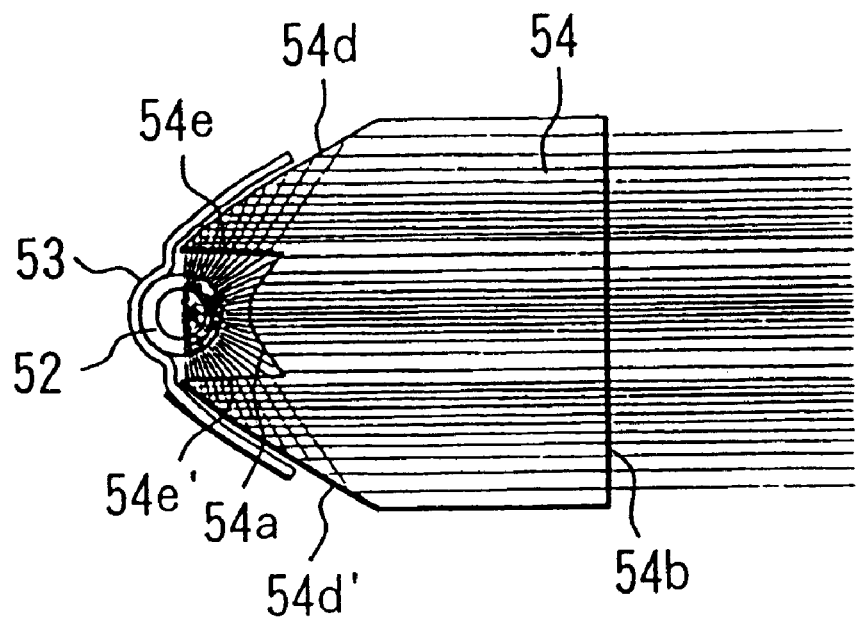
FIGS. 66(a) and 66(b) are vertical sectional views showing the flash emission device of the embodiment shown in FIG. 63 when the narrow irradiation angle is provided in the horizontal direction.
Figure 66:
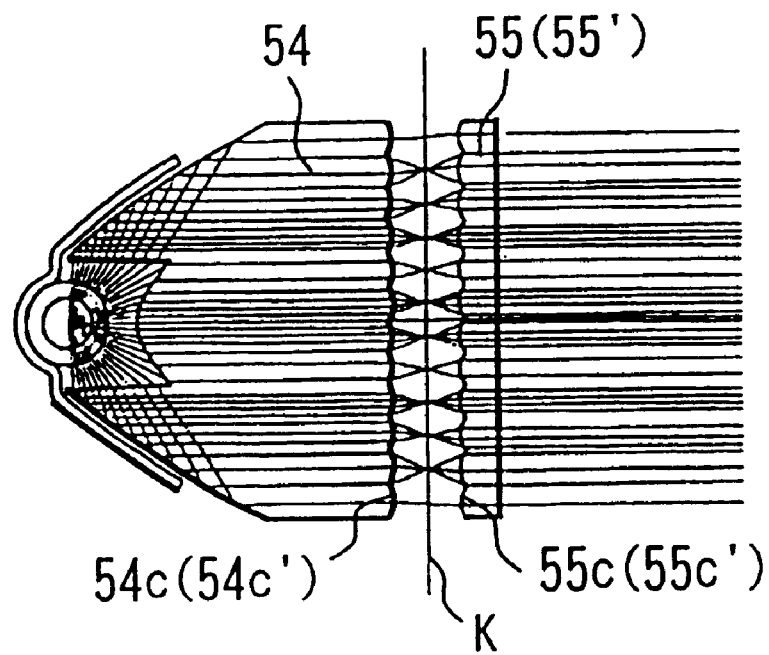
Figure 67:
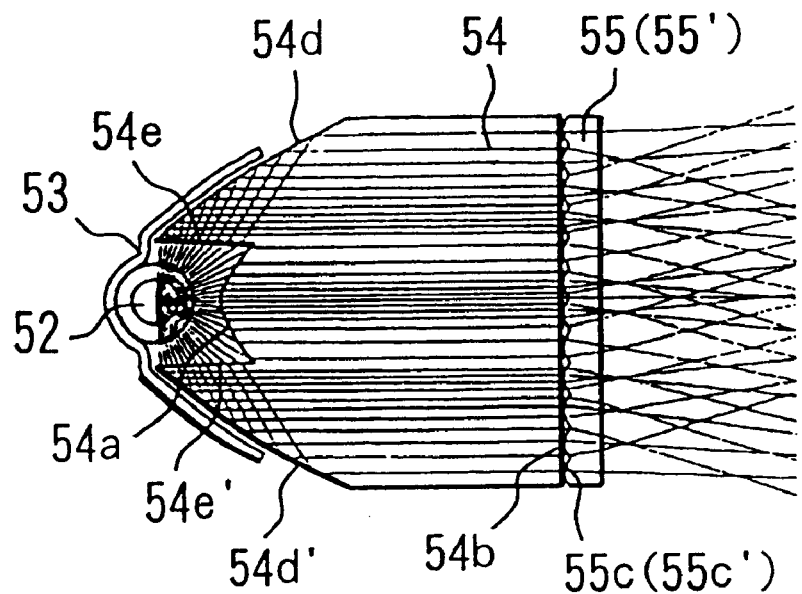
FIGS. 67(a) and 67(b) are vertical sectional views showing the flash emission device of the embodiment shown in FIG. 63 when the wide irradiation angle is provided in the horizontal direction.
Figure 67:
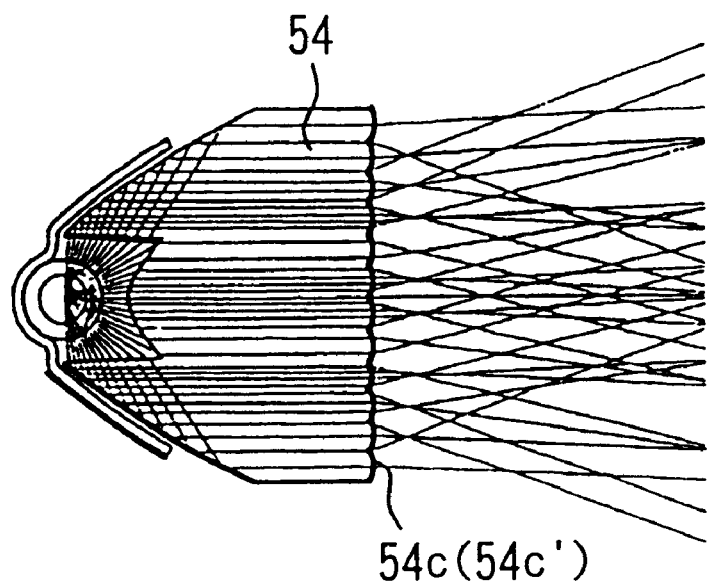

Next, another embodiment of the present invention will be described. FIG. 63 is a perspective view showing only the appearance of a main optical system of a flash emission device. FIGS. 64, 65 are horizontal sectional views of the essentials constituting the optical system of the flash emission device and FIGS. 66, 67 are vertical sectional views of the essentials constituting the optical system of the flash emission device. FIGS. 64 to 67 also show light beam traces of representative light beams emitted from a light source.

In FIGS. 64 to 67, reference numerals 52 and 53 show a flash discharge tube (xenon tube) and a reflector, respectively, and both are substantially the same as the preceding embodiment. Reference numeral 54 shows a first optical member having a plurality of cylindrical lens surfaces 54c, 54c' with positive refractivity in a vertical direction formed in peripheral portions in a horizontal direction on an exit surface, in which a smaller pitch is set in the cylindrical lens surfaces as compared with the preceding embodiment. Reference numerals 55, 55' show second optical members which have, on incidence surfaces, a plurality of cylindrical lens surfaces 55c, 55c' with positive refractivity in the vertical direction formed to have substantially the same pitch and shape as the cylindrical lens surfaces 54c, 54c' on the exit surface of the first optical member 54, and on exit surfaces, Fresnel lens surfaces 55d, 55d'. The second optical members 55, 55' are disposed with a fixed spacing maintained from the exit surface of the first optical member 54 and formed to be movable in a longitudinal direction of the flash discharge tube 52 and along a curved surface of the first optical member 54.

In the aforementioned configuration, the flash discharge tube 52, the reflector 53, and the first optical member 54 are collectively put in a holding case or the like, not shown, to constitute a light emission unit, and the second optical members 55, 55' are moved as appropriate to a predetermined position for optical arrangement by rotating them about a predetermined rotation axis along the curved surface in the horizontal direction, thereby making it possible to continuously change a condensing degree. As materials of the first optical member 54 and the second optical members 55, 55', an optical resin material with high transmittance such as an acrylic resin or a glass material is suitable.

Similarly to the preceding embodiment, this embodiment is a proposal of a lighting device which, when photographic lens of the picture taking device is a zoom lens, simultaneously matches light distribution characteristics in both vertical and horizontal directions with the range supported by the photographic lens in taking pictures by adjusting as appropriate an amount of movement of the second optical members 55, 55' in a rotational operation along the curved surface in the horizontal direction in accordance with a focal length of the lens. In the following, a setting method of an optimal distribution shape will be described in detail with reference to FIGS. 63 to 67.

FIGS. 66, 67 are vertical sectional views in a diametrical direction of the flash discharge tube 52 of this embodiment for illustrating basic principles in varying an irradiation angle vertically. FIG. 66(a), FIG. 66(b) are cross sections taken along lines GG and HH in FIG. 64, respectively, while FIG. 67(a), FIG. 67(b) are cross sections taken along lines II and JJ in FIG. 65, respectively. The reference numerals in FIGS. 66, 67 correspond to those in FIGS. 64, 65.

The plurality of cylindrical lens surfaces 54c, 54c' with positive refractivity in the vertical direction formed on the exit surface of the first optical member 54 are formed only in areas corresponding to the peripheral portions in the horizontal direction. A cylindrical surface 54b is formed near the center in the horizontal direction on the exit surface of the first optical member 54 to project from the plurality of cylindrical lens surfaces 54c, 54c' in the peripheral portions such that a gap between the first and second optical members is reduced to minimize loss of light quantity caused by luminous flux emanating from the first optical member 54 and escaping from that gap before it is incidence on the second optical member 55 or 55'.

First, description will be made for a condensed or diverged state of exiting light in the longitudinal direction of the flash discharge tube 52 with reference to FIGS. 64, 65. FIG. 64 shows the most condensed state in the embodiment, in which the end faces of the second optical members 55, 55' for varying an irradiation angle are open to the left and right in the horizontal direction and have been moved to positions corresponding to the peripheral portions in the horizontal direction of the first optical member 54. This is substantially the same optical arrangement as the most condensed state in the preceding embodiment except that the first optical member 54 and the second optical members 55, 55' are placed with a certain gap interposed between them. As later described, while the gap cannot be reduced to a certain value or less from a functional viewpoint, the second optical members 55, 55' are moved in a generally arc shape horizontally about the center in the horizontal direction of the central axis of an illuminant of the flash discharge tube 52, so that only a small quantity of luminous flux actually escapes from the gap. Thus, similarly to the preceding embodiment, light can be efficiently condensed by the cylindrical lens surfaces 54c, 54c' provided in the peripheral portions in the horizontal direction on the exit surface of the first optical member 54, and in addition, by the converging action of the Fresnel lens surfaces 55d, 55d' positioned in the peripheral portions in the horizontal direction on the exit surfaces of the second optical members 55, 55' as shown in the light beam traces in FIG. 64.

Next, the state of the widest irradiation angle range will be described with reference to FIG. 65. Shown herein is a state in which the second optical members 55, 55' serving as operating members for varying an irradiation angle have been moved to positions at which they abut on each other in the center in the horizontal direction of the first optical member 54. As shown, near the center in the horizontal direction, the overlapping two lenses of the first optical member 54 and the second optical members 55, 55' define an irradiation range, and combined refractivity is high to result in luminous flux being diverged in a certain range rather than being condensed. On the other hand, in a peripheral portions in the horizontal direction, since the Fresnel lens surfaces 55d, 55d' formed on the second optical members 55, 55' make no contribution, light distribution characteristic is regulated only by the cylindrical lens surfaces 54c, 54c' formed in the peripheral portions in the horizontal direction on the exit surface of the first optical member 54. In this event, a large proportion of luminous flux entering the peripheral portions in the horizontal direction at a relatively large incident angle reaches a peripheral portion of a required irradiation range due to low refractivity of the cylindrical lens surfaces 54c, 54c' formed on the first optical member 54. Consequently, in the state shown in FIG. 65, light distribution characteristics suitable for illuminating a wider area can be obtained as exit angle distribution, as compared with the state shown in FIG. 64 where more luminous flux travels toward the exit optical axis.

Next, description will be made with reference to FIGS. 66, 67 for a change in irradiation angle in the diametrical direction of the flash discharge tube 52 in synchronization with a change in irradiation range in the longitudinal direction of the flash discharge tube 52 shown in FIGS. 64, 65. In FIGS. 66, 67, components identical to those in FIGS. 64, 65 are designated by the same reference numerals.

The characteristic of the vertical sectional shape shown in FIGS. 66, 67 is that both of the exit surface of the first optical member 54 and the incidence surfaces of the second optical members 55, 55' are formed of convex lens surfaces in this embodiment, while they are formed of corresponding concave and convex lens surfaces in the preceding embodiment. In the following, description will be focused on the configuration.

Luminous flux emitted from the central axis of the illuminant is once converted into luminous flux in parallel with the exit optical axis by the actions of the respective surfaces of the first optical member 54. Then, the combination of the first optical member 54 and the second optical members 55, 55' can change a condensed or diverged state. Each of the states will be described in order.

First, near the center in the horizontal direction shown in FIG. 64(a), since the first optical member 54 has no refractivity for this section and the second optical members 55, 55' do not exist at this position, the most condensed state through the first optical member 54 is maintained. In a peripheral portion in the horizontal direction shown in FIG. 64(b), since the plurality of cylindrical lens surfaces 54c, 54c' with positive refractivity in the vertical direction formed on the exit surface of the first optical member 54 and the plurality of cylindrical lens surfaces 55c, 55c' with positive refractivity in the vertical direction formed on the second optical members 55, 55' to have the same pitch and shape as the cylindrical lens surfaces 54c, 54c' are disposed exactly symmetrically about a focal point K, the most condensed state is also maintained in this case as shown. Consequently, in the state corresponding to FIG. 64 where the second optical members 55, 55' are rotated to the positions corresponding to both ends in the horizontal direction of the first optical member 54, luminous flux in all the area is condensed as shown in FIG. 66(a) or FIG. 66(b), resulting in the most condensed state.

On the other hand, when the second optical members 55, 55' are closest to each other in the horizontal direction as shown in FIG. 65, near the center in the horizontal direction on the exit surface of the first optical member 54 shown in FIG. 67(a), the first optical member 54 has no power in the section, while the second optical members 55, 55' have the plurality of cylindrical lens surfaces 55c, 55c' formed on the incidence surfaces with positive refractivity in the vertical direction, so that luminous flux after passing through both of them is diverged vertically by the cylindrical lens surfaces 55c, 55c'. In a peripheral portion in the horizontal direction on the exit surface of the first optical member 54 shown in FIG. 67(b), since luminous flux is diverged by the plurality of cylindrical lens surfaces 54c, 54c' with positive refractivity in the vertical direction formed on the exit surface of the first optical member 54, and the second optical members 55, 55' do not exist on the side of a subject, a diverged state is maintained. Consequently, in the state corresponding to FIG. 65 where the second optical members 55, 55' are closest to each other, luminous flux in all the area is diverged as shown in FIG. 67(a) or FIG. 67(b), and as a result, the widest irradiation angle range in the vertical direction can be provided. At each point during movement of the second optical members 55, 55' other than the aforementioned two states, the ratio of condensing area range to diverging area range is continuously changed, and the irradiation angle as a whole can be continuously changed.

In this manner, for light distribution characteristic in the vertical direction, the irradiation angle can be continuously changed by rotating the second optical members 55, 55' over a required distance about the rotation axis along the curved surface in the horizontal direction with respect to the fixed first optical member 54. In this embodiment, a smaller pitch is provided in the plurality of cylindrical lens surfaces 54c, 54c', and 55c, 55c' with positive refractivity in the vertical direction as compared with the preceding embodiment.

The reason thereof will be described next. As shown in FIG. 66(b), in the condensing operation of this embodiment, light is once condensed onto the line K and then incident on the cylindrical lens surfaces 55c, 55c' of the second optical members 55, 55' for condensing light. This inevitably requires a gap of a certain amount or more between the disposed lenses. As described above, however, too large a gap causes more luminous flux to escape from between the lenses and thus not to function effectively. This problem is solved in this embodiment by reducing the pitch in the cylindrical lens surfaces 54c, 54c' and 55c, 55c' as a means for minimizing loss of luminous flux without affecting the condensing operation in the aforementioned optical system.

While the second optical members 55, 55' in the embodiment have been described as moved symmetrically about the exit optical axis in the horizontal direction, the movement of the second optical members 55, 55' is not necessarily limited to such symmetrical one. The members may be moved over different distances from each other intentionally to obtain bilaterally asymmetrical light distribution.

In addition, while the Fresnel lens surfaces 55d, 55d' are provided for the exit surfaces of the second optical members 55, 55' to achieve a condensing action in the aforementioned embodiment, the shape of the exit surface is not limited to such Fresnel lens surfaces 55d, 55d', and may be formed of, for example, a cylindrical lens surface with a constant radius of curvature, in which configuration an optical system can be formed with a smaller loss of light quantity. Furthermore, the area of the incidence surfaces of the second optical members is smaller than the area of the exit surface of the first optical member, and the moving range of the second optical members is limited to the range corresponding to the exit surface of the first optical member.

Figure 68:
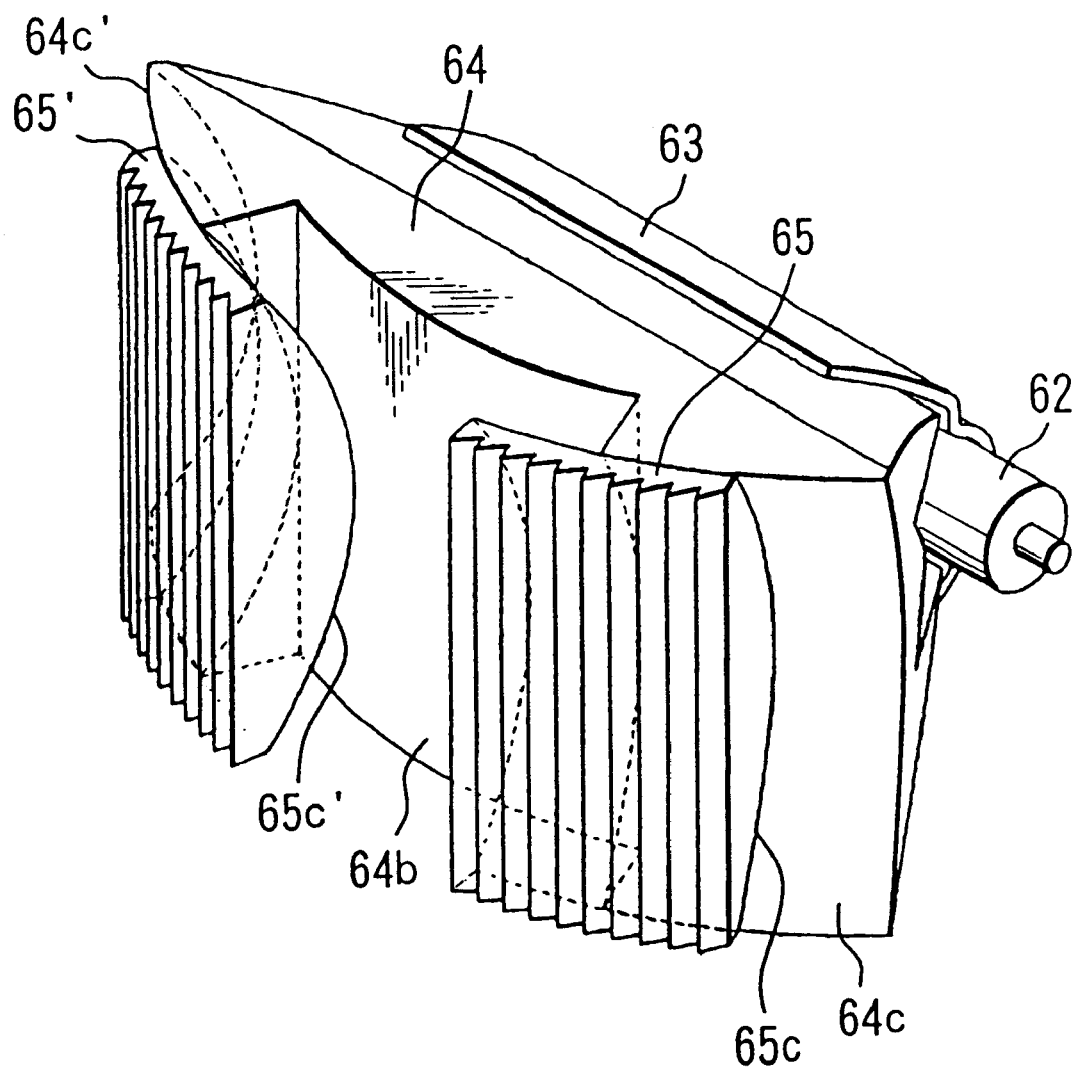
FIG. 68 is a perspective view of the essentials showing an optical system of a flash emission device according to a further embodiment of the present invention.
Figure 69:
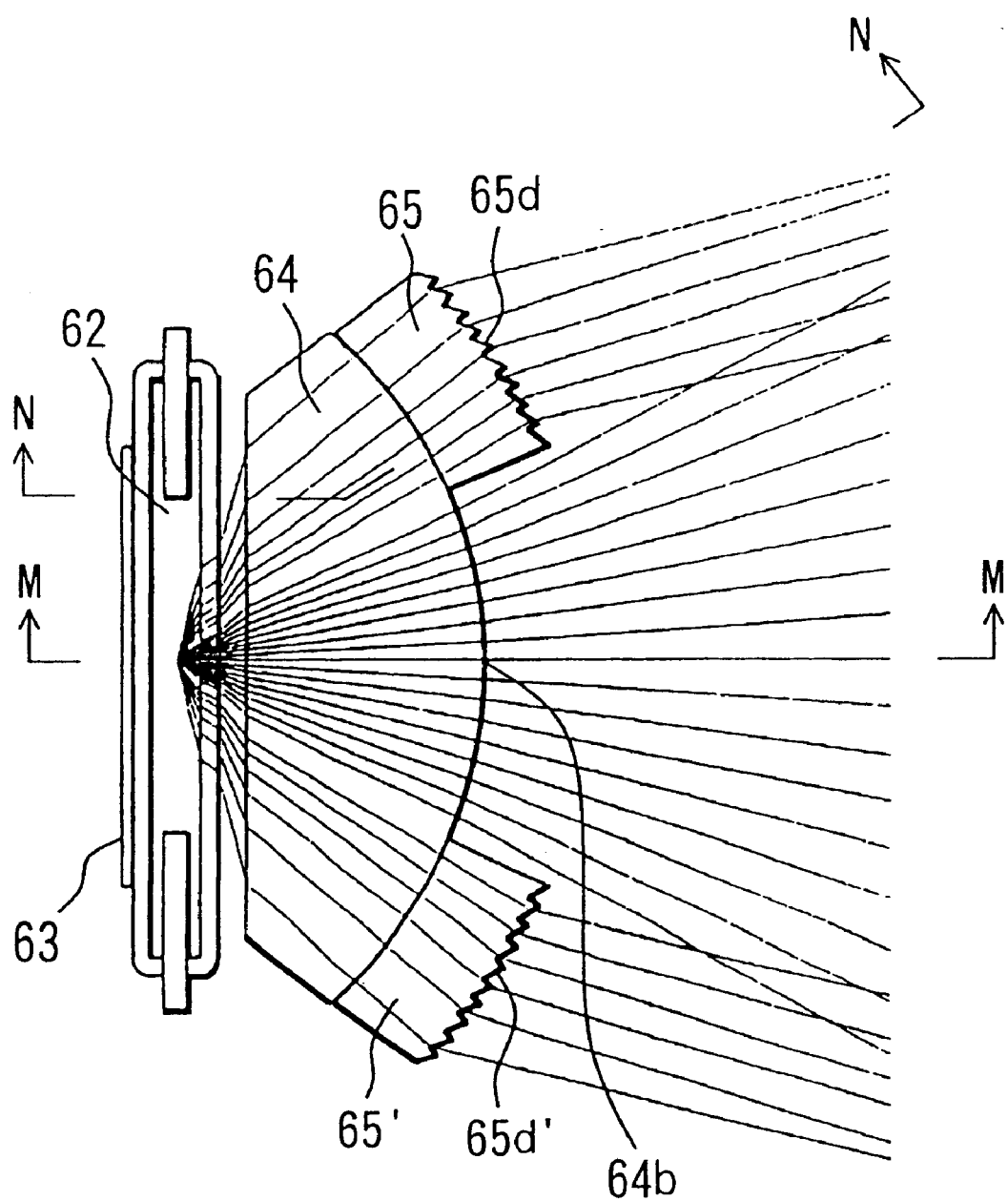
FIG. 69 is a horizontal sectional view showing the flash emission device of the embodiment shown in FIG. 68 when a narrow irradiation angle is provided in a horizontal direction.
Figure 70:
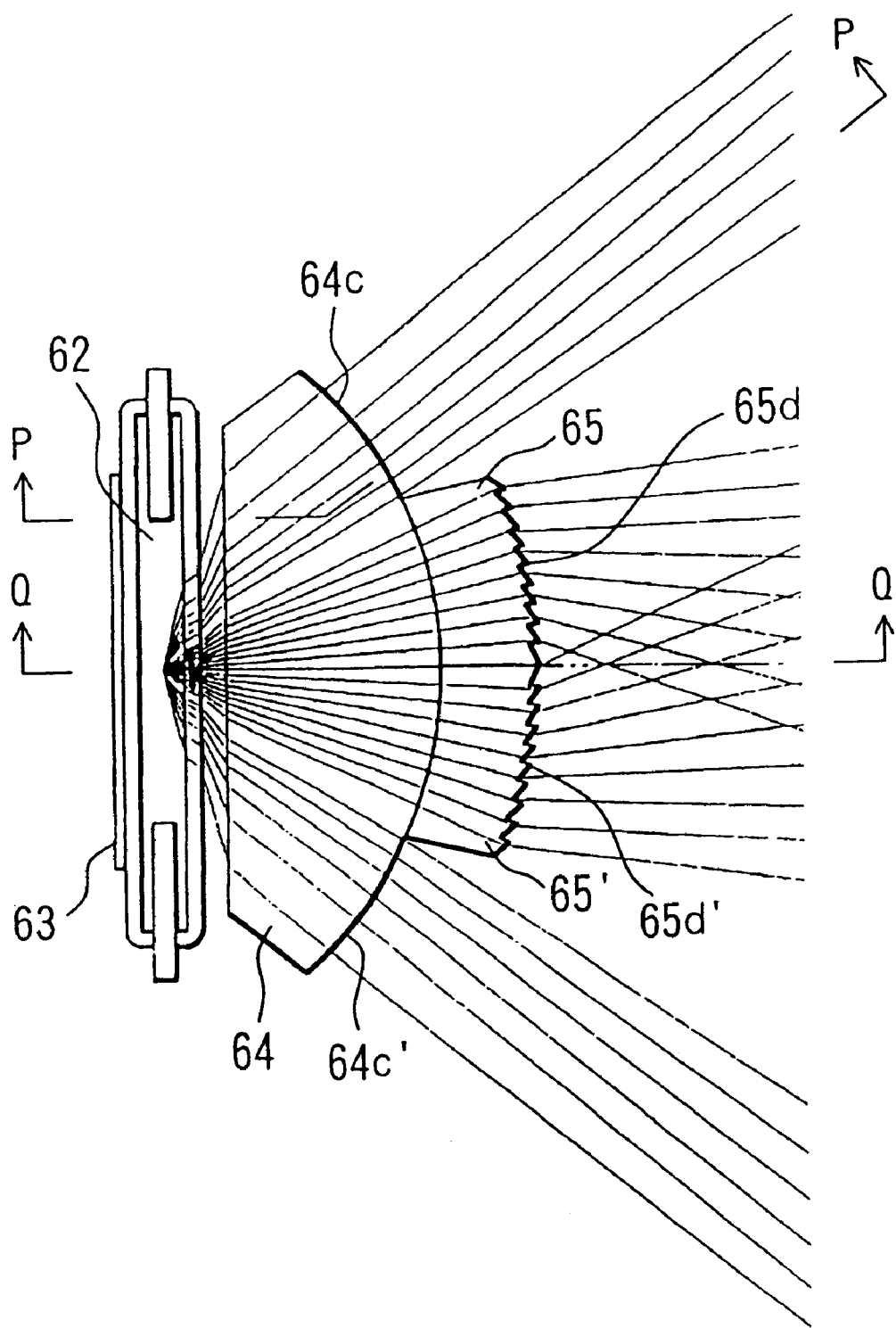
FIG. 70 is a horizontal sectional view showing the flash emission device of the embodiment shown in FIG. 68 when a wide irradiation angle is provided in the horizontal direction.
Figure 71:
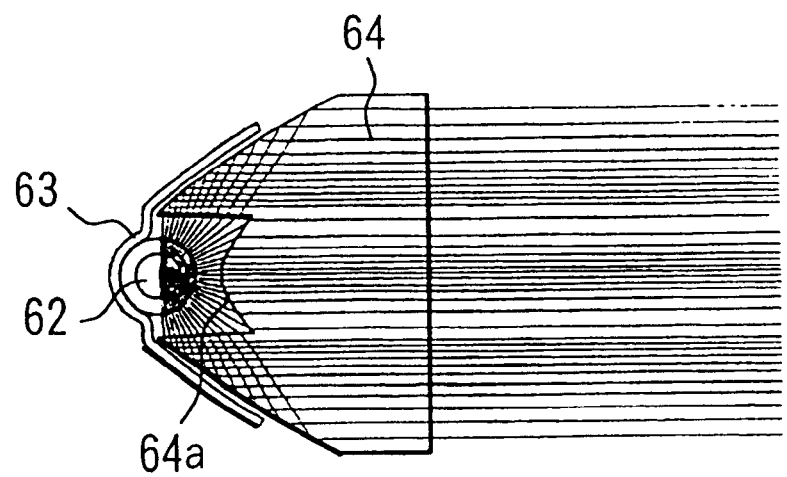
FIGS. 71(a) and 71(b) are vertical sectional views showing the flash emission device of the embodiment shown in FIG. 68 when the narrow irradiation angle is provided in the horizontal direction.
Figure 71:
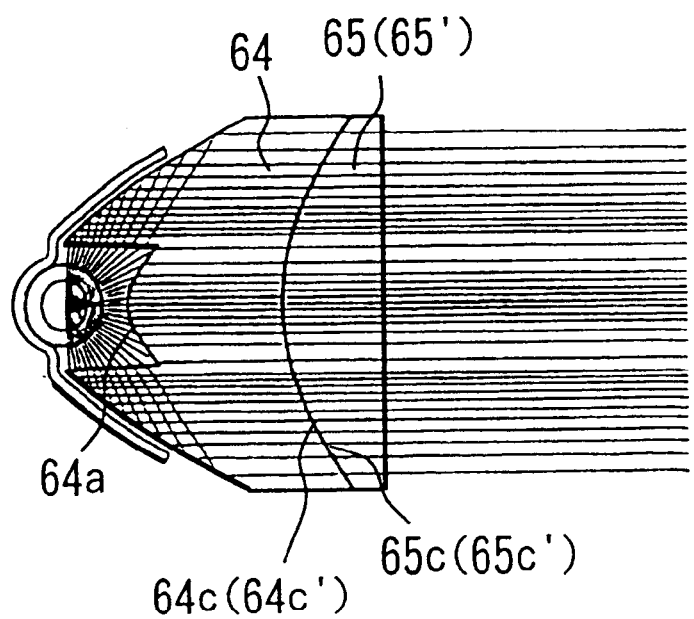
Figure 72:
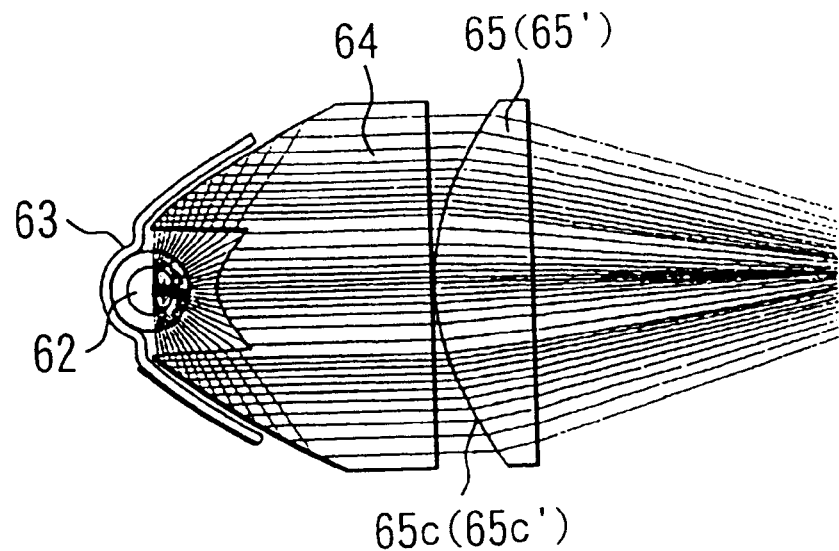
FIGS. 72(a) and 72(b) are vertical sectional views showing the flash emission device of the embodiment shown in FIG. 68 when the wide irradiation angle is provided in the horizontal direction.
Figure 72:
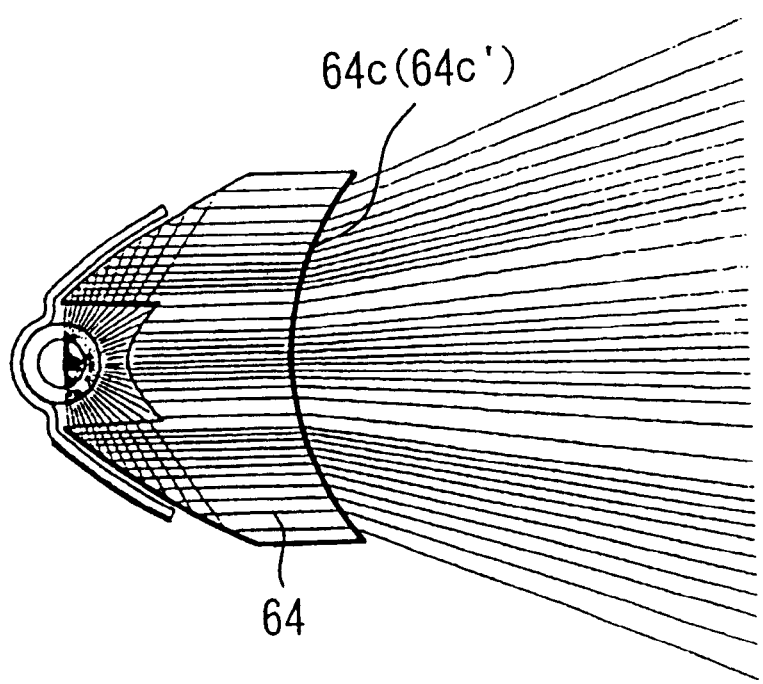

Next, FIGS. 68 to 72 illustrate a lighting device according to a further embodiment of the present invention. FIG. 68 is a perspective view showing only the appearance of a main optical system of a flash emission device. FIGS. 69, 70 are horizontal sectional views of the essentials constituting the optical system of the flash emission device and FIGS. 71, 72 are vertical sectional views of the essentials constituting the optical system of the flash emission device. FIGS. 69 to 72 also show light beam traces of representative light beams emitted from a flash discharge tube 62.

This embodiment is characterized in that a first optical member having a single toric surface with negative refractivity in a vertical direction formed on an exit surface in each peripheral portion is used in place of the first optical member in the preceding embodiment. This can prevent loss of light quantity (occurrence of luminous flux traveling in an unexpected direction when luminous flux enters an adjacent area due to a form error from the size of a light source or manufacturing/assembly error of each optical element) which tends to occur when a minute lens is used, and a feasible and efficient optical system can be formed. On the other hand, a lens 64b with negative refractivity in the vertical direction is formed in a central portion in a horizontal direction on the exit surface of the first optical member 64 and lenses 65c, 65c' with positive refractivity in the vertical direction are formed on incidence surfaces of second optical members in order to reduce the overall shape of the illuminating optical system in size. Specifically, the first optical member is utilized to the edges in the peripheral portions in the horizontal direction by forming a total reflection surface formed in upper and lower portions in the horizontal direction, but in the central portion, condensing control is completed by a cylindrical lens surface 64a formed on the side of a light source. Thus, hollowing the central portion in the horizontal direction of the first optical member 64 has little influence on light distribution characteristic and enables a significant reduction in size as compared with the lens with positive refractivity formed in the center in the horizontal direction on the exit surface of the first optical member.

In FIGS. 68 to 72, reference numerals 62 and 63 show a flash discharge tube (xenon tube) and a reflector, respectively. Reference numeral 64 shows the first optical member which has a three-dimensional curved surface of a plurality of toric lens surfaces of the toric lens surfaces 64c, 64c' with positive refractivity for providing a converging action in a longitudinal direction of the flash discharge tube 62 and with negative refractivity in the vertical direction in the peripheral portions in the horizontal direction on the exit surface in a diametrical direction of the flash discharge tube 62. Reference numerals 65, 65' show the second optical members which have, on incident surfaces, toric lens surfaces 65c, 65c' shaped to cancel out the refractivity in the diametrical direction of the flash discharge tube 62 of the toric lens surfaces 64c, 64c' of the first optical member 64, or with positive refractivity in the vertical direction for the section, and on exit surfaces, Fresnel lens surfaces 65d, 65d'. The second optical members 65, 65' are disposed with a fixed spacing maintained from the exit surface of the first optical member 64 and formed to be movable in the longitudinal direction of the flash discharge tube 62 and along a curved surface of the first optical member 64 in the horizontal direction.

In the aforementioned configuration, the flash discharge tube 62, the reflector 63, and the first optical member 64 are collectively put in a holding case or the like, not shown, to constitute a light emission unit, and the second optical members 65, 65' are moved as appropriate to a predetermined position for optical arrangement by rotating them about a predetermined rotation axis along the curved surface in the horizontal direction, thereby making it possible to continuously change a condensing degree. As materials of the first optical member 64 and the second optical members 65, 65', an optical resin material with high transmittance such as an acrylic resin or a glass material is suitable.

Similarly to the preceding embodiment, this embodiment is a proposal of a lighting device which, when photographic lens of the picture taking device is a zoom lens, simultaneously matches light distribution characteristics in both vertical and horizontal directions with the range supported by the photographic lens in taking pictures by adjusting as appropriate an amount of movement of the second optical members 65, 65' in a rotational operation in accordance with a focal length of the lens. In the following, a setting method of an optimal distribution shape will be described in more detail with reference to FIGS. 68 to 72.

FIGS. 71, 72 are vertical sectional views in the diametrical direction of the flash discharge tube 62 of the flash emission device for illustrating basic principles in varying an irradiation angle vertically. FIG. 71(*a*), FIG. 71(*b*) are cross sections taken along lines MM and NN in FIG. 69 respectively, while FIGS. 72(*a*), FIG. 72(*b*) are cross sections taken along lines QQ and PP in FIG. 70, respectively. The reference numerals in FIGS. 71, 72 correspond to those in FIGS. 69, 70.

The toric lens surfaces with negative refractivity in the vertical direction formed on the exit surface of the first optical member 64 are formed only in areas corresponding to the peripheral portions in the horizontal direction. Near the center in the horizontal direction on the exit surface of the first optical member 64, the cylindrical lens surface 64b is formed to abut on the thinnest portions of the toric lens surfaces 64c, 64c' such that no interference occurs even when the second optical members 65, 65' are moved horizontally along the curved surface.

First, description will be made for a condensed or diverged state of light in the longitudinal direction of the flash discharge tube 62 with reference to FIGS. 69, 70. FIG. 69 shows the most condensed state in the embodiment, in which the second optical members 65, 65' for varying an irradiation angle are open to the left and right and have been moved to positions corresponding to the peripheral portions in the horizontal direction of the first optical member 64. As shown, light can be efficiently condensed as seen in the light beam traces in FIG. 69 by the toric lens surfaces 64c, 64c' and the cylindrical lens surface 64b provided on the exit surface of the first optical member 64, and in addition, by the converging action of the Fresnel lens surfaces 65d, 65d' provided on the exit surface of the second optical members 65, 65' in the peripheral portions in the horizontal direction.

Next, the state of the widest irradiation angle range in the horizontal direction will be described with reference to FIG. 70. Shown herein is a state in which the second optical members 65, 65' serving as operating members for varying an irradiation angle have been moved to positions at which they abut on each other in the center in the horizontal direction of the first optical member 64. As shown, near the center, overlapping two lenses of the first optical member 64 and the second optical members 65, 65' define an irradiation range, and combined refractivity is high to result in luminous flux being diverged in a certain range rather than being condensed. On the other hand, in peripheral portions in the horizontal direction, since the Fresnel lens surfaces 65d, 65d' formed on the exit surfaces of the second optical members 65, 65' make no contribution, light distribution characteristic is regulated only by the toric lens surfaces 64c, 64c' with positive refractivity in the vertical direction formed in the peripheral portions in the horizontal direction on the exit surface of the first optical member 64. In this event, a large proportion of luminous flux entering the peripheral portions at a relatively large incident angle reaches a peripheral portion of a required irradiation range due to low refractivity in the horizontal direction of the toric lens surfaces 64c, 64c' formed on the first optical member 64. Consequently, in the state shown in FIG. 70, light distribution characteristic suitable for illuminating a wider area can be obtained as exit angle distribution, as compared with the state shown in FIG. 69 where more luminous flux travels toward the exit optical axis.

Next, description will be made with reference to FIGS. 71, 72 for a change in irradiation angle in the diametrical direction of the flash discharge tube 62 in synchronization with a change in irradiation range in the longitudinal direction of the flash discharge tube 62 in FIGS. 69, 70. In FIGS. 71, 72, components identical to those in FIGS. 69, 70 are designated by the same reference numerals. The characteristic of the vertical sectional shape shown in FIGS. 71, 72 is that each of the exit surface of the first optical member and the incidence surfaces of the second optical members are formed of a single lens surface.

Luminous flux emitted from the central axis of an illuminant is once converted into luminous flux in parallel with the exit optical axis by the actions of the respective surfaces of the first optical member 64. Then, the combination of the first optical member 64 and the second optical members 65, 65' can change a condensed or diverged state. Each of the states will be described in order. First, near the center in the horizontal direction shown in FIG. 71(*a*), since the first optical member 64 has no refractivity for this section and the second optical members 65, 65' do not exist at this position, the most condensed state through the first optical member 64 is maintained. In a peripheral portion in the horizontal direction shown in FIG. 71(*b*), since the toric lens surfaces 64c, 64c' with negative refractivity formed in the peripheral portions in the horizontal direction on the exit surface of the first optical member 64 and the toric lens surfaces 65c, 65c' with positive refractivity formed on the incidence surfaces of the second optical members 65, 65' to have the shapes corresponding to the toric lens surfaces 64c, 64c' act to cancel out each other's refractivity, the most condensed state is maintained in this case as shown. Consequently, in the state corresponding to FIG. 69 where the second optical members 65, 65' are rotated to the positions corresponding to both ends in the horizontal direction of the first optical member 64, luminous flux in all the area is condensed vertically as shown in FIG. 71(a) or FIG. 71(b), resulting in the most condensed state.

On the other hand, when the second optical members 65, 65' are positioned closest to each other in a central portion in the horizontal direction as shown in FIGS. 72(a) and 72(b), the first optical member 64 has no refractivity for the section near the center in the horizontal direction shown in FIG. 72(a), while the second optical members 65, 65' have the lens surfaces 65c, 65c' formed thereon with positive refractivity in the vertical direction, so that luminous flux after passing through both of them is diverged by the cylindrical lens surfaces 65c, 65c'. Also, in a peripheral portion in the horizontal direction shown in FIG. 72(b), light is diverged by the toric lens surfaces 64c, 64c' with negative refractivity in the vertical direction formed in the peripheral portions in the horizontal direction on the exit surface of the first optical member 64, and since the second optical members 65, 65' have been moved and do not exist in front thereof, the diverged state is maintained. Consequently, in the state corresponding to FIGS. 71(a) and 71(b) where the second optical members 65, 65' are closest to each other, the luminous flux in all the area is diverged in FIG. 72(a) or FIG. 72(b), and as a result, the widest irradiation angle range in the vertical direction can be obtained.

At each point during movement of the second optical members 65, 65' other than the aforementioned two states, the ratio of condensing area range to diverging area range is continuously changed, and the irradiation angle as a whole can be continuously changed. In this manner, for light distribution characteristic in the vertical direction, the irradiation angle can be continuously changed by rotating the second optical members 65, 65' about the rotation axis over a required distance with respect to the fixed first optical member 64.

While the second optical members 65, 65' in the aforementioned embodiment have been described as moved symmetrically about the exit optical axis in the horizontal direction, the movement of the second optical members 65, 65' is not necessarily limited to such symmetrical one. The members may be moved over different distances from each other intentionally to obtain bilaterally asymmetrical light distribution.

While the Fresnel lens surfaces 65d, 65d' with refractivity in the horizontal direction are formed on the exit surfaces of the second optical members 65, 65' to provide a condensing action in the aforementioned embodiment, the shape of the exit surface is not limited to such a Fresnel lens surface, and may be formed of, for example, a cylindrical lens surface with a constant radius of curvature, in which configuration an optical system can be formed with a smaller loss of light quantity.

In the aforementioned embodiment, any minute lens is not used for the first optical member and the second optical member, but the members are formed only of one curved surfaces. Advantages of such an optical system include reducing useless irradiation to the outside of an effective view angle to form an efficient illuminating optical system and continuously changing light distribution characteristic in a feasible manner in varying an irradiation angle, although a sudden change in irradiation angle cannot be provided. In addition, the area of the incidence surfaces of the second optical members is smaller than the area of the exit surface of the first optical member, and the moving range of the second optical members is limited to the range corresponding to the exit surface of the first optical member.

As described above, according to the embodiment, an irradiation angle can be efficiently changed for a light source with a long effective light emitting section.

Since the second optical members serving as irradiation angle varying means always function at each optical position and do not require special space for retraction, this embodiment is significantly effective especially when it is applied to a small and thin illuminating optical system which has limited space required for varying an irradiation angle. Also, an irradiation angle can be considerably changed with a simple configuration.

In addition, when this embodiment is applied to the irradiation angle varying mechanism for the flash emission device 101, an irradiation angle in the horizontal direction can be controlled in synchronization with a change in irradiation angle in the vertical direction. Thus, an irradiation angle can be changed in both vertical and horizontal directions without requiring larger space and a significant increase in guide number can be achieved in a condensed state.

Furthermore, it is possible to provide a lighting device with variable irradiation angles which has favorable optical characteristics, such as continuously changeable light distribution characteristic or uniform light distribution at any zoom point.

What is claimed is:

1. A lighting device comprising:
   an illuminating light source for illuminating an object;
   a first optical unit disposed on the side of said object of said illuminating light source and having:
     one of an optical action section for diverging light and an optical action section for converging light; and
     another section which is not formed in said optical action section; and
   a second optical unit disposed on the side of said object of said first optical unit and having an optical action section for exhibiting a characteristic opposite to a characteristic of said optical action section of said first optical unit, an area of the second optical unit being smaller than the sum of the areas of the second optical action section and said another section,
   wherein by moving said second optical unit from a position where it overlaps with said optical action section to a position where it overlaps with said another section, changing the light distribution characteristics.

2. The lighting device according to claim 1, wherein said illuminating light source is a discharge tube having a longitudinal direction.

3. The lighting device according to claim 2, wherein said second optical unit is moved in the longitudinal direction of said discharge tube to change said area where said optical action section of said second optical unit overlies said optical action section of said first optical unit when light distribution characteristic is changed.

4. The lighting device according to claim 2, wherein said optical action section of said first optical unit has one of a plurality of convex portions and a plurality of concave portions arranged in a direction perpendicular to said longitudinal direction and said optical action section of said second optical unit has one of a plurality of concave portions and a plurality of convex portions having an optical characteristic opposite to an optical characteristic of said plurality of one of convex portions and concave portions of said first optical unit.

5. The lighting device according to claim 4, wherein one of said plurality of convex portions and plurality of concave portions of said first optical unit are a plurality of cylindrical lenses and one of said plurality of concave portions and plurality of convex portions of said second optical unit are a plurality of cylindrical lenses.

6. The lighting device according to claim 4, wherein one of said plurality of convex portions and plurality of concave portions of said first optical unit are a plurality of toric lenses and one of said plurality of concave portions and plurality of convex portions of said second optical unit are a plurality of toric lenses.

7. The lighting device according to claim 2, wherein a surface of said first optical unit on the side of said object has a region where said optical action section is formed and a region where said optical action section is not formed, a surface of said second optical unit on the side of said first optical unit has a region where said optical action section is formed and a region where said optical action section is not formed, and light distribution characteristic is changed by changing said area where said optical action section of said second optical unit overlies said optical action section of said first optical unit.

8. The lighting device according to claim 7, wherein a surface of said second optical unit on the side of said object has a plurality of one of convex portions and concave portions formed thereon in a direction perpendicular to the longitudinal direction of said discharge tube.

9. The lighting device according to claim 8, wherein said plurality of one of convex portions and concave portions formed on the surface of said second optical unit on the side of said object are Fresnel lens surfaces.

10. The lighting device according to claim 9, wherein said plurality of one of convex portions and concave portions have different pitches.

11. The lighting device according to claim 2, wherein said second optical unit has two second optical subunits arranged in the longitudinal direction of said discharge tube.

12. The lighting device according to claim 11, wherein said two second optical subunits are moved mutually in opposite directions to change light distribution characteristic.

13. The lighting device according to claim 1, wherein combined refractivity of said optical action section of said first optical unit and said optical action section of said second optical unit is substantially zero.

14. A lighting device comprising:

a discharge tube for illuminating an object;

a first optical unit disposed on the side of said object of said discharge tube and having one of a plurality of optical action sections for diverging light and a plurality of optical action sections for converging light; and another section which is not formed in said plurality of optical action sections, each of said plurality of optical action sections being extended in the longitudinal direction of said discharge tube, and being arranged together with a direction perpendicular to the longitudinal direction; and a second optical unit disposed on the side of said object of said first optical unit and having a plurality of optical action sections for exhibiting a characteristic opposite to a characteristic of said first optical unit, each of said plurality of optical action sections being extended in the longitudinal direction of said discharge tube, and being arranged together with a direction perpendicular to the longitudinal direction;

wherein said second optical unit in contrast to said first optical unit moves relative to the longitudinal direction on said discharge tube, changing the light distribution characteristics.

15. The lighting device according to claim 14, wherein said second optical unit is moved in a longitudinal direction of said discharge tube to change said area where said action sections of said second optical unit overlie said action sections of said first optical unit when light distribution characteristic is changed.

16. The lighting device according to claim 14, wherein said optical action sections of said first optical unit have one of a plurality of convex portions and a plurality of concave portions arranged in a direction perpendicular to said longitudinal direction and said optical action sections of said second optical unit have one of a plurality of concave portions and a plurality of convex portions having an optical characteristic opposite to an optical characteristic of said plurality of one of convex portions and concave portions of said first optical unit.

17. The lighting device according to claim 14, wherein one of said plurality of convex portions and plurality of concave portions of said first optical unit are a plurality of cylindrical lenses and one of said plurality of concave portions and plurality of convex portions of said second optical unit are a plurality of cylindrical lenses.

18. The lighting device according to claim 14, wherein one of said plurality of convex portions and plurality of concave portions of said first optical unit are a plurality of toric lenses and one of said plurality of concave portions and plurality of convex portions of said second optical unit are a plurality of toric lenses.

19. The lighting device according to claim 14, wherein a surface of said first optical unit on the side of said object has a region where said optical action sections are formed and a region where said optical action sections are not formed, a surface of said second optical unit on the side of said first optical unit has a region where said optical action sections are formed and a region where said optical action sections are not formed, and light distribution characteristic is changed by changing said area where said optical action sections of said second optical unit overlie said optical action sections of said first optical unit.

20. The lighting device according to claim 14, wherein said second optical unit has two second optical subunits arranged in the longitudinal direction of said discharge tube.

21. The lighting device according to claim 20, wherein said two second optical subunits are moved mutually in opposite directions to change light distribution characteristic.

22. The lighting device according to claim 14, wherein combined refractivity of said optical action sections of said first optical unit and said optical action sections of said second optical unit is substantially zero.

* * * * *